United States Patent
Lief et al.

(10) Patent No.: US 12,297,304 B2
(45) Date of Patent: May 13, 2025

(54) CATALYST COMPOSITION AND METHOD FOR PREPARING POLYETHYLENE

(71) Applicant: Chevron Phillips Chemical Company LP, The Woodlands, TX (US)

(72) Inventors: Graham R. Lief, The Woodlands, TX (US); Qing Yang, The Woodlands, TX (US); Eric J. Haschke, The Woodlands, TX (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/638,423

(22) Filed: Apr. 17, 2024

(65) Prior Publication Data

US 2024/0279371 A1 Aug. 22, 2024

Related U.S. Application Data

(60) Continuation of application No. 17/466,696, filed on Sep. 3, 2021, now Pat. No. 11,993,667, which is a
(Continued)

(51) Int. Cl.
*C07F 17/00* (2006.01)
*C08F 4/659* (2006.01)
(Continued)

(52) U.S. Cl.
CPC ............ *C08F 210/16* (2013.01); *C07F 17/00* (2013.01); *C08F 4/65904* (2013.01); *C08F 4/65925* (2013.01); *C08F 4/65927* (2013.01)

(58) Field of Classification Search
CPC .... C07F 17/00; C08F 4/65925; C08F 110/02; C08F 210/16
See application file for complete search history.

(56) References Cited

U.S. PATENT DOCUMENTS 3,107,230 A 10/1963 Hugo
3,242,099 A 3/1966 Manyik
(Continued)

FOREIGN PATENT DOCUMENTS

EP 0795564 B1 1/2001
EP 0798306 B1 5/2002
(Continued)

OTHER PUBLICATIONS

International Search Report and Written Opinion issued in related PCT Application No. PCT/US2024/035190, mailed on Oct. 29, 2024, 10 pp.
(Continued)

*Primary Examiner* — Caixia Lu
(74) *Attorney, Agent, or Firm* — Eversheds Sutherland (US) LLP

(57) ABSTRACT

Disclosed are metallocene compounds, catalyst compositions comprising at least one metallocene compound, processes for polymerizing olefins, methods for making catalyst compositions, olefin polymers and articles made from olefin polymers. In an aspect, a metallocene compound and catalyst composition are disclosed in which the metallocene contains at least one indenyl ligand, the indenyl ligand containing at least one halogenated substituent, such as a fluorinated substituent. These metallocene compounds and catalyst compositions can produce polyethylene having unexpectedly low levels of short chain branching.

26 Claims, 3 Drawing Sheets

Related U.S. Application Data division of application No. 16/593,566, filed on Oct. 4, 2019, now Pat. No. 11,186,665.

(51) Int. Cl.
*C08F 4/6592* (2006.01)
*C08F 210/16* (2006.01)

(56) References Cited

U.S. PATENT DOCUMENTS

| | | |
|---|---|---|
| 4,794,096 A | 12/1988 | Ewen |
| 4,808,561 A | 2/1989 | Welborn, Jr. |
| 5,576,259 A | 11/1996 | Hasegawa |
| 5,770,753 A | 6/1998 | Kuber |
| 5,807,938 A | 9/1998 | Kaneko |
| 5,919,983 A | 7/1999 | Rosen |
| 5,925,717 A | 7/1999 | De Boer |
| 5,969,070 A | 10/1999 | Waymouth |
| 6,107,230 A | 8/2000 | McDaniel |
| 6,165,929 A | 12/2000 | McDaniel |
| 6,262,201 B1 | 7/2001 | Welch |
| 6,294,494 B1 | 9/2001 | McDaniel |
| 6,300,271 B1 | 10/2001 | McDaniel |
| 6,316,553 B1 | 11/2001 | McDaniel |
| 6,355,594 B1 | 3/2002 | McDaniel |
| 6,376,415 B1 | 4/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,596,891 B1 | 7/2003 | Sommazzi |
| 6,750,302 B1 | 6/2004 | McDaniel |
| 6,831,141 B2 | 12/2004 | McDaniel |
| 6,936,667 B2 | 8/2005 | Jensen |
| 6,992,032 B2 | 1/2006 | McDaniel |
| 7,026,494 B1 | 4/2006 | Yang |
| 7,041,617 B2 | 5/2006 | Jensen |
| 7,081,505 B2 | 7/2006 | Sommazzi |
| 7,148,298 B2 | 12/2006 | Jensen |
| 7,199,073 B2 | 4/2007 | Martin |
| 7,226,886 B2 | 6/2007 | Jayaratne |
| 7,294,599 B2 | 11/2007 | Jensen |
| 7,312,283 B2 | 12/2007 | Martin |
| 7,446,216 B2 | 11/2008 | Voskoboynikov |
| 7,470,758 B2 | 12/2008 | Jensen |
| 7,501,372 B2 | 3/2009 | Thorn |
| 7,517,939 B2 | 4/2009 | Yang |
| 7,521,572 B2 | 4/2009 | Jayaratne |
| 7,576,163 B2 | 8/2009 | Yang |
| 7,601,665 B2 | 10/2009 | McDaniel |
| 7,619,047 B2 | 11/2009 | Yang |
| 7,629,284 B2 | 12/2009 | Jensen |
| 7,652,160 B2 | 1/2010 | Yang |
| 7,732,542 B2 | 6/2010 | Yang |
| 7,763,561 B2 | 7/2010 | McDaniel |
| 7,884,163 B2 | 2/2011 | McDaniel |
| 7,910,763 B2 | 3/2011 | Jayaratne |
| 7,960,487 B2 | 6/2011 | Yang |
| 8,138,113 B2 | 3/2012 | Yang |
| 8,268,944 B2 | 9/2012 | Yang |
| 8,268,984 B2 | 9/2012 | Tourniaire |
| 8,318,873 B2 | 11/2012 | Jayaratne |
| 8,507,621 B2 | 8/2013 | Jayaratne |
| 8,623,973 B1 | 1/2014 | McDaniel |
| 8,637,691 B2 | 1/2014 | Yang |
| 8,703,886 B1 | 4/2014 | Yang |
| 8,822,608 B1 | 9/2014 | Bhandarkar |
| 8,912,285 B2 | 12/2014 | Yang |
| 9,023,959 B2 | 5/2015 | McDaniel |
| 9,156,970 B2 | 10/2015 | Hlavinka |
| 9,217,049 B2 | 12/2015 | Yang |
| 9,346,896 B2 | 5/2016 | McDaniel |
| 9,670,296 B2 | 6/2017 | McDaniel |
| 9,758,540 B1 | 9/2017 | Praetorius |
| 10,239,975 B2 | 3/2019 | McDaniel |
| 10,676,553 B2 | 6/2020 | McDaniel |
| 2001/0049425 A1 | 12/2001 | Waymouth |
| 2007/0043176 A1 | 2/2007 | Martin |
| 2007/0060722 A1 | 3/2007 | Jayaratne |
| 2007/0197374 A1 | 8/2007 | Yang |
| 2010/0076167 A1 | 3/2010 | McDaniel |
| 2020/0207892 A1 | 7/2020 | McDaniel |

FOREIGN PATENT DOCUMENTS

| | | |
|---|---|---|
| RU | 2118961 C1 | 9/1998 |
| WO | 2006065844 A2 | 6/2006 |
| WO | 2011003047 A1 | 1/2011 |
| WO | 2024129579 A1 | 6/2024 |

OTHER PUBLICATIONS

Licht, Andrea I. et al., CH-Aktivierungsreaktionen an unverbrückten und verbrückten Zirconocenkomplexen zur Darstellung von Metallacyclen und deren Verwendung in der katalytischen Ethylenpolymerisation, Journal of Organometallic Chemistry 688 (2003) pp. 254-272.

Bird, R. Byron et al., Dynamics of Polymeric Liquids, Fluid Mechanics, vol. 1, Second Edition, 1987, cover page, publishing page, pp. xiii-xviii, and 171-172, John Wiley & Sons, Inc.

Cotton, F. Albert et al., Advanced Inorganic Chemistry, Sixth Edition, cover page, title page, pp. ix-x, and book description, Mar. 30, 1999, John Wiley & Sons, Inc.

Hawley's Condensed Chemical Dictionary, Eleventh Edition, cover page, contents page, pp. 862-863, Van Nostrand Reinhold Company.

Alt, Helmut G. et al., Verbriickte Indenyliden—Cyclopentadienylidenkomplexe des Typs (C9H5CH2Ph-X-C5H4)MCl2X=CMe2, SiMe2; M=Zr, Hf) als Metallocenkatalysatoren für die Ethylenpolymerisation. Die Molekülstrukturen von (C9H5CH2Ph-CMe2-C5H4)MCl2 (M=Zr, Hf), Journal of Organometallic Chemistry, vol. 558, Issues 1-2; 1998; pp. 111-121.

Hieber, C. A. et al., Shear-rate-dependence modeling of polymer melt viscosity, Polymer Engineering and Science, Jul. 1992, pp. 931-938, vol. 32, No. 14.

Hieber, C. A. et al., Some correlations involving the shear viscosity of polystyrene melts, Rheol Acta, 1989, pp. 321-332, vol. 28.

International Search Report and Written Opinion issued in corresponding application No. PCT/US2020/052996, mailed Dec. 23, 2020, 9 pages.

IUPAC Compendium of Chemical Tenrninology, 2nd Ed. 1997, pp. 1-1670.

Cámpora, Juan et al., Highly Fluorous Zirconocene(IV) Complexes and Their Catalytic Applications in the Polymerization of Ethylene, Journal of Organometallic Chemistry, vol. 695, 2010, pp. 1794-1800.

Thornberry, Matthew P. et al., Synthesis, Structure, and Olefin Polymerization Catalytic Behavior of Aryl-Substituted Zirconocene Dichlorides, Organometallics, vol. 23, No. 6, 2004, pp. 1333-1339.

Deck, Paul A. et al., Perfluoroaryl-Substituted Cyclopentadienyl Complexes of Transition Metals, Coordination Chemistry Reviews, 250; 2006; pp. 1032-1055.

Deck, Paul A. et al., Synthesis of Pentafluorophenyl-Substituted Cyclopentadienes and Their Use as Transition-Metal Ligands, Organometallics, vol. 15, No. 25, 1996, pp. 5287-5291.

Deck, Paul A. et al., Tricarbonylrhenium(I) Complexes of Pentafluorophenyl-Substituted Indenyl Ligands, Organometallics, vol. 19, No. 3, 2000, pp. 327-333.

Maldanis, Richard J. et al., The Formation and Polymerization Behavior of (Pentafluorophenyl)-Cyclopentadienyl Titanium Compounds, Journal of Organometallic Chemistry, vol. 599, 2000, pp. 107-111.

Hughes, Russell P. et al., Selective Solubility of Organometallic Complexes in Saturated Fluorocarbons. Synthesis of Cyclopentadienyl Ligands With Fluorinated Ponytails, Organometallics, vol. 15, No. 1, 1996, pp. 286-284.

Office Action/Search Report issued in related Korean Application No. 10-2022-7010887, dated Sep. 20, 2022, 4 pages.

Jany, el. al., para-Fluoro benzyl substituted bisindenyl/metallocenes as catalyst precursors in ethene polymerization, Journal of Organometal-

(56) References Cited

OTHER PUBLICATIONS lic Chemistry, vol. 553, Issues 1-2, Feb. 25, 1998, pp. 173-178 (University of Helsinki). https://doi.org/10.1016/S0022-328X(97)00625-6.

Search Report issued in corresponding RU Application No. 2022108831 dated Oct. 3, 2022, 2 pages.

CATALYST COMPOSITION AND METHOD FOR PREPARING POLYETHYLENE

CROSS REFERENCE TO RELATED APPLICATIONS

This application is a continuation of, and claims priority to, U.S. patent application Ser. No. 17/466,696, filed Sep. 3, 2021, which is a divisional application of U.S. patent application Ser. No. 16/593,566, filed Oct. 4, 2019, now U.S. Pat. No. 11,186,665, which are incorporated by reference herein in their entirety.

TECHNICAL FIELD OF THE DISCLOSURE

This disclosure relates to catalyst compositions for producing polyethylene, including bimodal resins, and processes for preparing the same.

BACKGROUND OF THE DISCLOSURE

Incorporation of short chain branches (SCB) into polyethylene can be useful in customizing the properties of the polymer or a polymer blend. For example, short chain branches can reduce polymer crystallinity and improve impact strength but can also decrease polymer stiffness and limit polymer density. One approach to improving polymer mechanical properties is to employ polymer blends, for example, polymer blends with a low molecular weight fraction having little short chain branching as compared to the high molecular weight fraction with a relatively higher concentration of short chain branches.

It would be advantageous if such polymer blends could be prepared in a single reactor using multiple catalysts, which would to circumvent the complexity of post reactor blending or dual reactor configurations. This approach can work well when one of the catalysts is capable of producing low molecular weight (MW) polyethylene with very low SCB, even in the presence of significant concentrations of the α-olefin co-monomer.

Therefore, there remains a need for new catalysts and processes for preparing a low molecular weight polyethylene with low levels of SCB. In particular, there remains a need for catalysts that can be deployed in multiple catalyst systems, which can limit co-monomer incorporation.

SUMMARY OF THE DISCLOSURE

This disclosure provides for metallocene compounds, catalyst compositions comprising at least one metallocene compound, processes for polymerizing olefins, methods for making catalyst compositions, olefin polymers and copolymers and articles made from olefin polymers and copolymers. In an aspect, this disclosure describes metallocene compounds and a process for polymerizing olefins comprising contacting at least one olefin monomer and a catalyst composition comprising a metallocene compound under polymerization conditions to form an olefin polymer. The catalyst composition can further comprise a co-catalyst such as an organoaluminum compound, an activator (such as a solid oxide treated with an electron-withdrawing anion or "activator-support", an aluminoxane such as methylaluminoxane, an organoboron compound, a borate or organoborate activator, an ionizing ionic compound, and the like), or both a co-catalyst and an activator. In an aspect, the subject metallocene compound, referred to herein as a first metallocene, can produce low molecular weight (MW) polyethylene with very low levels of short chain branching, even in the presence of significant concentrations of an α-olefin co-monomer.

In a further aspect, this disclosure provides a process for polymerizing olefins comprising contacting at least one olefin monomer and a catalyst composition comprising a first metallocene compound and a second metallocene compound under polymerization conditions to form an olefin polymer. This multiple metallocene catalyst composition can further comprise a co-catalyst such as an organoaluminum compound, an activator such as a solid oxide treated with an electron-withdrawing anion (also termed an "activator-support"), or both. In a dual metallocene catalyst composition and process, the second metallocene can be an ansa metallocene which can produce the high molecular weight fraction of the polymer blend having a relatively higher concentration of short chain branches as compared to the low molecular weight fraction produced by the first metallocene.

According to another aspect, the first metallocene which can produce low molecular weight polyethylene having low levels of short chain branching can be a metallocene which contains at least one indenyl ligand, in which the indenyl ligand contains at least one hydrocarbyl group such as a $C_1$-$C_{20}$ hydrocarbyl group which itself is substituted with at least two halogen atoms. Examples of this type of dihalogenated substituent include a fluoro-disubstituted, chloro-disubstituted, or bromo-disubstituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl, and the like. Terms such as "halogen-substituted", "dihalogenated", "halogen-disubstituted", and the like are intended to reflect that the halogen atoms are bonded to the substituent, which itself is bonded to the indenyl ligand. This indenyl ligand containing a halogenated substituent comprising at least two halogen atoms is distinguished from a halogenated indenyl in which the halogen atoms are bonded directly to the indenyl ligand.

Accordingly, in one aspect of this disclosure, there is provided a metallocene compound, generally referred to as a first metallocene compound, having the formula:

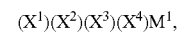

$$(X^1)(X^2)(X^3)(X^4)M^1,$$

wherein
  $M^1$ is titanium, zirconium, or hafnium;
  $X^1$ is a substituted indenyl ligand wherein at least one substituent is a halogen-substituted $C_1$-$C_{20}$ hydrocarbyl group comprising at least two halogen atoms;
  $X^2$ is [1] a substituted or unsubstituted cyclopentadienyl ligand which is absent a halogen-substituted hydrocarbyl group, or [2] a substituted or unsubstituted indenyl ligand;
  wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and
  $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

Thus, the substituted indenyl ligand $X^1$ contains at least one substituent which is a halogen-disubstituted $C_1$-$C_{20}$ hydrocarbyl group such as a fluorinated, chlorinated, or brominated $C_1$-$C_{20}$ hydrocarbyl group. In an aspect, the substituted indenyl ligand $X^1$ contains at least one substituent which is a fluorine-substituted $C_1$-$C_{20}$ hydrocarbyl group comprising at least two fluorine atoms, that is, a fluorine-disubstituted hydrocarbyl group. In an aspect, the substituted indenyl ligand $X^1$, the cyclopentadienyl or indenyl ligand $X^2$, or both $X^1$ and $X^2$ can be absent a direct ligand-halogen bond.

The ligand $X^2$ can be a substituted or unsubstituted cyclopentadienyl ligand, but when the cyclopentadienyl ligand is substituted, it is not substituted with halogen-substituted hydrocarbyl group, that is, it is absent any halogen-substituted hydrocarbyl group. Alternatively, the ligand $X^2$ can be a substituted or unsubstituted indenyl ligand, and when substituted, this indenyl ligand can contain any type of substituent, including a halogen-substituted hydrocarbyl group.

In a further aspect, this disclosure provides a process for polymerizing olefins, the process comprising contacting at least one olefin monomer and a catalyst composition under polymerization conditions to form an olefin polymer, wherein the catalyst composition comprises a first metallocene compound having the formula $(X^1)(X^2)(X^3)(X^4)M^1$, wherein $M^1$ is titanium, zirconium, or hafnium; $X^1$ is a substituted indenyl ligand wherein at least one substituent is a halogen-substituted $C_1$-$C_{20}$ hydrocarbyl group comprising at least two halogen atoms; $X^2$ is [1] a substituted or unsubstituted cyclopentadienyl ligand which is absent a halogen-substituted hydrocarbyl group, or [2] a substituted or unsubstituted indenyl ligand; wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and wherein $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

According to another aspect of this disclosure, there is provided a catalyst composition for polymerizing olefins, the catalyst composition comprising:

a) a first metallocene compound having the formula:

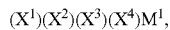

$(X^1)(X^2)(X^3)(X^4)M^1$, wherein $M^1$ is titanium, zirconium, or hafnium;

$X^1$ is a substituted indenyl ligand wherein at least one substituent is a halogen-substituted $C_1$-$C_{20}$ hydrocarbyl group comprising at least two halogen atoms;

$X^2$ is [1] a substituted or unsubstituted cyclopentadienyl ligand which is absent a halogen-substituted hydrocarbyl group, or [2] a substituted or unsubstituted indenyl ligand;

wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group;

b) optionally, a co-catalyst comprising an organoaluminum compound, an organoboron compound, an organozinc compound, an organomagnesium compound, an organolithium compound, or any combination thereof; and c) an activator comprising a solid oxide treated with an electron-withdrawing anion, an organoboron compound, an organoborate compound, an ionizing ionic compound, an aluminoxane compound, or any combination thereof.

The solid oxide treated with an electron-withdrawing anion may also be termed simply a "chemically-treated solid oxide" or an "activator-support". Thus, the substituted indenyl ligand $X^1$ contains at least one substituent which is a halogen-disubstituted $C_1$-$C_{20}$ hydrocarbyl group such as a fluorinated, chlorinated, or brominated $C_1$-$C_{20}$ hydrocarbyl group, and which can comprise at least two fluorine, chlorine, or bromine atoms. The ligand $X^2$ can be a substituted or unsubstituted cyclopentadienyl ligand, but when the cyclopentadienyl ligand is substituted, it is not substituted with halogen-substituted hydrocarbyl group, that is, it is absent a halogen-substituted hydrocarbyl group. Alternatively, the ligand $X^2$ can be a substituted or unsubstituted indenyl ligand, and when substituted, this indenyl ligand can contain any type of substituent, including a halogen-substituted hydrocarbyl group.

In a further aspect, this disclosure provides a process for polymerizing olefins, the process comprising contacting at least one olefin monomer and a catalyst composition under polymerization conditions to form an olefin polymer, wherein the catalyst composition comprises: a) a first metallocene compound having the formula $(X^1)(X^2)(X^3)(X^4)M^1$; b) optionally, a co-catalyst; and c) an activator comprising a solid oxide treated with an electron-withdrawing anion, an organoboron compound, an organoborate compound, an ionizing ionic compound, an aluminoxane compound, or any combination thereof; wherein the first metallocene compound $(X^1)(X^2)(X^3)(X^4)M^1$, the co-catalyst, and the solid oxide treated with an electron-withdrawing anion are as disclosed immediately above. This disclosure further provides for a method of making a catalyst composition, the method comprising contacting in any order: a) a first metallocene compound having the formula $(X^1)(X^2)(X^3)(X^4)M^1$; b) optionally, a co-catalyst; and c) an activator comprising a solid oxide treated with an electron-withdrawing anion, an organoboron compound, an organoborate compound, an ionizing ionic compound, an aluminoxane compound, or any combination thereof; wherein the first metallocene compound $(X^1)(X^2)(X^3)(X^4)M^1$, the co-catalyst, and the co-catalyst such as the solid oxide treated with an electron-withdrawing anion are as disclosed immediately above.

Accordingly, in an aspect of this disclosure, there is provided a catalyst composition for polymerizing olefins, the catalyst composition comprising:

a) a first metallocene compound having the formula:

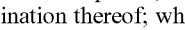

$(X^1)(X^2)(X^3)(X^4)M^1$, wherein $M^1$ is titanium, zirconium, or hafnium;

$X^1$ is a substituted indenyl ligand wherein at least one substituent is a halogen-substituted $C_1$-$C_{20}$ hydrocarbyl group comprising at least two halogen atoms;

$X^2$ is [1] a substituted or unsubstituted cyclopentadienyl ligand which is absent a halogen-substituted hydrocarbyl group, or [2] a substituted or unsubstituted indenyl ligand;

wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;

b) optionally, a co-catalyst comprising an organoaluminum compound, an organoboron compound, an organozinc compound, an organomagnesium compound, an organolithium compound, or any combination thereof; and c) an activator comprising a solid oxide treated with an electron-withdrawing anion, an organoboron compound, an organoborate compound, an ionizing ionic compound, an aluminoxane compound, or any combination thereof; and d) a second metallocene compound having the formula:

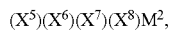

wherein $M^2$ is titanium, zirconium, or hafnium;

$X^5$ is a substituted cyclopentadienyl, indenyl, or fluorenyl ligand, wherein any non-bridging substituent, when present, is selected independently from a $C_1$-$C_{12}$ hydrocarbyl group;

$X^6$ is a substituted indenyl or fluorenyl ligand, wherein any non-bridging substituent, when present, is selected independently from a $C_1$-$C_{12}$ hydrocarbyl group or a $C_1$-$C_{12}$ heterohydrocarbyl group;

wherein $X^5$ and $X^6$ are each substituted by a bridging group selected from $(>ER^B{}_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and $X^7$ and $X^8$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

In this aspect, the second metallocene includes a bridging moiety between the ligand $X^5$ which is a substituted cyclopentadienyl, indenyl, or fluorenyl ligand, and $X^6$ which is a substituted indenyl or fluorenyl ligand. That is, both $X^5$ and $X^6$ are substituted by a bridging group selected from $(>ER^B{}_2)_x$ or $>BR^B$, wherein x is an integer from 1 to 3, which can be further substituted as indicated. In each occurrence in $(>ER^B{}_2)_x$, E is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group. Both $X^5$ and $X^6$ can have additional substituents. Therefore, describing these ligands as substituted refers to the required bridging moiety bonded to both $X^5$ and $X^6$, as well as any other substituents in addition to the bridging moiety that are optionally present.

In a further aspect, disclosed herein is a process for polymerizing olefins, the process comprising contacting at least one olefin monomer and a catalyst composition under polymerization conditions to form an olefin polymer, wherein the catalyst composition comprises: a) a first metallocene compound having the formula $(X^1)(X^2)(X^3)(X^4)Mt$; b) optionally, a co-catalyst; c) an activator comprising a solid oxide treated with an electron-withdrawing anion, an organoboron compound, an organoborate compound, an ionizing ionic compound, an aluminoxane compound, or any combination thereof; and d) a second metallocene compound having the formula $(X^5)(X^6)(X^7)(X^8)M^2$, wherein the first metallocene compound $(X^1)(X^2)(X^3)(X^4)Mt$, the optional co-catalyst, the solid oxide treated with an electron-withdrawing anion, and the second metallocene $(X^5)(X^6)(X^7)(X^8)M^2$ are as disclosed immediately above. There is also provided a method of making a catalyst composition, the method comprising contacting in any order: a) a first metallocene compound having the formula $(X^1)(X^2)(X^3)(X^4)Mt$; b) optionally, a co-catalyst; c) an activator comprising a solid oxide treated with an electron-withdrawing anion, an organoboron compound, an organoborate compound, an ionizing ionic compound, an aluminoxane compound, or any combination thereof; and d) a second metallocene compound having the formula $(X^5)(X^6)(X^7)(X^8)M^2$, wherein, the first metallocene compound $(X^1)(X^2)(X^3)(X^4)Mt$, the co-catalyst, and the solid oxide treated with an electron-withdrawing anion, and the second metallocene $(X^5)(X^6)(X^7)(X^8)M^2$ are as disclosed immediately above.

This disclosure further describes olefin polymers made by the discloses processes, and also describes fabricating an article of manufacture comprising the olefin polymers produced according to the disclosure, by any technique. The fabricated article can be, for example but is not limited to, an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

These and other embodiments and aspects of the processes, methods, and compositions including catalyst compositions are described more fully in the Detailed Description and claims and further disclosure such as the Examples provided herein.

DETAILED DESCRIPTION OF THE DISCLOSURE

General Description

Figure 1:
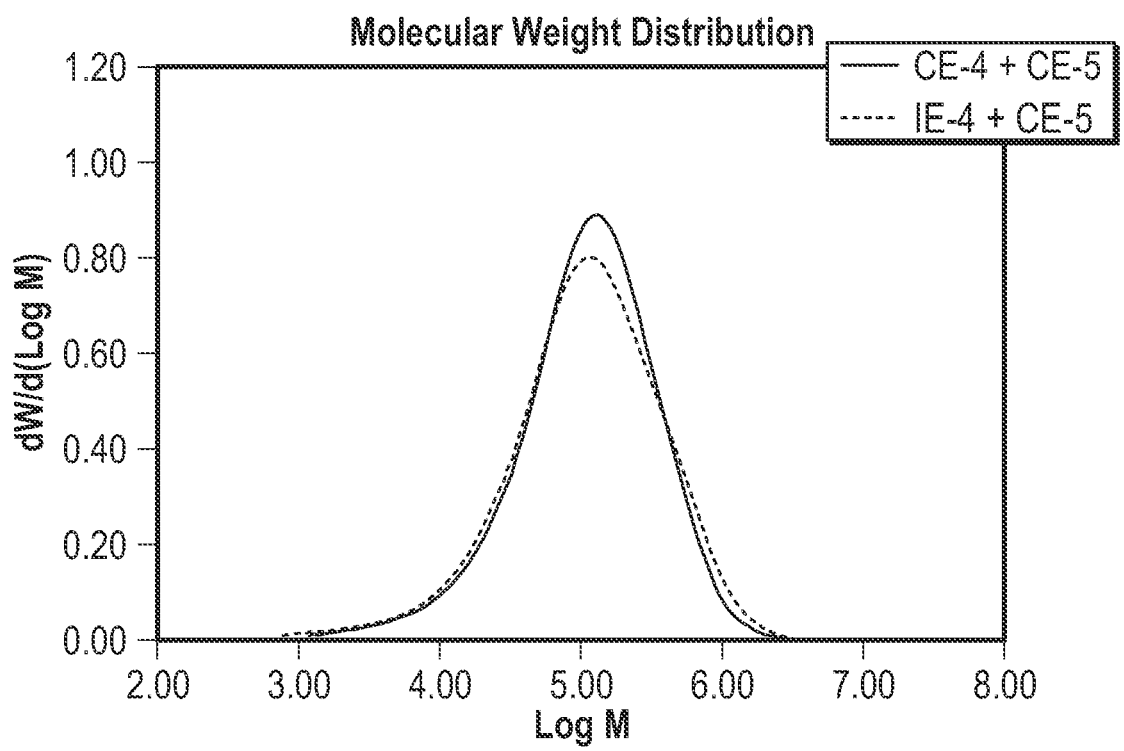
FIG. 1 illustrates the molecular weight distribution (MWD) profile of samples of the dual metallocene polyethylenes prepared according to Example 57 and Example 59, showing the broader molecular weight distribution for bimodal polyethylenes prepared using a first metallocene having an indenyl ligand with a fluorinated substituent, along with a second ansa-metallocene, as compared to a conventional metallocene without an indenyl ligand with a fluorinated substituent.

This disclosure provides generally for metallocene compounds, catalyst compositions comprising at least one metallocene compound, processes for polymerizing olefins, methods for making catalyst compositions, olefin polymers and copolymers and articles made from the olefin polymers and copolymers. In an aspect, this disclosure provides generally for catalytic processes for polymerizing olefins to form a polyethylene having limited α-olefin comonomer incorporation, and also provides for metallocene compounds, catalyst compositions comprising metallocene compounds, and methods for making the catalyst compositions. The disclosure also describes the polymers prepared as using the catalytic processes and articles made from the polymers.

It has been surprisingly discovered that metallocenes which contain at least one indenyl ligand which includes a halogenated substituent, such as a fluorinated substituent, show improved α-olefin comonomer rejecting properties when activated for olefin polymerization, for example, when combined with [1] an optional co-catalyst such as a trialkylaluminum compound and [2] an activator such as a solid oxide treated with an electron withdrawing anion. In some aspects, the metallocenes which contain at least one indenyl ligand which includes a halogenated substituent, such as a fluorinated substituent, show approximately the same α-olefin comonomer rejecting properties as comparable metallocenes which do not contain a halogenated or fluorinated substituent. These α-olefin comonomer rejecting properties manifest even under relatively high concentrations of α-olefin. For clarity, reference to an indenyl ligand which includes a halogenated substituent denotes an indenyl ligand which contains a substituent which is halogenated, for example, a halogenated hydrocarbyl substituent, and does not refer to a halogen-substituted indenyl where a halogen atom is directly bonded to a ring carbon of the indenyl ligand.

While not intending to be bound by theory, metallocenes containing cycloalkadienyl (e.g. cyclopentadienyl, indenyl) ligands with halogenated substituents might be expected to show increased α-olefin comonomer incorporation due to inductive effects, as compared with comparable metallocenes which do not contain a halogenated or fluorinated substituent on an cycloalkadienyl ligand. Increased α-olefin comonomer incorporation is typically observed when the cycloalkadienyl ligand is a cyclopentadienyl containing a halogenated or fluorinated substituent. However, when the cycloalkadienyl ligand is an indenyl containing a halogenated or fluorinated substituent, α-olefin comonomer incorporation decreases (α-olefin rejecting properties increase) or stays approximately the same as that obtained using a comparable metallocene which is absent a halogenated or fluorinated substituent on an indenyl ligand.

As a result of the improved α-olefin comonomer rejecting properties of the subject metallocenes containing at least one halogenated or fluorinated substituent on an indenyl ligand, under dual metallocene conditions, the subject metallocenes can yield resins with improved separation of high and low molecular weight components, increased density, and increased peak TREF elution temperatures versus comparable metallocenes which are absent such substituted indenyl ligands. Throughout this disclosure, the term "first metallocene" is used to refer to a metallocene which contains a substituted indenyl ligand, wherein the substituent is a halogen-substituted hydrocarbyl group. That is, the first metallocene does not contain a direct indenyl-halogen bond, but rather contains an indenyl-hydrocarbyl group bond wherein the hydrocarbyl group is halogenated.

This process for polymerizing olefins comprises contacting at least one olefin monomer and a catalyst composition under polymerization conditions to form an olefin polymer, wherein the catalyst composition comprises a first metallocene compound. The catalyst composition can further comprise a co-catalyst, an activator such as an activator-support, or a combination thereof. For example, a co-catalyst such as an organoaluminum compound, and an activator-support comprising a solid oxide treated with an electron-withdrawing anion can be used in combination with a first metallocene compound. The co-catalyst, for example, can comprise, consist essentially of, consist of, or be selected from an organoaluminum compound, an organoboron compound, an organozinc compound, an organomagnesium compound, an organolithium compound, or any combination thereof. These agents traditionally have been referred to as co-catalysts, and can functional, for example, as alkylating agents.

The catalyst composition and processes disclosed herein can also include an activator. The activator can be a compound or material that is capable of converting a transition metal component such as a metallocene compound into an active catalyst that can polymerize olefins. In an aspect, and while not intending to be bound by theory, an activator can function as a Lewis acids and interact with the transition metal or metallocene catalyst to form a cationic complex or incipient cationic complex, which is an active site for olefin polymerization. Activators can include, but are not limited to, a solid oxide treated with an electron-withdrawing anion (activator-support), an aluminoxane, an organoboron compound, a borate or organoborate compound, an ionizing ionic compound, or combinations thereof.

The solid oxide treated with an electron-withdrawing anion is fully described herein, and may also be referred to throughout this disclosure using terms such as a solid oxide that has been chemically-treated with an electron withdrawing anion, a chemically treated solid oxide (CTSO), a solid super acid (SSA), or an activator-support, and these terms are used interchangeably. Examples of the solid oxide that can be used to prepare the chemically-treated solid oxide include, but are not limited to, silica, alumina, silica-alumina, silica-coated alumina, aluminum phosphate, mullite, boehmite, heteropolytungstates, titania, zirconia, magnesia, boria, zinc oxide, silica-zirconia, silica-titania, or any combination thereof. Examples of the electron withdrawing anion and the source for the electron withdrawing anion may that can be used to prepare the chemically-treated solid oxide include, but are not limited to, fluoride, chloride, bromide, iodide, sulfate, bisulfate, fluorosulfate, fluoroborate, phosphate, fluorophosphate, trifluoroacetate, triflate, mesylate, thiosulfate, fluorozirconate, fluorotitanate, trifluoroacetate, and the like, Each of the catalyst composition components and processes for making and using the catalyst composition for polymerizing olefins is fully described herein. Definitions of terms that are used in this disclosure are set out.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Unless specified to the contrary, describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example a method can comprise several recited steps (and other non-recited steps) but utilize a catalyst composition preparation consisting of specific steps but utilize a catalyst composition comprising recited components and other non-recited components. While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "an organoaluminum compound" is meant to encompass one organoaluminum compound, or mixtures or combinations of more than one organoaluminum compound unless otherwise specified.

The terms "configured for use" or "adapted for use" and similar language is used herein to reflect that the particular recited structure or procedure is used in an olefin polymerization system or process. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

Groups of elements of the periodic table are indicated using the numbering scheme indicated in the version of the periodic table of elements published in *Chemical and Engineering News*, 63(5), 27, 1985. In some instances, a group of elements may be indicated using a common name assigned to the group; for example alkali metals for Group 1 elements, alkaline earth metals for Group 2 elements, transition metals for Group 3-12 elements, and halogens or halides for Group 17 elements.

For any particular compound disclosed herein, a general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethyl-propane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Groups may be specified according to the atom that is bonded to the metal or bonded to another chemical moiety as a substituent, such as an "oxygen-bonded group," which is also called an "oxygen group." For example, an oxygen-bonded group includes species such as hydrocarbyloxide (—OR where R is a hydrocarbyl group, also termed hydrocarboxy), alkoxide (—OR where R is an alkyl group), aryloxide (—OAr where Ar is an aryl group), or substituted analogs thereof, which function as ligands or substituents in the specified location. Therefore, an alkoxide group and an aryloxide group are each a subgenus of a hydrocarbyloxide (hydrocarbyloxy) group.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified or unless the context requires otherwise, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. In an aspect, the context could require other ranges or limitations, for example, when the subject carbon-containing group is an aryl group or an alkenyl group, the lower limit of carbons in these subject groups is six carbon atoms and two carbon atoms, respectively. Moreover, other identifiers or qualifying terms may be utilized to indicate the presence or absence of a particular substituent, a particular regiochemistry and/or stereochemistry, or the presence of absence of a branched underlying structure or backbone, and the like.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicant states that one or more steps in the processes disclosed herein can be conducted at a temperature in a range from 10° C. to 75° C., this range should be interpreted as encompassing temperatures in a range from "about" 10° C. to "about" 75° C.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±15% of the stated value, ±10% of the stated value, 5% of the stated value, or +3% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference or prior disclosure that Applicants may be unaware of at the time of the filing of the application.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

A chemical "group" may be described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. For example, an "alkyl group" formally can be derived by removing one hydrogen atom from an alkane, while an "alkanediyl group" (also referred to as a "alkylene group") formally can be derived by removing two hydrogen atoms from an alkane. Moreover, a more general term can be used to encompass a variety of groups that formally are derived by removing any number ("one or more") of hydrogen atoms from a parent compound, which in this example can be described as an "alkane group," which encompasses an "alkyl group," an "alkanediyl group," and materials have three or more hydrogen atoms, as necessary for the situation, removed from the alkane. The disclosure that a substituent, ligand, or other chemical moiety can constitute a particular "group" implies that the known rules of chemical structure and bonding are followed when that group is employed as described. When describing a group as being "derived by," "derived from," "formed by," or "formed from," such terms are used in a formal sense and are not intended to reflect any specific synthetic method or procedure, unless specified otherwise or the context requires otherwise.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon).

The term "hydrocarbyl" group is used herein in accordance with the definition specified by IUPAC as follows: a univalent group formed by removing a hydrogen atom from a hydrocarbon (that is, a group containing only carbon and hydrogen). Non-limiting examples of hydrocarbyl groups include ethyl, phenyl, tolyl, propenyl, cyclopentyl, and the like. The term "hydrocarbylene" group is also used herein in accordance with the definition specified by IUPAC as follows: a "hydrocarbylene" group refers to a divalent group formed by removing two hydrogen atoms from a hydrocarbon or a substituted hydrocarbon, the free valencies of which are not engaged in forming a double bond. By way of example and comparison, examples of hydrocarbyl and hydrocarbylene groups include, respectively: aryl and arylene; alkyl and alkanediyl (or "alkylene"); cycloalkyl and cycloalkanediyl (or "cycloalkylene"); aralkyl and aralkanediyl (or "aralkylene"); and so forth. For example, an "arylene" group is used in accordance with IUPAC definition to refer to a bivalent group derived from arenes by removal of a hydrogen atom from two ring carbon atoms, which may also be termed an "arenediyl" group. Examples of hydrocarbylene groups include but are not limited to: 1,2-phenylene; 1,3-phenylene; 1,2-propandiyl; 1,3-propandiyl; 1,2-ethandiyl; 1,4-butandiyl; 2,3-butandiyl; and methylene (—CH$_2$—).

The term "heterohydrocarbyl" group is used herein to refer to a univalent group, which can be linear, branched or cyclic, formed by removing a single hydrogen atom from [a] a heteroatom or [b] a carbon atom of a parent "heterohydrocarbon" molecule, the heterohydrocarbon molecule being one in which at least one carbon atom is replaced by a heteroatom. Examples of "heterohydrocarbyl" groups formed by removing a single hydrogen atom from a heteroatom of a heterohydrocarbon molecule include, for example: [1] a hydrocarbyloxide group, for example, an alkoxide (—OR) group such as tert-butoxide or aryloxide (—OAr) group such as a substituted or unsubstituted phenoxide formed by removing the hydrogen atom from the hydroxyl (OH) group of a parent alcohol or a phenol molecule; [2] a hydrocarbylsulfide group, for example, an alkylthiolate (—SR) group or arylthiolate (—SAr) group formed by removing the hydrogen atom from the hydrogensulfide (—SH) group of an alkylthiol or arylthiol; [3] a hydrocarbylamino group, for example, an alkylamino (—NHR) group or arylamino (—NHAr) group formed by removing a hydrogen atom from the amino (—NH$_2$) group of an alkylamine or arylamine molecule; and [4] a trihydrocarbylsilyl group such as trialkylsilyl (—SiR$_3$) or triarylsilyl (—SiAr$_3$) group. Examples of "heterohydrocarbyl" groups formed by removing a single hydrogen atom from a carbon atom of a heterohydrocarbon molecule include, for example, heteroatom-substituted hydrocarbyl groups such as a heteroatom-substituted alkyl group such as trimethylsilylmethyl (—CH$_2$SiMe$_3$) or methoxymethyl (—CH$_2$OCH$_3$) or a heteroatom-substituted aryl group such as p-methoxy-substituted phenyl (—C$_6$H$_5$-p-OCH$_3$).

An "aliphatic" compound is a class of acyclic or cyclic, saturated or unsaturated, carbon compounds, excluding aromatic compounds, e.g., an aliphatic compound is a non-aromatic organic compound. An "aliphatic group" is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic and/or linear or branched unless otherwise specified. Primary, secondary, and tertiary alkyl groups are derived by removal of a hydrogen atom from a primary, secondary, and tertiary carbon atom, respectively, of an alkane. The n-alkyl group can be derived by removal of a hydrogen atom from a terminal carbon atom of a linear alkane. The groups of the form RCH$_2$ (R≠H), R$_2$CH (R≠H), and R$_3$C (R≠H) are primary, secondary, and tertiary alkyl groups, respectively, wherein R is itself alkyl group.

The term "carbocyclic" group is used herein to refer to a group in which a carbocyclic compound is the parent compound, that is, a cyclic compound in which all the ring members are carbon atoms. The carbocyclic group is formed by removing one or more hydrogen atoms from the carbocyclic compound. For example, a carbocyclic group can be a univalent group formed by removing a hydrogen atom from a carbocyclic compound. Non-limiting examples of carbocyclic groups include, for example, cyclopentyl, cyclohexyl, phenyl, tolyl, naphthyl and the like.

A "cycloalkane" is a saturated cyclic hydrocarbon, with or without side chains, for example, cyclobutane. Other identifiers can be utilized to indicate the presence of particular groups in the cycloalkane (e.g., halogenated cycloalkane indicates that the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. Other identifiers can be utilized to indicate the presence of particular groups in the cycloalkenes, cycloalkadienes, cycloalkatrienes, and so forth.

A "cycloalkyl" group is a univalent group derived by removing a hydrogen atom from a ring carbon atom from a cycloalkane. Examples of cycloalkyl groups include cyclobutyl, cyclopentyl, cyclohexyl, and cycloheptyl groups. For clarity, other examples of cycloalkyl groups include a 1-methylcyclopropyl group and a 2-methylcyclopropyl group are illustrated as follows.

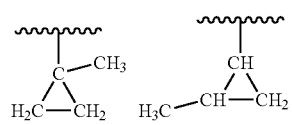

A "cycloalkane group" refers to a generalized group formed by removing one or more hydrogen atoms (as necessary for the particular group and at least one of which is a ring carbon) from a cycloalkane.

The term "alkene" whenever used in this specification and claims refers to an olefin that has at least one carbon-carbon double bond. The term "alkene" includes aliphatic or aromatic, cyclic or acyclic, and/or linear and branched alkene unless expressly stated otherwise. The term "alkene," by itself, does not indicate the presence or absence of heteroatoms and/or the presence or absence of other carbon-carbon double bonds unless explicitly indicated. Other identifiers may be utilized to indicate the presence or absence of particular groups within an alkene. Alkenes may also be further identified by the position of the carbon-carbon double bond. Alkenes, having more than one such multiple bond are alkadienes, alkatrienes, and so forth, and may be further identified by the position of the carbon-carbon double bond.

An "alkenyl group" is a univalent group derived from an alkene by removal of a hydrogen atom from any carbon atom of the alkene. Thus, "alkenyl group" includes groups in which the hydrogen atom is formally removed from an sp$^2$ hybridized (olefinic) carbon atom and groups in which the hydrogen atom is formally removed from any other carbon atom. For example and unless otherwise specified, 1-propenyl (—CH=CHCH$_3$), 2-propenyl [(CH$_3$)C=CH$_2$], and 3-propenyl (—CH$_2$CH=CH$_2$) groups are all encompassed with the term "alkenyl group." Other identifiers may be utilized to indicate the presence or absence of particular groups within an alkene group. Alkene groups may also be further identified by the position of the carbon-carbon double bond. Similarly, a "cycloalkenyl" group is a univalent group derived from a cycloalkene by removal of a hydrogen atom from any carbon atom of the cycloalkene, whether that carbon atom is sp$^2$ hybridized (olefinic) or sp$^3$ hybridized carbon atom.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

An "aromatic group" refers to a generalized group formed by removing one or more hydrogen atoms (as necessary for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C═) carbon atoms by trivalent or divalent heteroatoms, in such a way as to maintain the continuous pi-electron system characteristic of aromatic systems and a number of out-of-plane pi-electrons corresponding to the Hückel rule (4n+2)). While arene compounds and heteroarene compounds are mutually exclusive members of the group of aromatic compounds, a compound that has both an arene group and a heteroarene group that compound generally is considered a heteroarene compound. Aromatic compounds, arenes, and heteroarenes may be mono- or polycyclic unless otherwise specified. Examples of arenes include, but are not limited to, benzene, naphthalene, and toluene, among others. Examples of heteroarenes include, but are not limited to furan, pyridine, and methylpyridine, among others. As disclosed herein, the term "substituted" may be used to describe an aromatic group wherein any non-hydrogen moiety formally replaces a hydrogen in that group, and is intended to be non-limiting.

An arene is an aromatic hydrocarbon, with or without side chains (e.g., benzene, toluene, or xylene, among others). An "aryl group" is a group derived from the formal removal of a hydrogen atom from an aromatic hydrocarbon ring carbon atom from an arene compound. One example of an "aryl group" is ortho-tolyl (o-tolyl), the structure of which is shown here.

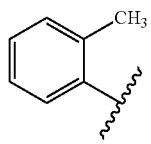 [SMILES: *c1ccccc1C]

The arene can contain a single aromatic hydrocarbon ring (e.g., benzene or toluene), contain fused aromatic rings (e.g., naphthalene or anthracene), and contain one or more isolated aromatic rings covalently linked via a bond (e.g., biphenyl) or non-aromatic hydrocarbon group(s) (e.g., diphenylmethane).

A "heterocyclic compound" is a cyclic compound having at least two different elements as ring member atoms. For example, heterocyclic compounds may comprise rings containing carbon and nitrogen (for example, tetrahydropyrrole), carbon and oxygen (for example, tetrahydrofuran), or carbon and sulfur (for example, tetrahydrothiophene), among others. Heterocyclic compounds and heterocyclic groups may be either aliphatic or aromatic.

An "aralkyl group" is an aryl-substituted alkyl group having a free valance at a non-aromatic carbon atom, for example, a benzyl group and a 2-phenylethyl group are examples of an "aralkyl" group.

A "halide", also referred to as a "halo" group or a halogen substituent or group has its usual meaning. Examples of halides include fluoride, chloride, bromide, and iodide.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "co-catalyst" is used generally herein to refer to compounds such as organoaluminum compounds, organoboron compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate. In one aspect, a co-catalyst can function as an alkylating agent for a metallocene, or a co-catalyst can function to transfer a hydride ligand to the metallocene. Therefore, in an aspect, a co-catalyst can function to provide an activatable ligand (for example, an alkyl or a hydride) to the metallocene, which can engage in olefin polymerization when activated. In this aspect, and while not intending to be bound by theory, it is thought that when the metallocene itself comprises an activatable hydrocarbyl or hydride ligand without being contacting with a co-catalyst, an active catalyst can form without the use of a co-catalyst.

The term "activator", as used herein, refers generally to a substance that is capable of converting a transition metal component such as a metallocene compound into an active catalyst that can polymerize olefins. In an aspect, the transition metal or metallocene compound can have an activatable ligand which can function as a site for olefin polymerization upon activation. The term "activator" is used regardless of the actual activating mechanism. Illustrative activators include activator-supports, aluminoxanes, organoborate compounds, ionizing ionic compounds, and the like, including combinations thereof.

The terms "solid oxide treated with an electron withdrawing anion", "chemically-treated solid oxide", "treated solid oxide", "treated solid oxide compound," and the like, are used herein to indicate a solid, inorganic oxide of relatively high porosity, which can exhibit Lewis acidic or Brønsted acidic behavior, and which has been treated with an electron-withdrawing component such as an anion or anion source, and which is calcined. The catalyst composition component referred to as the "activator-support" comprises, consists of, consists essentially or, or is selected from a solid oxide treated with an electron-withdrawing anion. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The terms "support" and "activator-support" are not used to imply that these components are inert, and such components should not be construed as an inert component of the catalyst composition.

An "organoaluminum compound," is used to describe any compound that contains an aluminum-carbon bond. Thus, organoaluminum compounds include, but are not limited to, hydrocarbyl aluminum compounds such as trihydrocarbyl-, dihydrocarbyl-, or monohydrocarbylaluminum compounds; hydrocarbylaluminum halide compounds; hydrocarbylaluminoxane compounds; and aluminate compounds which contain an aluminum-organyl bond such as tetrakis(p-tolyl) aluminate salts. An "organoboron" compound, an "organozinc compound," an "organomagnesium compound," and an "organolithium compound" are used in an analogous fashion to describe any compound that contains a direct metal-carbon bond between an organic group and the recited metal.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture." "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, are used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, allowed to react, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time.

As used herein, the term "sulfur oxoacid anion" in the context of suitable sulfur oxoacid anion sources that can be used to prepare the sulfur oxoacid anion-modified solid oxide, include both substituted including halide-substituted and non-substituted sulfur oxoacid anions. For example, the term "sulfur oxoacid anion" is intended to include but not be limited to, sulfate, bisulfate, fluorosulfate, alkyl sulfonate (for example, mesylate or methanesulfonate), aryl sulfonate (for example, tosylate or toluenesulfonate), fluoroalkyl sulfonate (for example, triflate or trifluoromethanesulfonate), fluoroaryl sulfonate (for example, for example, $[CF_3C_6H_4SO_3]^-$), and thiosulfate, and any combination thereof. For example, the alkyl sulfonate can be a $C_1$-$C_{10}$ alkyl sulfonate, the aryl sulfonate can be a $C_6$-$C_{14}$ aryl sulfonate, the fluoroalkyl sulfonate can be a $C_1$-$C_{10}$ fluoroalkyl sulfonate, and the fluoroaryl sulfonate can be a $C_6$-$C_{14}$ fluoroaryl sulfonate.

Also as used herein, the term "phosphorus oxoacid anion" in the context of suitable phosphorus oxoacid anion sources that can be used to prepare the phosphorus oxoacid anion-modified solid oxide, include both substituted including halide-substituted and non-substituted phosphorus oxoacid anions. For example, the term "phosphorus oxoacid anion" is intended to include but not be limited to, phosphate, monofluorophosphate, difluorophosphate, or similar anions, or any combination thereof. Unless specified otherwise, the term "fluorophosphate" or "fluorophosphates" include both monofluorophosphate ($[PO_3F]^{2-}$) and difluorophosphate ($[PO_2F_2]^-$).

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Catalyst Compositions

The present invention is directed generally to new metallocene compounds, new catalyst systems and catalyst compositions comprising the metallocene compounds, methods for preparing the catalyst compositions, methods for using the catalyst compositions to polymerize olefins, the polymer resins produced using such catalyst compositions, and articles produced using these polymer resins.

In an aspect, the subject metallocene compound, referred to herein as a first metallocene, can produce low molecular weight (MW) polyethylene with very low levels of short chain branching, even in the presence of significant concentrations of an α-olefin co-monomer. In a further aspect, this disclosure provides a process for polymerizing olefins comprising contacting at least one olefin monomer and a catalyst composition comprising a first metallocene compound. In some embodiments, the catalyst composition can further comprise a second metallocene compound, which under polymerization conditions forms an olefin polymer. The catalyst compositions can further comprise a co-catalyst such as an organoaluminum compound, an activator such as a solid oxide treated with an electron-withdrawing anion (activator-support), or both.

Accordingly, in aspects of this disclosure, the metallocene which can produce low molecular weight polyethylene having low levels of short chain branching, generally referred to as a first metallocene compound, having the formula:

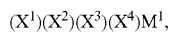

$(X^1)(X^2)(X^3)(X^4)M^1$, wherein
- $M^1$ is titanium, zirconium, or hafnium;
- $X^1$ is a substituted indenyl ligand wherein at least one substituent is a halogen-substituted $C_1$-$C_{20}$ hydrocarbyl group comprising at least two halogen atoms;
- $X^2$ is [1] a substituted or unsubstituted cyclopentadienyl ligand which is absent a halogen-substituted hydrocarbyl group, or [2] a substituted or unsubstituted indenyl ligand;
- wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and
- $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

This disclosure also provides a catalyst composition comprising the first metallocene compound. The substituted indenyl ligand $X^1$ of the first metallocene contains at least one substituent which is a halogen-disubstituted $C_1$-$C_{20}$ hydrocarbyl group such as a fluorinated, chlorinated, or brominated $C_1$-$C_{20}$ hydrocarbyl group. In an aspect, the substituted indenyl ligand $X^1$ of the first metallocene can contain at least one substituent which is a $C_1$-$C_{20}$ hydrocarbyl group substituted with at least two fluorine atoms. The ligand $X^2$ can be a substituted or unsubstituted cyclopentadienyl ligand, but when the cyclopentadienyl ligand is substituted, it is not substituted with halogen-substituted hydrocarbyl group, that is, it is absent any halogen-substituted hydrocarbyl group. Alternatively, the ligand $X^2$ can be a substituted or unsubstituted indenyl ligand, and when substituted, this indenyl ligand can contain any type of substituent, including a halogen-substituted hydrocarbyl group.

In an aspect, the catalyst composition comprising the first metallocene compound can further comprise a second metallocene compound having the formula:

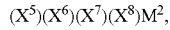

$(X^5)(X^6)(X^7)(X^8)M^2$, wherein
- $M^2$ is titanium, zirconium, or hafnium;
- $X^5$ is a substituted cyclopentadienyl, indenyl, or fluorenyl ligand, wherein any non-bridging substituent, when present, is selected independently from a $C_1$-$C_{12}$ hydrocarbyl group;
- $X^6$ is a substituted indenyl or fluorenyl ligand, wherein any non-bridging substituent, when present, is selected independently from a $C_1$-$C_{12}$ hydrocarbyl group or a $C_1$-$C_{12}$ heterohydrocarbyl group;
- wherein $X^5$ and $X^6$ are each substituted by a bridging group selected from $(>ER^B_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and
- $X^7$ and $X^8$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

In this aspect, the second metallocene includes a bridging moiety between the ligand $X^5$ which is a substituted cyclopentadienyl, indenyl, or fluorenyl ligand, and $X^6$ which is a substituted indenyl or fluorenyl ligand. That is, both $X^5$ and $X^6$ are substituted by a bridging group selected from $(>ER^B_2)_x$ or $>BR^B$, wherein x is an integer from 1 to 3. Both $X^5$ and $X^6$ can have additional substituents. Therefore, describing these ligands as substituted refers to the required bridging moiety bonded to both $X^5$ and $X^6$, as well as any other substituents in addition to the bridging moiety that are optionally present.

In an aspect, the catalyst composition comprising the first metallocene and optionally the second metallocene can further comprise a co-catalyst, an activator such as an activator-support or an aluminoxane. For example, there is provided a catalyst composition for polymerizing olefins, the catalyst composition comprising a first metallocene compound having the formula $(X^1)(X^2)(X^3)(X^4)M^1$, as described herein, wherein the catalyst composition further comprises b) optionally, a co-catalyst comprising an organoaluminum compound, an organoboron compound, an organozinc compound, an organomagnesium compound, an organolithium compound, or any combination thereof; and/or c) an activator comprising a solid oxide treated with an electron-withdrawing anion, an aluminoxane compound, an organoboron compound, an organoborate compound, an ionizing ionic compound, or any combination thereof. The solid oxide treated with an electron-withdrawing anion may also be termed simply a chemically-treated solid oxide.

The First Metallocene

The first metallocene compound can have the formula: $(X^1)(X^2)(X^3)(X^4)M^1$, wherein $M^1$, $X^1$, $X^2$, $X^3$ and $X^4$ are selected as follows: a) $M^1$ can titanium, zirconium, or hafnium; b) $X^1$ can be a substituted indenyl ligand wherein at least one substituent is a halogen-substituted $C_1$-$C_{20}$ hydrocarbyl group comprising at least two halogen atoms; c) $X^2$ can be [1] a substituted or unsubstituted cyclopentadienyl ligand which is absent a halogen-substituted hydrocarbyl group, or [2] a substituted or unsubstituted indenyl ligand; wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and d) $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

The Applicant has unexpectedly discovered that the when a metallocene indenyl ligand $X^1$ contains at least one substituent which is a halogen-substituted $C_1$-$C_{20}$ hydrocarbyl group such as $C_1$-$C_{20}$ hydrocarbyl group substituted with at least two fluorine, chlorine, or bromine substituents independently selected, the catalyst composition comprising this metallocene (the "first" metallocene) can produce low molecular weight polyethylene with unexpectedly low levels of short chain branching, even in the presence of significant concentrations of an α-olefin co-monomer. Polymers having these properties can occur when [1] the metallocene comprises one indenyl ligand $X^1$ which contains a halogen-disubstituted $C_1$-$C_{20}$ hydrocarbyl group as a substituent, and [2] when the ligand $X^2$ is a cyclopentadienyl ligand, $X^2$ is absent a halogen-substituted hydrocarbyl group. The presence of a halogen-substituted hydrocarbyl group on $X^2$ when $X^2$ is an indenyl ligand still provides the desirable low levels of short chain branching, but not when $X^2$ is a cyclopentadienyl ligand.

In an aspect, the substituted indenyl ligand $X^1$ containing a halogenated substituent is absent a halogen substituent which is bonded directly to the indenyl ligand. In another aspect, the $X^2$ ligand, or both $X^1$ and $X^2$ are absent a halogen substituent which is bonded directly to the indenyl ligand.

In an aspect, the $M^1$ in the first metallocene can be Ti; alternatively, $M^1$ can be Zr; alternatively, $M^1$ can be Hf; alternatively, $M^1$ can be Ti or Zr; alternatively, $M^1$ can be Ti or Hf; alternatively, $M^1$ can be Zr or Hf; or alternatively, $M^1$ can be Ti, Zr, or Hf.

According to a further aspect, the groups $X^3$ and $X^4$ of the first metallocene can be independently selected from F, Cl, Br, a $C_1$-$C_{12}$ hydrocarbyloxide group, a $C_1$-$C_{12}$ hydrocarbylamino group, or a trihydrocarbylsilyl group wherein each hydrocarbyl is independently a $C_1$-$C_{12}$ hydrocarbyl group.

The halogen-substituted hydrocarbyl substituent of $X^1$ of the first metallocene can be selected from a $C_1$-$C_{20}$ hydrocarbyl group substituted with at least two fluoro-, chloro-, bromo-, or iodo-substituents, or a combination thereof independently selected. In some embodiments, the halogen-substituted hydrocarbyl substituent of $X^1$ is selected from a $C_1$-$C_{20}$ hydrocarbyl group or a $C_1$-$C_{12}$ hydrocarbyl group substituted with at least two fluoro-, chloro-, or bromo-substituents. In an aspect, the $X^1$ can be a substituted indenyl ligand wherein at least one substituent is a halogen-substituted $C_1$-$C_{20}$ hydrocarbyl group comprising 2, 3, 4, 5, 6, 7, 8, or more halogen atoms such as fluorine atoms, including ranges between any of these numbers, as allowed by the size and structure of a particular hydrocarbyl group. For example, when the halogen-substituted $C_1$-$C_{20}$ hydrocarbyl group is a phenyl group, the upper limit of halogen substituents is five (5) substituents, and the phenyl group can include 2, 3, 4, or 5 substituents. In embodiments, the halogen-substituted $C_1$-$C_{20}$ hydrocarbyl group can comprise from 2 to 8, from 2 to 7, from 2 to 6, from 2 to 5, from 2 to 4, or from 2 to 3 halogen atoms.

For example, in one aspect, the halogen-substituted hydrocarbyl substituent of $X^1$ of the first metallocene can be selected from $C_1$-$C_{20}$ aliphatic or $C_6$-$C_{20}$ aromatic group substituted with at least two fluoro-, chloro-, or bromo-substituents, or a combination thereof. In another aspect, the halogen-substituted hydrocarbyl substituent of $X^1$ of the first metallocene can be selected from a fluoro-disubstituted, chloro-disubstituted, or bromo-disubstituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl. In still a further aspect, the halogen-substituted hydrocarbyl substituent of $X^1$ of the first metallocene can be further substituted with at least one additional substituent selected from a $C_1$-$C_{12}$ hydrocarbyl group.

In some embodiments or aspects, the $X^1$ ligand of the first metallocene can be an indenyl ligand which can be substituted with a halogen-substituted hydrocarbyl group selected from: [1] —$C_6X^9{}_nH_{5-n}$ or —$CH_2C_6X^9{}_nH_{5-n}$, wherein n is an integer from 2 to 5; [2] —$(CH_2)_mCX^9{}_pH_{3-p}$, wherein m is an integer from 0 to 3 and wherein p is an integer from 2 to 3; or [3] —$C(CX^9{}_3)_q(CH_3)_{3-q}$ or —$C(CX^9{}_3)_qH_{3-q}$, wherein q is an integer from 2 to 3; and wherein $X^9$, in each occurrence, is selected independently from fluoro, chloro, or bromo.

As disclosed herein, in an aspect, the $X^2$ ligand of the first metallocene can be [1] a substituted or unsubstituted cyclopentadienyl ligand which is absent a halogen-substituted hydrocarbyl group, or [2] a substituted or unsubstituted indenyl ligand; wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group. For example, in one aspect, $X^2$ can be an indenyl ligand which is unsubstituted; alternatively, substituted with at least one $C_1$-$C_{20}$ hydrocarbyl group; alternatively, substituted with at least one halogen-substituted $C_1$-$C_{20}$ hydrocarbyl group; alternatively, substituted with at least one $C_1$-$C_{12}$ hydrocarbyl group; or alternatively, substituted with at least one halogen-substituted $C_1$-$C_{12}$ hydrocarbyl group.

In another aspect, the $X^2$ ligand of the first metallocene can be an indenyl ligand which is unsubstituted, substituted with at least one unsubstituted $C_1$-$C_{20}$ aliphatic or $C_6$-$C_{20}$ aromatic group, or substituted with at least one $C_1$-$C_{20}$ aliphatic or $C_6$-$C_{20}$ aromatic group substituted with at least one fluoro-, chloro-, or bromo-substituent, or a combination thereof. Further, $X^2$ can be an indenyl ligand which is substituted with at least one halogen-substituted hydrocarbyl substituent selected from $C_1$-$C_{12}$ aliphatic or $C_6$-$C_{10}$ aromatic group substituted with at least one fluoro-, chloro-, or bromo-substituent, or a combination thereof.

For example, in some aspects, the $X^2$ ligand of the first metallocene can be an indenyl ligand which is substituted with at least one halogen-substituted hydrocarbyl substituent selected from a fluoro-substituted, chloro-substituted, or bromo-substituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

In further aspects, the $X^2$ ligand of the first metallocene can be a cyclopentadienyl ligand which is unsubstituted. In another aspect, the $X^2$ ligand of the first metallocene can be a cyclopentadienyl ligand which is substituted with at least one $C_1$-$C_{20}$ hydrocarbyl group; or alternatively, substituted with at least one $C_1$-$C_{12}$ hydrocarbyl group. The $X^2$ ligand of the first metallocene can be a cyclopentadienyl ligand which is substituted with at least one $C_1$-$C_{20}$ aliphatic group; alternatively, substituted with at least one $C_6$-$C_{20}$ aromatic group; alternatively, substituted at least $C_1$-$C_{12}$ aliphatic group; or alternatively, substituted with at least one $C_6$-$C_{10}$ aromatic group. For example, in an aspect, the $X^2$ ligand of the first metallocene can be a cyclopentadienyl ligand which is substituted with at least one hydrocarbyl substituent selected independently from a $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

As disclosed herein, the $X^1$ ligand of the first metallocene can be a substituted indenyl ligand wherein at least one substituent is a halogen-substituted $C_1$-$C_{20}$ hydrocarbyl group comprising at least two halogen atoms, for example, a fluoride-disubstituted indenyl ligand. In an aspect, the halogen-substituted $C_1$-$C_{20}$ hydrocarbyl group comprises at least two halogen atoms and up to about 8 or more halogen atoms, depending upon the size and structure of the $C_1$-$C_{20}$ hydrocarbyl group. Further, the $X^2$ ligand of the first metallocene can be a substituted or an unsubstituted indenyl ligand, for example, $X^2$ can be an indenyl ligand which is substituted with at least one $C_1$-$C_{20}$ aliphatic or $C_6$-$C_{20}$ aromatic group substituted with at least one fluoro-, chloro-, or bromo-substituent, or a combination thereof. For example:

$X^1$ can be an indenyl ligand which is substituted with a group selected independently from

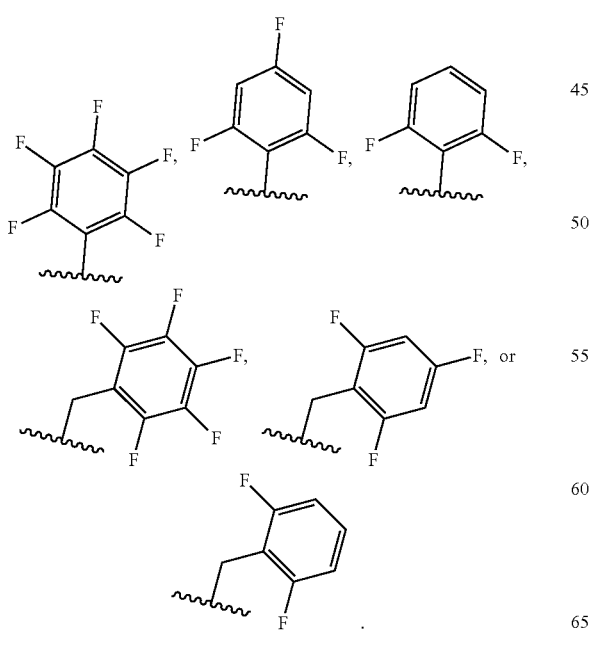

and/or $X^2$ can be an indenyl ligand which is substituted with a group selected independently from Examples of the first metallocene, in some embodiments, can include but are not limited to:

IE-1

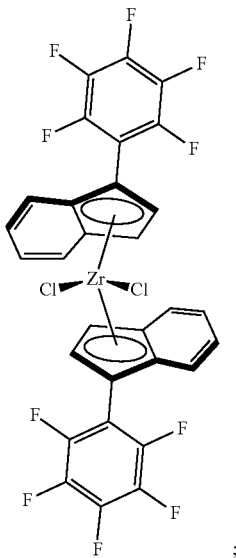

IE-2

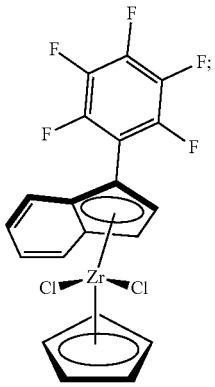

IE-3

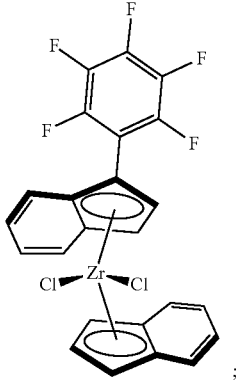

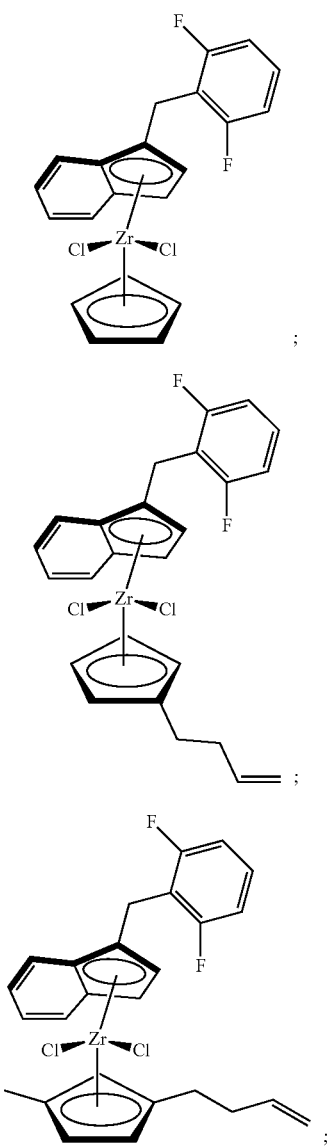

or any combination thereof. For example, in an aspect, the first metallocene compound can be:

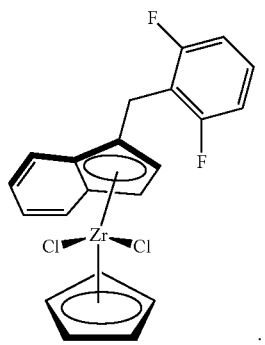
IE-4

In some aspects, $X^3$ and $X^4$ can be independently selected from a halide, F, Cl, Br, a $C_1$-$C_{12}$ hydrocarbyloxide group, a $C_1$-$C_{12}$ hydrocarbylamino group, or a trihydrocarbylsilyl group wherein each hydrocarbyl of these groups is independently selected from a $C_1$-$C_{12}$ hydrocarbyl group. In some aspects, each hydrocarbyl of these groups can be independently selected from a $C_1$-$C_{20}$ hydrocarbyl group.

The Second Metallocene

The second metallocene compound can have the formula $(X^5)(X^6)(X^7)(X^8)M^2$, wherein wherein $M^2$, $X^5$, $X^6$, $X^7$ and $X^8$ are selected as follows: a) $M^2$ can be titanium, zirconium, or hafnium; b) $X^5$ can be a substituted cyclopentadienyl, indenyl, or fluorenyl ligand, wherein any non-bridging substituent, when present, is selected independently from a $C_1$-$C_{12}$ hydrocarbyl group; c) $X^6$ can be a substituted fluorenyl ligand, wherein any non-bridging substituent, when present, is selected independently from a $C_1$-$C_{12}$ hydrocarbyl group or a $C_1$-$C_{12}$ heterohydrocarbyl group; wherein $X^5$ and $X^6$ can each be substituted by a bridging group selected from (>$ER^B_2$)$_x$ or >$BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and d) $X^7$ and $X^8$ can be independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

In the bridging groups (>$ER^B_2$)$_x$ or >$BR^B$, x is an integer from 1 to 3, in each occurrence in (>$ER^B_2$)$_x$, E is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group. In another aspect, (>$ER^B_2$)$_x$ can be (—$CR^B_2CR^B_2$—), (—$SiR^B_2SiR^B_2$—), (—$CR^B_2SiR^B_2$—), (—$CR^B_2CR^B_2CR^B_2$—), (—$SiR^B_2CR^B_2CR^B_2$—), (—$CR^B_2SiR^B_2CR^B_2$—), (—$SiR^B_2CR^B_2SiR^B_2$—), (—$SiR^B_2SiR^B_2CR^B_2$—), or (—$SiR^B_2SiR^B_2SiR^B_2$—). Examples of the bridging groups (>$ER^B_2$)$_x$ or >$BR^B$ include, but are not limited to, >$CMe_2$, >$CPh_2$, >CHMe, >CHPh, >CH(tolyl), >CMeEt, >CMe(CH$_2$CH$_2$CH$_3$), >CMe(CH$_2$CH$_2$CH$_2$CH$_3$), >CH(CH$_2$CH$_2$CH=CH$_2$), >CMe(CH$_2$CH$_2$CH=CH$_2$), >CEt(CH$_2$CH$_2$CH=CH$_2$), >CPh(CH$_2$CH$_2$CH=CH$_2$), >SiMe$_2$, >SiPh$_2$, >SiEt$_2$, >Si(tolyl)$_2$, (—CH$_2$CH$_2$—), (—CMe$_2$CMe$_2$-), (—CH$_2$CH$_2$CH$_2$—), (—CH$_2$SiMe$_2$CH$_2$—), (—CH$_2$SiPh$_2$CH$_2$—), (—SiMe$_2$SiMe$_2$-), >BMe, >BEt, >BPh, >B(tolyl), and the like (Me is methyl, Et is ethyl, Ph is phenyl).

In an aspect, $X^5$, in addition to comprising the bridging substituent, can be [1] otherwise unsubstituted or [2] substituted with a $C_1$-$C_{12}$ hydrocarbyl group. In embodiments, $X^5$ can be a cyclopentadienyl ligand which, in addition to comprising the bridging substituent, is [1] otherwise unsubstituted or [2] substituted with a $C_1$-$C_6$ alkyl or $C_2$-$C_8$ alkenyl group.

In one aspect, $X^6$ can be a fluorenyl ligand substituted with two substituents selected independently from a $C_1$-$C_{12}$ hydrocarbyl group, in addition to the bridging substituent. In embodiments, $X^6$ can be a fluorenyl ligand and wherein $R^B$ is selected independently from a $C_1$-$C_6$ alkyl or $C_2$-$C_8$ alkenyl group.

According to an aspect, the second metallocene compound can comprises, consists essentially of, consists of, or is selected from a metallocene compound having the formula:

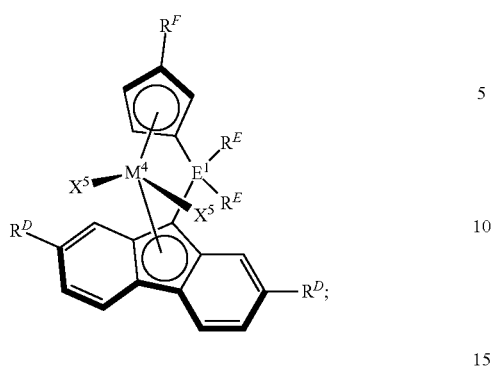

wherein:

M⁴ is zirconium or hafnium;

X⁵ in each occurrence is independently F, Cl, Br, I, H, methyl, benzyl, phenyl, or methoxy;

$R^D$ in each occurrence is selected independently from H, $C_1$-$C_{12}$ alkyl, $C_2$-$C_{12}$ alkenyl, $C_6$-$C_{10}$ aryl, $C_7$-$C_{12}$ aralkyl, or $C_1$-$C_{12}$ hydrocarbyloxide;

E is C or Si;

$R^E$ in each occurrence is selected independently from H, $C_1$-$C_{12}$ alkyl, $C_2$-$C_{12}$ alkenyl, $C_6$-$C_{10}$ aryl, or $C_7$-$C_{12}$ aralkyl; and $R^F$ is selected independently from H, $C_1$-$C_{12}$ alkyl, $C_2$-$C_{12}$ alkenyl, $C_6$-$C_{10}$ aryl, or $C_7$-$C_{12}$ aralkyl.

In some aspects and embodiments, the second metallocene compound can comprises, consists essentially of, consists of, or is selected from a metallocene compound having the formula:

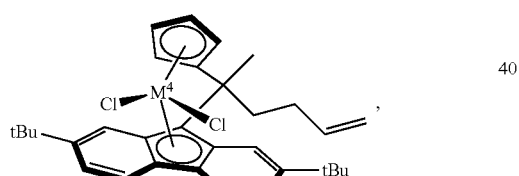

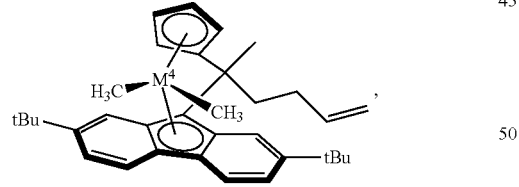

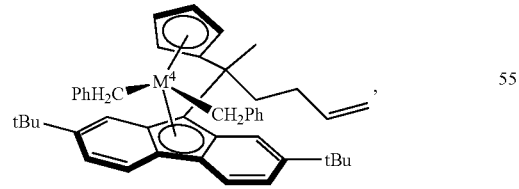

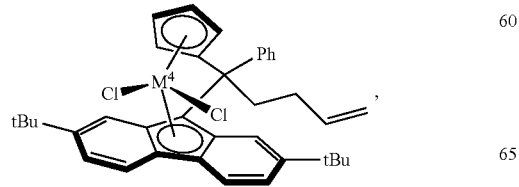

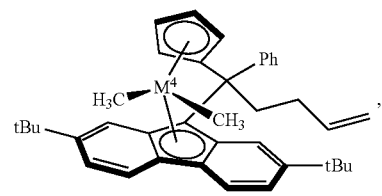

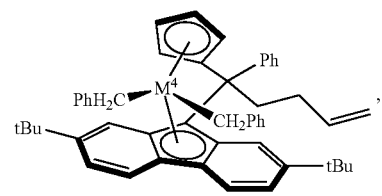

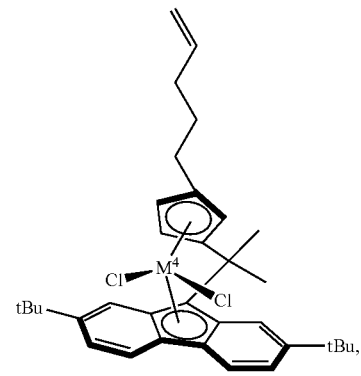

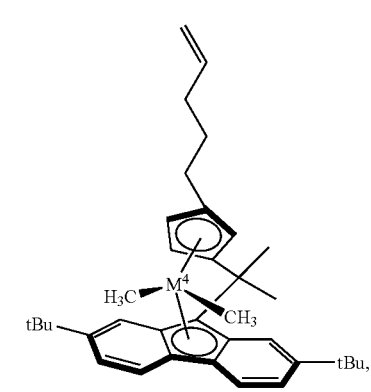

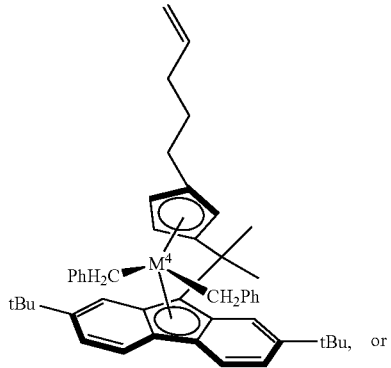

-continued

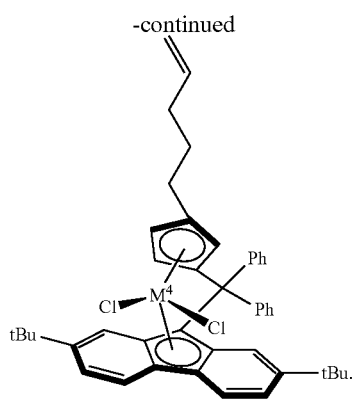

In some aspects, the second metallocene compounds can comprises, consists essentially of, consists of, or is selected from a metallocene compound such as disclosed in U.S. Pat. Nos. 7,763,561, 7,312,283, 8,268,944, 8,507,621, 8,703,886, and 10,239,975, each of which is incorporated herein by reference. In another aspect, the second metallocene compounds can be selected from an ansa-metallocene compound such as disclosed in the U.S. patents incorporated herein by reference.

The Co-Catalyst

One aspect of this disclosure provides a catalyst composition and a process for producing an olefin polymer composition, in which the catalyst composition and process can utilize a co-catalyst. In some aspects, the co-catalyst can be optional. While not intending to be bound by theory, it is thought that in some embodiments, for example when a metallocene comprises a ligand such as an alkyl ligand, a co-catalyst may not be required. That is, when the contact product of the metallocene and an activator can initiate olefin polymerization without any further alkylation or treatment of the metallocene. However, even in cases in which polymerization activity can be initiated without the addition of a co-catalyst as a component of the catalyst composition, it may be desirable to include a co-catalyst in the catalyst composition.

When parameters such as molar ratios are disclosed, for example when referring to the molar ratio of any co-catalyst or combination of co-catalysts to the metallocene compound, the molar ratios are intended to reflect the total moles of the first metallocene compound and the second metallocene compound, when present.

One aspect of this disclosure provides for a catalyst composition for polymerizing olefins and a process for polymerizing olefins using a catalyst composition, comprising contacting at least one olefin and a catalyst composition, wherein the catalyst composition can comprise a metallocene compound and optionally a co-catalyst. In any embodiment provided here, the catalyst composition can further comprise an activator, such as a solid oxide treated with an electron-withdrawing anion, an organoboron compound, an organoborate compound, an ionizing ionic compound, an aluminoxane compound, or any combination thereof.

In an aspect, for example, the co-catalyst can comprise, consist of, consist essentially or, or can be selected from an organoaluminum compound, an organoboron compound, an organozinc compound, an organomagnesium compound, an organolithium compound, or any combination thereof. In another aspect, the co-catalyst can comprise or can be selected from an organoaluminum compound, an organozinc compound, an organomagnesium compound, an organo-lithium compound, or any combination thereof. Examples of co-catalysts include, but are not limited to:

a) $M^3(X^{10})_n(X^1)_{3-n}$, wherein $M^3$ is boron or aluminum and n is from 1 to 3 inclusive;
b) $M^4(X^{10})_n(X^{11})_{2-n}$, wherein $M^4$ is magnesium or zinc and n is from 1 to 2 inclusive; and/or
c) $M^5X^{10}$, wherein $M^5$ is Li;

wherein
i) $X^{10}$ is independently hydride or a $C_1$ to $C_{20}$ hydrocarbyl; and
ii) $X^{11}$ is independently a halide, a hydride, a $C_1$ to $C_{20}$ hydrocarbyl, or a $C_1$ to $C_{20}$ hydrocarbyloxide.

For example, the co-catalyst can comprise, consist of, consist essentially of, or be selected from an organoaluminum compound having a formula $Al(X^{12})_s(X^{13})_{3-s}$, wherein $X^{12}$ is independently a $C_1$ to $C_{12}$ hydrocarbyl, $X^{11}$ is independently a halide, a hydride, or a $C_1$ to $C_{12}$ hydrocarboxide, and s is an integer from 1 to 3 (inclusive).

In an aspect, the co-catalyst can comprise or can be selected from an organoaluminum compound, wherein the organoaluminum compound can comprise, can consist essentially of, or can be selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof. For example, the co-catalyst can comprise, consist of, consist essentially of, or be selected from triethylaluminum, triisobutylaluminum, diethylaluminum ethoxide, diethylaluminum chloride, or any combination thereof.

In a further aspect, the catalyst composition and/or the reaction mixture to prepare and use the catalyst composition can be substantially free of aluminoxane compounds, organoboron or organoborate compounds, ionizing ionic compounds, or combinations thereof. That is, "substantially free" is used to indicated that none of the recited compounds is intentionally added into the catalyst composition or reaction system. In another aspect, the catalyst composition and/or the reaction mixture to prepare and use the catalyst composition can be substantially free of aluminoxane compounds, meaning that no aluminoxane or reagents which form aluminoxane in the presence of an aluminum hydrocarbyl compound (such as water) are intentionally added to the catalyst composition.

Compounds which can constitute a co-catalyst are described in more detail below.

Organoaluminum Compounds

One aspect of this disclosure provides a catalyst composition and a process for producing an olefin polymer composition, in which the catalyst composition and process can utilize a co-catalyst such as an organoaluminum compound. In a further aspect of any embodiment provided here, the catalyst composition can comprise, either in combination with the chemically-treated solid oxide or any other activators or alone, at least one organoaluminum compound.

Organoaluminum compounds that can be used in the catalyst composition of this disclosure include but are not limited to compounds having the formula:

$$Al(X^{10})_n(X^{11})_{3-n}.$$

In an embodiment, each $X^{10}$ can be independently a $C_1$ to $C_{20}$ hydrocarbyl; alternatively, a $C_1$ to $C_{10}$ hydrocarbyl; alternately, a $C_6$ to $C_{20}$ aryl; alternatively, a $C_6$ to $C_{10}$ aryl; alternatively, a $C_1$ to $C_{20}$ alkyl; alternatively, a $C_1$ to $C_{10}$ alkyl; or alternatively, a $C_1$ to $C_5$ alkyl. In an embodiment, each $X^{11}$ can be independently a halide, a hydride, or a $C_1$ to $C_{20}$ hydrocarboxide; alternatively, a halide, a hydride, or a $C_1$ to $C_{10}$ hydrocarboxide; alternatively, a halide, a hydride, or a $C_6$ to $C_{20}$ aryloxide; alternatively, a halide, a hydride, or a $C_6$ to $C_{10}$ aryloxide; alternatively, a halide, a hydride, or a $C_1$ to $C_{20}$ alkoxide; alternatively, a halide, a hydride, or a $C_1$ to $C_{10}$ alkoxide; alternatively, a halide, a hydride, or, or a $C_1$ to $C_5$ alkoxide. In an embodiment, n can be a number (whole or otherwise) from 1 to 3, inclusive. In another aspect and in any embodiment, organoaluminum compounds that can be used in the catalyst composition of this disclosure include but are not limited to compounds having the formula:

$$Al(X^{10})_n(X^{11})_{3-n};$$

wherein
$X^{10}$ can be a hydrocarbyl having from 1 to about 20 carbon atoms;
$X^{11}$ can be selected from alkoxide or aryloxide, any one of which having from 1 to about 20 carbon atoms, halide, or hydride; and
n can be a number (whole or otherwise) from 1 to 3, inclusive.

For example, $X^{10}$ can be selected independently from a $C_1$ to $C_{12}$ hydrocarbyl, $X^{11}$ can be selected independently from a halide, a hydride, or a $C_1$ to $C_{12}$ hydrocarboxide, and s can be an integer from 1 to 3 (inclusive).

In one aspect of the formula $Al(X^{10})_n(X^{11})_{3-n}$, $X^{10}$ can be an alkyl having from 1 to about 10 carbon atoms. Examples of $X^{10}$ alkyl group are described herein and may be utilized to describe the alkyl aluminum compounds without limitation. In an aspect, $X^{11}$ may be independently selected from fluoro or chloro. In yet another aspect, $X^{11}$ may be chloro.

In the formula $Al(X^{10})_n(X^{11})_{3-n}$ can be a number (whole or otherwise) from 1 to 3 inclusive, and typically, n is 2 or s is 3. The value of n is not restricted to be an integer, therefore this formula includes sesquihalide compounds or other organoaluminum cluster compounds.

Generally, examples of organoaluminum compounds that can be used in this disclosure include, but are not limited to, trialkylaluminum compounds, dialkylaluminium halide compounds, alkylaluminum dihalide compounds, dialkyl-aluminum alkoxide compounds, dialkylaluminum hydride compounds, and combinations thereof. Specific examples of organoaluminum compounds that are useful in this disclosure include, but are not limited to: trimethylaluminum (TMA), triethylaluminum (TEA), ethylaluminum dichloride, tripropylaluminum, diethylaluminum ethoxide, tributylaluminum, diisobutylaluminum hydride, triisobutylaluminum, diethylaluminum chloride (DEAC), and combinations thereof.

In one aspect, the present disclosure provides for precontacting the metallocene compound with at least one organoaluminum compound and an olefin monomer to form a precontacted mixture, prior to contact this precontacted mixture with the solid oxide activator-support to form the active catalyst. When the catalyst composition is prepared in this manner, typically, though not necessarily, a portion of the organoaluminum compound can be added to the precontacted mixture and another portion of the organoaluminum compound can be added to the postcontacted mixture prepared when the precontacted mixture can be contacted with the solid oxide activator. However, all the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this disclosure.

In one aspect and in any embodiment disclosed herein, the molar ratio of the organoaluminum compound to the metallocene compound can be from 0.001:1 to 100,000:1. Alternatively and in any embodiment, the molar ratio of the organoaluminum compound to the metallocene compound can be from 0.01:1 to 10,000:1; alternatively from 0.1:1 to 100:1; alternatively, from 0.5:1 to 10:1; or alternatively, from 0.2:1 to 5:1. When referring to the molar ratio of the organoaluminum compound or any other co-catalyst to the metallocene compound, the molar ratios are intended to reflect the total moles of the first metallocene compound and the second metallocene compound, when present.

Organozinc and Organomagnesium Compounds

In an aspect, the co-catalyst of this disclosure can comprise, consist of, consist essentially or, or be selected from an organozinc compound, an organomagnesium compound, or a combination thereof. Organozinc compounds and organomagnesium compounds that can be used in the catalyst composition of this disclosure include but are not limited to compounds having the formula:

$$M^4X^{12}X^{13},$$

wherein $M^4$ is magnesium or zinc. In an embodiment, each $X^{12}$ is independently a $C_1$ to $C_{20}$ hydrocarbyl; alternatively, a $C_1$ to $C_{10}$ hydrocarbyl; alternatively, a $C_6$ to $C_{20}$ aryl; alternatively, a $C_6$ to $C_{10}$ aryl; alternatively, a $C_1$ to $C_{20}$ alkyl; alternatively, a $C_1$ to $C_{10}$ alkyl; or alternatively, $C_1$ to $C_5$ alkyl. In an embodiment, each $X^{13}$ is independently a halide, a hydride, or a $C_1$ to $C_{20}$ hydrocarbyl; alternatively, a halide, a hydride, or a $C_1$ to $C_{10}$ hydrocarbyl; alternatively, a halide, a hydride, or a $C_6$ to $C_{20}$ aryl; alternatively, a halide, a hydride, or a $C_6$ to $C_{10}$ aryl; alternatively, a halide, a hydride, or a $C_1$ to $C_{20}$ alkyl; alternatively, a halide, a hydride, or a $C_1$ to $C_{10}$ alkyl; alternatively, a halide, a hydride, or a $C_1$ to $C_5$ alkyl; alternatively, a halide, a hydride, or a $C_1$ to $C_{20}$ hydrocarboxide; alternatively, a halide, a hydride, or a $C_1$ to $C_{10}$ hydrocarboxide; alternatively, a halide, a hydride, or a $C_6$ to $C_{20}$ aryloxide; alternatively, a halide, a hydride, or a $C_6$ to $C_{10}$ aryloxide; alternatively, a halide, a hydride, or a $C_1$ to $C_{20}$ alkoxide; alternatively, a halide, a hydride, or a $C_1$ to $C_{10}$ alkoxide; or alternatively, a halide, a hydride, or a $C_1$ to $C_5$ alkoxide.

In a further aspect and in any disclosed embodiment, the catalyst composition can further comprise an organozinc or organomagnesium co-catalyst, selected from a compound with the following formula:

$$M^4X^{12}X^{13};$$

wherein:
M$^4$ is Zn or Mg;
X$^{12}$ is a hydrocarbyl having from 1 to about 20 carbon atoms; and
X$^{13}$ is selected from a hydrocarbyl, an alkoxide, or an aryloxide having from 1 to about 20 carbon atoms, halide, or hydride.

In another aspect, and in the various embodiments of this disclosure, useful organozinc compounds can be selected from or alternatively can comprise dimethylzinc, diethylzinc, dipropylzinc, dibutylzinc, dineopentylzinc, di(trimethylsilylmethyl)zinc, and the like, including any combinations thereof; alternatively, dimethylzinc; alternatively, diethylzinc; alternatively, dipropylzinc; alternatively, dibutylzinc; alternatively, dineopentylzinc; or alternatively, di(trimethylsilylmethyl)zinc.

In one aspect and in any embodiment disclosed herein, the molar ratio of the organozinc compound to the metallocene compound can be from 0.001:1 to 100,000:1. Alternatively and in any embodiment, the molar ratio of the organozinc compound to the metallocene compound can be from 0.01:1 to 10,000:1; alternatively from 0.1:1 to 100:1; alternatively, from 0.5:1 to 10:1; or alternatively, from 0.2:1 to 5:1. As indicated previously, the molar ratios are intended to reflect the total moles of the first metallocene compound and the second metallocene compound, when present.

Activators

The activators according to this disclosure can comprise, consist of, consist essentially of, or be selected independently from a solid oxide treated with an electron-withdrawing anion, an organoboron compound, a borate or an organoborate compound, an ionizing ionic compound, an aluminoxane compound, or any combination thereof.

Activator-Support (Chemically-Treated Solid Oxide)

The activator-support that is used in the processes and the catalyst composition can comprise, consist essentially of, or can be selected from a solid oxide chemically-treated with an electron withdrawing anion, also termed a "chemically-treated solid oxide". That is, any solid oxide or combinations of solid oxides disclosed herein that have been contacted and/or chemically-treated with any electron-withdrawing anion or combinations of electron-withdrawing anions disclosed herein can be used. Each of these components is set out in more detail below. Generally, examples of solid oxide that can be used in this disclosure include, but are not limited to, silica, alumina, silica-alumina, silica-coated alumina, aluminum phosphate, mullite, silica-zirconia, silica-titania, or any combination thereof, and the like. Generally, examples of the electron withdrawing anions that can be used in accordance with this disclosure include, but are not limited to, fluoride, chloride, phosphate, triflate, sulfate, bisulfate, and the like. Therefore sources of these anions are used in preparing the chemically-treated solid oxide.

According to a further aspect, in the processes or catalyst composition disclosed herein, the solid oxide chemically-treated with an electron withdrawing anion can comprise, consist essentially of, or be selected from at least one solid oxide treated with at least two electron-withdrawing anions, and the at least two electron-withdrawing anions can comprise, consist essentially of, or be selected from fluoride and phosphate, fluoride and sulfate, chloride and phosphate, chloride and sulfate, triflate and sulfate, or triflate and phosphate.

In an aspect, the solid oxide treated with an electron-withdrawing anion can comprise a sulfur oxoacid anion-modified solid oxide, a phosphorus oxoacid anion-modified solid oxide, or a halide ion-modified solid oxide. In another aspect, the solid oxide treated with an electron-withdrawing anion can be generated by treatment of a solid oxide with an acid or a salt of an electron-withdrawing anion. In an aspect, following treatment of the solid oxide with the acid or the salt of an electron-withdrawing anion, the solid oxide treated with an electron-withdrawing anion can be dried and calcined.

While further details of a chemically-treated solid oxide are set out below, generally, a wide range of solid oxides and sources of electron-withdrawing anions can be used to prepare the chemically-treated solid oxide. For example, in various aspects: 1) the solid oxide chemically-treated with an electron withdrawing anion can have a surface area from about 100 m$^2$/g to about 1000 m$^2$/g, a pore volume from about 0.25 mL/g to about 3.0 mL/g, and an average particle size from about 5 microns to about 150 microns; 2) the solid oxide chemically-treated with an electron withdrawing anion can have a pore volume from about 0.5 mL/g to about 2.5 mL/g; and/or the solid oxide chemically-treated with an electron withdrawing anion can have a surface area from about 150 m$^2$/g to about 700 m$^2$/g.

The term "chemically-treated solid oxide" is used interchangeably with "activator support" and similar terms such as, "solid oxide treated with an electron-withdrawing anion," "treated solid oxide," or "solid super acid," which is also termed "SSA." While not intending to be bound by theory, it is thought that the chemically-treated solid oxide can serve as an acidic activator-support. In an aspect, the chemically-treated solid oxide typically can be used in combination with a co-catalyst such as an organoaluminum compound or similar activating agent or alkylating agent. In another aspect, the metallocene compound can be "pre-activated" by, for example, being alkylated prior to its use in the catalyst composition, prior to contacting the chemically-treated solid oxide.

In one aspect of this disclosure, the catalyst composition can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of this disclosure, the catalyst composition can comprise a chemically-treated solid oxide comprising a solid oxide treated with an electron-withdrawing anion, wherein: the solid oxide comprises, consists of, consists essentially of, or is selected from silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, mullite, boehmite, heteropolytungstates, mixed oxides thereof, a pillared clay such as a pillared montmorillonite, or any combination thereof.

According to a further aspect, the catalyst composition can comprise a chemically-treated solid oxide comprising a solid oxide treated with an electron-withdrawing anion, wherein the electron-withdrawing anion comprises or is selected from fluoride, chloride, bromide, iodide, sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, trifluoroacetate, fluoroborate, fluorozirconate, fluorotitanate, or any combination thereof.

In this aspect, the activator-support can comprise, consist of, consist essentially of, or be selected from a solid oxide treated with an electron-withdrawing anion, wherein:
a) the solid oxide comprises, consists of, consists essentially of, or is selected from silica, alumina, silica-alumina, silica-coated alumina, mullite, aluminum phosphate, aluminophosphate, heteropolytungstate, titania, zirconia, magnesia, boria, zinc oxide, a mixed oxide thereof, or any mixture thereof; and
b) the electron-withdrawing anion comprises, consists of, consists essentially of, or is selected from sulfate, bisulfate, fluorosulfate, phosphate, fluorophosphates, fluoride, or chloride.

In another aspect, the catalyst composition can comprise a chemically-treated solid oxide comprising a solid oxide treated with an electron-withdrawing anion, wherein: the solid oxide is selected from silica, alumina, silica-alumina, silica-coated alumina, titania, zirconia, mullite, mixed oxides thereof, or mixtures thereof; and the electron-withdrawing anion is selected from fluoride, chloride, bisulfate, sulfate, or any combination thereof.

In a further aspect, the solid oxide treated with an electron withdrawing anion can comprise at least one solid oxide treated with at least two electron-withdrawing anions, and wherein the at least two electron-withdrawing anions comprise fluoride and phosphate, fluoride and sulfate, chloride and phosphate, chloride and sulfate, triflate and sulfate, or triflate and phosphate, or any combination of two electron-withdrawing anions or sources for electron-withdrawing anions disclosed herein.

According to a further aspect, the solid oxide treated with an electron-withdrawing anion can be generated by treatment of a solid oxide with sulfuric acid, sulfate ion, bisulfate ion, fluorosulfuric acid, fluorosulfate ion, phosphoric acid, phosphate ion, fluorophosphoric acid, monofluorophosphate ion, triflic (trifluoromethanesulfonic) acid, triflate trifluoromethanesulfonate) ion, methanesulfonic acid, mesylate (methanesulfonate) ion, toluenesulfonic acid, tosylate (toluenesulfonate) ion, thiosulfate ion, $C_1$-$C_{10}$ alkyl sulfonic acid, $C_1$-$C_{10}$ alkyl sulfonate ion, $C_6$-$C_{14}$ aryl sulfonic acid, $C_6$-$C_{14}$ aryl sulfonate ion, fluoride ion, chloride ion, or any combination thereof. In an aspect, the solid oxide treated with an electron withdrawing anion comprises a sulfated solid oxide, bisulfated (hydrogen sulfated) solid oxide, fluorosulfated solid oxide, phosphated solid oxide, fluorophosphated solid oxide, fluoride solid oxide, or chloride solid oxide.

In an aspect, various examples of a solid oxide chemically-treated with an electron withdrawing anion (or "chemically-treated solid oxide" or CTSO) that can be used can comprise, can consist essentially of, or can be selected from fluorided alumina, chlorided alumina, bromided alumina, sulfated alumina, fluorided silica-alumina, chlorided silica-alumina, bromided silica-alumina, sulfated silica-alumina, fluorided silica-coated alumina, chlorided silica-coated alumina, bromided silica-coated alumina, fluorided silica-zirconia, chlorided silica-zirconia, bromided silica-zirconia, sulfated silica-zirconia, fluorided mullite, chlorided mullite, bromided mullite, sulfated mullite, or a pillared clay such as a pillared montmorillonite that is treated with fluoride, chloride, or sulfate, phosphated alumina, or other aluminophosphates treated with sulfate, fluoride, or chloride, or any combination of these activator-supports.

According to an aspect, the electron withdrawing anion can comprise or can be selected from a sulfur oxoacid anion-modified solid oxide generated by sulfuric acid treatment or sulfate ion treatment. In another aspect, the electron withdrawing anion comprises or is selected from a phosphorus oxoacid anion-modified solid oxide generated by phosphoric acid treatment or phosphate ion treatment. The solid oxide treated with an electron withdrawing anion can include any solid oxide or combinations of solid oxides disclosed herein, treated with any electron-withdrawing anion or combinations of electron-withdrawing anions disclosed herein. Further, the solid oxide treated with an electron-withdrawing anion can be produced by a process comprising contacting any suitable solid oxide and any suitable solid oxide with an electron-withdrawing anion to provide a mixture, and concurrently and/or subsequently drying and/or calcining the mixture.

Further, and in yet another aspect, the chemically-treated solid oxide can further comprise a metal or metal ion selected from zinc, nickel, vanadium, titanium, silver, copper, gallium, tin, tungsten, molybdenum, or any combination thereof. Therefore, in another aspect and in any embodiment of this disclosure, for example, the chemically-treated solid oxide can be selected from any chemically-treated solid oxide disclosed herein, which can further comprise a metal or metal ion selected from zinc, nickel, vanadium, silver, copper, gallium, tin, tungsten, molybdenum, or any combination thereof. By example, the activator-support can comprise, consist essentially or, or can be selected from fluorided alumina, chlorided alumina, sulfated alumina, fluorided silica-alumina, chlorided silica-alumina, sulfated silica-alumina, fluorided silica-coated alumina, chlorided silica-coated alumina, bromided silica-coated alumina, fluorided silica-zirconia, sulfated silica-zirconia, or any combination thereof, that further can further comprise a metal or metal ion selected from zinc, nickel, vanadium, tin, or any combination thereof.

In an aspect, the chemically-treated solid oxides that further comprise a metal or metal ion can comprise, consist essentially of, or be selected from zinc- or titanium-impregnated fluorided alumina, zinc- or titanium-impregnated chlorided alumina, zinc- or titanium-impregnated bromided alumina, zinc- or titanium-impregnated sulfated alumina, zinc- or titanium-impregnated fluorided silica-alumina, zinc- or titanium-impregnated chlorided silica-alumina, zinc- or titanium-impregnated bromided silica-alumina, zinc- or titanium-impregnated sulfated silica-alumina, chlorided zinc aluminate, fluorided zinc aluminate, bromided zinc aluminate, sulfated zinc aluminate, or any combination thereof. In another aspect, the chemically-treated solid oxides that further comprise a metal or metal ion can comprise, consist essentially of, or be selected from zinc- or titanium-impregnated fluorided silica-zirconia, zinc- or titanium-impregnated chlorided silica-zirconia, zinc- or titanium-impregnated bromided silica-zirconia, zinc- or titanium-impregnated sulfated silica-zirconia, zinc- or titanium-impregnated fluorided silica-coated alumina, zinc- or titanium-impregnated chlorided silica-coated alumina, zinc- or titanium-impregnated bromided silica-coated alumina, zinc- or titanium-impregnated sulfated silica-coated alumina, or any combination thereof.

In yet a further aspect and in any embodiment of this disclosure, the chemically-treated solid oxide can comprise the contact product of at least one solid oxide compound and at least one electron-withdrawing anion source. The solid oxide compound and electron-withdrawing anion source are described independently herein and may be utilized in any combination to further describe the chemically-treated solid oxide comprising the contact product of at least one solid oxide compound and at least one electron-withdrawing anion source. That is, the chemically-treated solid oxide is provided upon contacting or treating the solid oxide with the electron-withdrawing anion source. In one aspect, the solid oxide compound can comprise or alternatively be selected from, an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

While not intending to be bound by theory, the chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide may activate the metallocene compound in the absence of additional activators, additional activators may be utilized in the catalyst composition. By way of example, it may be useful to include an organoaluminum compound in the catalyst composition along with the metallocene compound(s) and chemically-treated solid oxide. The activation function of the activator-support is evident in the enhanced activity of catalyst composition as a whole, as compared to a catalyst composition containing the corresponding untreated solid oxide.

In one aspect, the chemically-treated solid oxide of this disclosure can comprise a solid inorganic oxide material, a mixed oxide material, or a combination of inorganic oxide materials, that is chemically-treated with an electron-withdrawing component, and optionally treated with a metal. Thus, the solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this disclosure. The solid inorganic oxide material, mixed oxide material, combination of inorganic oxide materials, electron-withdrawing component, and optional metal are independently described herein and may be utilized in any combination to further described the chemically-treated solid oxide.

In another aspect, the chemically-treated solid oxide of this disclosure can comprise a solid oxide of relatively high porosity, which exhibits Lewis acidic or Brønsted acidic behavior.

The solid oxide is chemically-treated with an electron-withdrawing component, typically an electron-withdrawing anion, to form an activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the oligomerization activities of the treated and untreated oxides under acid catalyzed reactions.

In one aspect, the chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements; alternatively, the chemically-treated solid oxide can comprise a solid inorganic oxide comprising oxygen and at least one element selected from Group 4, 5, 6, 12, 13, or 14 of the periodic table, or comprising oxygen and at least one element selected from the lanthanide elements. (See: *Hawley's Condensed Chemical Dictionary*, 11$^{st}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr; alternatively, the inorganic oxide can comprise oxygen and at least one element selected from Al, B, Si, Ti, P, Zn or Zr.

Further suitable examples of solid oxide materials or compounds that can be used in the chemically-treated solid oxide of the present disclosure include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, $Na_2O$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, $K_2O$, CaO, $La_2O_3$, $Ce_2O_3$, and the like, including mixtures thereof, mixed oxides thereof, and any combinations thereof. Alternatively, suitable examples of solid oxide materials or compounds that can be used in the chemically-treated solid oxide of the present disclosure include, but are not limited to, $Al_2O_3$, $B_2O_3$, $SiO_2$, $SnO_2$, $TiO_2$, $V_2O_5$, $WO_3$, $Y_2O_3$, ZnO, $ZrO_2$, and the like, including mixed oxides thereof, and combinations thereof, for example, silica-aluimina. Alternatively, suitable examples of solid oxide materials or compounds that can be used in the chemically-treated solid oxide of the present disclosure include, but are not limited to, $Al_2O_3$, $SiO_2$, $TiO_2$, $ZrO_2$, and the like, including mixed oxides thereof, and combinations thereof.

Examples of mixed oxides that can be used in the activator-support of the present disclosure include, but are not limited to, silica-alumina, silica-titania, silica-zirconia, zeolites, many clay minerals, alumina-titania, alumina-zirconia, zinc-aluminate and the like; alternatively, examples of mixed oxides that can be used in the activator-support of the present disclosure include, but are not limited to, silica-alumina, silica-titania, silica-zirconia, alumina-titania, alumina-zirconia, zinc-aluminate and the like; alternatively, examples of mixed oxides that can be used in the activator-support of the present disclosure include, but are not limited to, silica-alumina, silica-titania, silica-zirconia, alumina-titania, and the like.

In one aspect of this disclosure, the solid oxide material is chemically-treated by contacting it with at least one electron-withdrawing component, typically an electron-withdrawing anion source. Further, the solid oxide material can be chemically-treated with a metal ion if desired, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and the metal ion if present can be calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. Generally, fluoride, sources of fluoride, chloride, bisulfate, sulfate, and the like, including mixtures and combinations thereof, are particularly useful. In addition, other ionic or non-ionic compounds that serve as sources for these electron-withdrawing anions may also be employed in the present disclosure.

When the electron-withdrawing component can comprise a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like; alternatively, ammonium; alternatively, trialkyl ammonium; alternatively, tetraalkyl ammonium; alternatively, tetraalkyl phosphonium; or alternatively, $H^+$, $[H(OEt_2)_2]^+$.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired chemically-treated solid oxide acidity. For example, one aspect of this disclosure is employing two or more electron-withdrawing anion source compounds in two or more separate contacting steps. Thus, one example of such a process by which an chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the disclosure, the solid oxide activator-support (chemically-treated solid oxide) may be produced by a process comprising:
1) contacting a solid oxide compound with at least one electron-withdrawing anion source compound to form a first mixture; and
2) calcining the first mixture to form the solid oxide activator-support.

In another aspect of this disclosure, the solid oxide activator-support (chemically-treated solid oxide) is produced by a process comprising:
1) contacting at least one solid oxide compound with a first electron-withdrawing anion source compound to form a first mixture; and
2) calcining the first mixture to produce a calcined first mixture;
3) contacting the calcined first mixture with a second electron-withdrawing anion source compound to form a second mixture; and
4) calcining the second mixture to form the solid oxide activator-support. Thus, the solid oxide activator-support is sometimes referred to simply as a treated solid oxide compound.

Another aspect of this disclosure is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this disclosure, once the solid oxide has been treated and dried, it may be subsequently calcined. Calcining of the treated solid oxide is generally conducted in an ambient atmosphere; alternatively, in a dry ambient atmosphere. The solid oxide may be calcined at a temperature from about 200° C. to about 900° C.; alternatively, from about 300° C. to about 800° C.; alternatively, from about 400° C. to about 700° C.; or alternatively, from about 350° C. to about 550° C. The period of time at which the solid oxide is maintained at the calcining temperature may be about 1 minute to about 100 hours; alternatively, from about 1 hour to about 50 hours; alternatively, from about 3 hours to about 20 hours; or alternatively from about 1 to about 10 hours.

Further, any type of suitable ambient atmosphere can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the disclosure, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g.

In still another aspect, the solid oxide component has a surface area from about 100 to about 1000 m$^2$/g. In another aspect, solid oxide component has a surface area from about 200 to about 800 m$^2$/g, and in still another aspect, from about 250 to about 600 m$^2$/g.

According to another aspect, the solid oxide treated with an electron withdrawing anion has any of the following properties: a) a surface area from about 100 m$^2$/g to about 1000 m$^2$/g; b) a pore volume from about 0.25 mL/g to about 3.0 mL/g; c) an average particle size from about 5 microns to about 150 microns; or d) any combination thereof.

Regarding the sources of the electron-withdrawing anions, generally, the solid oxide material can be treated with a source of halide ion or sulfate ion or other electron withdrawing anions, optionally treated with a metal ion if desired, then calcined to provide the chemically-treated solid oxide in the form of a particulate solid. Thus, reference is made herein to the source of the sulfate ion (termed a sulfating agent), the source of chloride ion (termed a chloriding agent), the source of fluoride ion (termed a fluoriding agent) and the like, used to provide the chemically-treated solid oxide.

In one aspect of this disclosure, the chemically-treated solid oxide can comprise a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this disclosure include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof; alternatively, hydrofluoric acid (HF), ammonium fluoride ($NH_4F$), ammonium bifluoride ($NH_4HF_2$), ammonium tetrafluoroborate ($NH_4BF_4$), analogs thereof, and combinations thereof. For example, ammonium bifluoride $NH_4HF_2$ may be used as the fluoriding agent, due to its ease of use and ready availability.

In another aspect of the present disclosure, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the disclosure include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present disclosure, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the disclosure include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina or silica-coated alumina before calcining. In another aspect, the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

In an aspect, silica-alumina or silica-coated alumina may be utilized as the solid oxide material. The silica-alumina or silica-coated alumina used to prepare the treated solid oxide can have a pore volume greater than about 0.5 cc/g. In one aspect, the pore volume may be greater than about 0.8 cc/g, and in another aspect, the pore volume may be greater than about 1.0 cc/g. Further, the silica-alumina or silica-coated alumina may have a surface area greater than about 100 $m^2/g$. In one aspect, the surface area is greater than about 250 $m^2/g$, and in another aspect, the surface area may be greater than about 350 $m^2/g$. Generally, the silica-alumina or silica-coated alumina of this disclosure has an alumina content from about 5 to about 95%. In one aspect, the alumina content of the silica-alumina or silica-coated alumina may be from about 5 to about 50%, and in another aspect, the alumina content of the silica-alumina or silica-coated alumina may be from about 8% to about 30% alumina by weight. In yet another aspect, the solid oxide component can comprise alumina without silica and in another aspect, the solid oxide component can comprise silica without alumina.

The sulfated solid oxide can comprise sulfate and a solid oxide component such as alumina, silica-alumina, or silica-coated alumina in the form of a particulate solid. The sulfated oxide can be further treated with a metal ion if desired such that the calcined sulfated oxide can comprise a metal. In one aspect, the sulfated solid oxide can comprise sulfate and alumina. In one aspect of this disclosure, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In one aspect of the disclosure, the amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In an aspect, the metallocene compound or combination of metallocene compounds may be precontacted with an olefin and/or an co-catalyst such as an organoaluminum compound for a first period of time prior to contacting this mixture with the chemically-treated solid oxide. Once the precontacted mixture of the metallocene compound, olefin, and/or organoaluminum compound is contacted with the chemically-treated solid oxide, the composition further comprising the chemically-treated solid oxide is termed the "postcontacted" mixture. The postcontacted mixture can be allowed to remain in further contact for a second period of time prior to being charged into the reactor in which the polymerization process will be carried out.

Various processes to prepare solid oxide activator-supports that can be employed in this disclosure have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, 6,548,441, 6,750,302, 6,831,141, 6,936,667, 6,992,032, 7,601,665, 7,026,494, 7,148,298, 7,470,758, 7,517,939, 7,576,163, 7,294,599, 7,629,284, 7,501,372, 7,041,617, 7,226,886, 7,199,073, 7,312,283, 7,619,047, and U.S. Patent Appl. Publ. No. 2010/0076167, describe such methods, each of which is incorporated by reference herein, in pertinent part.

Aluminoxane Compounds

In a further aspect of any embodiment provided here, the catalyst composition can comprise, either in combination with the chemically-treated solid oxide or any other activators(s) or alone, at least one aluminoxane. In a further aspect, the catalyst compositions and polymerization processes disclosed herein may be absent an aluminoxane. Aluminoxanes are also referred to as poly(hydrocarbyl aluminum oxides), organoaluminoxanes, or alumoxanes.

Alumoxane compounds that can be used in the catalyst composition of this disclosure include, but are not limited to, oligomeric compounds. The oligomeric aluminoxane compounds can comprise linear structures, cyclic, or cage structures, or mixtures of all three. Oligomeric aluminoxanes, whether oligomeric or polymeric compounds, have the repeating unit formula:

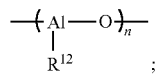

wherein $R^{12}$ is a linear or branched alkyl having from 1 to 10 carbon atoms, and n is an integer from 3 to about 10 are encompassed by this disclosure. Linear aluminoxanes having the formula:

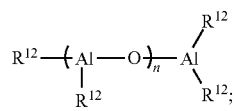

wherein $R^{12}$ is a linear or branched alkyl having from 1 to 10 carbon atoms, and n is an integer from 1 to about 50, are also encompassed by this disclosure.

Further, aluminoxanes may also have cage structures of the formula $R^t_{5m+\alpha}R^b_{m-\alpha}Al_{4m}O_{3m}$, wherein m is 3 or 4 and a is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Aluminoxanes that can serve as activators in this disclosure are generally represented by formulas such as $(R^{12}-Al-O)_n$, $R^{12}(R^{12}-Al-O)_nAl(R^{12})_2$, and the like, wherein the $R^{12}$ group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this disclosure include, but are not limited to, methylaluminoxane (MAO), ethylaluminoxane, modified methylaluminoxane (MMAO) such as an isobutyl-modified methyl alumoxane, n-propylaluminoxane, iso-propylaluminoxane, n-butylaluminoxane, t-butyl-aluminoxane, sec-butylaluminoxane, iso-butylaluminoxane, t-butyl aluminoxane, 1-pentyl-aluminoxane, 2-pentylaluminoxane, 3-pentylaluminoxane, iso-pentylaluminoxane, neopentylaluminoxane, or combinations thereof.

While organoaluminoxanes with different types of "R" groups such as $R^{12}$ are encompassed by the present disclosure, methyl aluminoxane (MAO), ethyl aluminoxane, or isobutyl aluminoxane are typical aluminoxane activators used in the catalyst compositions of this disclosure. These aluminoxanes are prepared from trimethylaluminum, triethylaluminum, or triisobutylaluminum, respectively, and are sometimes referred to as poly(methylaluminum oxide), poly (ethylaluminum oxide), and poly(isobutylaluminum oxide), respectively. It is also within the scope of the disclosure to use an aluminoxane in combination with a trialkylaluminum, such as disclosed in U.S. Pat. No. 4,794,096, which is herein incorporated by reference in its entirety.

The present disclosure contemplates many values of n in the aluminoxane formulas $(R^{12}-Al-O)_n$ and $R^{12}(R^{12}-Al-O)_nAl(R^{12})_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present disclosure.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_n$ aluminoxane species, both of which are encompassed by this disclosure. Alternatively, organoaluminoxanes may be prepared by reacting an aluminum alkyl compound such as $AlR_3$ with a hydrated salt, such as hydrated copper sulfate, in an inert organic solvent.

The other catalyst components may be contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the oligomerization reactor without being isolated.

Organoboron and Organoborate Compounds

In a further aspect of any embodiment provided here, the catalyst composition can comprise, either in combination with the chemically-treated solid oxide or any other activators(s) or alone, at least one organoboron, borate, or organoborate compound as an activator. In a further aspect, the catalyst compositions and polymerization processes disclosed herein may be absent an organoboron, a borate, or an organoborate compound.

Organoboron compounds that can be used in the catalyst composition of this disclosure are varied. In one aspect, the organoboron compound can comprise neutral boron compounds, borate salts, or combinations thereof. For example, the organoboron compounds of this disclosure can comprise a fluoroorgano boron compound, a fluoroorgano borate compound, or a combination thereof. Any fluoroorgano boron or fluoroorgano borate compound known in the art can be utilized. The term fluoroorgano boron compound has its usual meaning to refer to neutral compounds of the form $BY_3$. The term fluoroorgano borate compound also has its usual meaning to refer to the monoanionic salts of a fluoroorgano boron compound of the form $[\text{cation}]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as activators in the present disclosure include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, and the like, including mixtures thereof; alternatively, N,N-dimethylanilinium tetrakis-(pentafluorophenyl)borate; alternatively, triphenylcarbenium tetrakis(pentafluorophenyl)borate; alternatively, lithium tetrakis(pentafluorophenyl) borate; alternatively, N,N-dimethylanilinium tetrakis[3,5-bis(trifluoromethyl)phenyl]borate; or alternatively, triphenylcarbenium tetrakis[3,5-bis(trifluoromethyl)phenyl] borate. Examples of fluoroorgano boron compounds that can be used as activators in the present disclosure include, but are not limited to, tris(pentafluorophenyl)-boron, tris[3,5-bis (trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this disclosure. In one aspect and in any embodiment disclosed herein, the molar ratio of the organoboron compound to the metallocene compound can be from 0.001:1 to 100,000:1. Alternatively and in any embodiment, the molar ratio of the organoboron compound to the metallocene compound can be from 0.01:1 to 10,000:1; alternatively from 0.1:1 to 100:1; alternatively, from 0.5:1 to 10:1; or alternatively, from 0.2:1 to 5:1. When referring to molar ratios of the organoboron compound or any other co-catalyst or activator to the metallocene compound, the molar ratios are intended to reflect the total moles of the first metallocene compound and the second metallocene compound, when present. Typically, the amount of the fluoroorgano boron or fluoroorgano borate compound used as an activator for the metallocene compounds can be in a range of from about 0.5 mole to about 10 moles of boron compound per total mole of metallocene compound employed. In one aspect, the amount of fluoroorgano boron or fluoroorgano borate compound used as an activator for the metallocene compound(s) is in a range of about 0.8 moles to 5 moles of boron compound per total moles of metallocene compound(s).

Ionizing Ionic Compounds

In a further aspect of any embodiment provided here, the catalyst composition can comprise, either in combination with the chemically-treated solid oxide or any other activators(s) or alone, at least one ionizing ionic compound. In a further aspect, the catalyst compositions and polymerization processes disclosed herein may be absent an ionizing ionic compound. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst composition. While not bound by theory, it is believed that the ionizing ionic compound may be capable of reacting with the metallocene compound and converting it into a cationic metallocene compound or a metallocene compound that is an incipient cation. Again, while not intending to be bound by theory, it is believed that the ionizing ionic compound may function as an ionizing compound by at least partially extracting an anionic ligand such as a chloride or alkoxide from the metallocene compound(s). However, the ionizing ionic compound is an activator regardless of whether it is ionizes the metallocene compound(s), abstracts an anionic ligand in a fashion as to form an ion pair, weakens the metal-anionic ligand bond in the metallocene compound, simply coordinates to anionic ligand, or any other mechanism by which activation may occur.

Further, it is not necessary that the ionizing ionic compound activate the metallocene compounds only. The activation function of the ionizing ionic compound is evident in the enhanced activity of catalyst composition as a whole, as compared to a catalyst composition that does not comprise any ionizing ionic compound. It is also not necessary that the ionizing ionic compound activate different metallocene compounds to the same extent.

In one aspect and in any embodiment disclosed herein, the ionizing ionic compound can have the formula:

$$[Q]^+[M^6Z_4]^-.$$

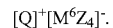

In an embodiment, Q is selected from $[NR^AR^BR^CR^D]^+$, $[CR^ER^FR^G]^+$, $[C_7H_7]^+$, $Li^+$, $Na^+$, and $K^+$; alternatively, $[NR^AR^BR^CR^D]^+$; alternatively, $[CR^ER^FR^G]^+$; alternatively, $[C_7H_7]^+$; alternatively, $Li^+$; alternatively, $Na^+$; alternatively, $K^+$. In an embodiment, $R^A$, $R^B$, and $R^C$ are each selected independently from hydrogen, and a $C_1$ to $C_{20}$ hydrocarbyl; alternatively, hydrogen and a $C_1$ to $C_{10}$ hydrocarbyl; alternatively, hydrogen and a $C_6$ to $C_{20}$ aryl; alternatively, hydrogen and a $C_6$ to $C_{10}$ aryl; alternatively, hydrogen and a $C_1$ to $C_{20}$ alkyl; alternatively, hydrogen and a $C_1$ to $C_{10}$ alkyl; or alternatively, hydrogen and a $C_1$ to $C_5$ alkyl. In an embodiment, $R^D$ is selected from hydrogen, a halide, and a $C_1$ to $C_{20}$ hydrocarbyl; alternatively, hydrogen, a halide, and a $C_1$ to $C_{10}$ hydrocarbyl; alternatively, hydrogen, a halide, and a $C_6$ to $C_{20}$ aryl; alternatively, hydrogen, a halide, and a $C_6$ to $C_{10}$ aryl; alternatively, hydrogen, a halide, and a $C_1$ to $C_{20}$ alkyl; alternatively, hydrogen, a halide, and a $C_1$ to $C_{10}$ alkyl; or alternatively, hydrogen, a halide, and a $C_1$ to $C_5$ alkyl. In an embodiment, $R^E$, $R^F$, and $R^G$ are each selected independently from hydrogen, a halide, and a $C_1$ to $C_{20}$ hydrocarbyl; alternatively, hydrogen, a halide, and a $C_1$ to $C_{10}$ hydrocarbyl; alternatively, hydrogen, a halide, and a $C_6$ to $C_{20}$ aryl; or alternatively, hydrogen, a halide, and a $C_6$ to $C_{10}$ aryl. In some embodiments, Q may be a trialkyl ammonium or a dialkylarylamine (e.g. dimethyl anilinium); alternatively, triphenylcarbenium or substituted triphenyl carbenium; alternatively, tropylium or a substituted tropylium; alternatively, a trialkyl ammonium; alternatively, a dialkylarylamine (e.g. dimethyl anilinium) alternatively, a triphenylcarbenium; or alternatively, tropylium. In other embodiments, Q may be tri(n-butyl) ammonium, N,N-dimethylanilinium, triphenylcarbenium, tropylium, lithium, sodium, and potassium; alternatively, tri(n-butyl) ammonium and N,N-dimethylanilinium; alternatively, triphenylcarbenium, tropylium; or alternatively, lithium, sodium and potassium. In an embodiment, $M^6$ is B or Al; alternatively, B; or alternatively, Al. In an embodiment, Z is selected independently from halide and

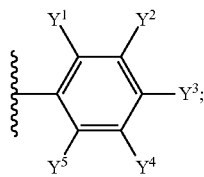

alternatively, halide; or alternatively,

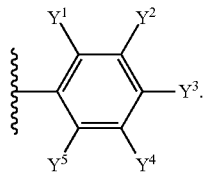

In an embodiment, $Y^1$, $Y^2$, $Y^3$, $Y^4$, and $Y^5$ are each selected independently from hydrogen, a halide, a $C_1$ to $C_{20}$ hydrocarbyl, a $C_1$ to $C_{20}$ hydrocarboxy; alternatively, hydrogen, a halide, a $C_1$ to $C_{10}$ hydrocarbyl, a $C_1$ to $C_{10}$ hydrocarboxide; alternatively, hydrogen, a halide, a $C_6$ to $C_{20}$ aryl, a $C_1$ to $C_{20}$ alkyl, a $C_6$ to $C_{20}$ aryloxide, a $C_1$ to $C_{20}$ alkoxide; alternatively, hydrogen, a halide, a $C_6$ to $C_{10}$ aryl, a $C_1$ to $C_{10}$ alkyl, a $C_6$ to $C_{10}$ aryloxide, a $C_1$ to $C_{10}$ alkoxide; or alternatively, hydrogen, a halide, a $C_1$ to $C_5$ alkyl, a $C_1$ to $C_5$ alkoxide. In some embodiments, $Y^1$, $Y^2$, $Y^3$, $Y^4$, and $Y^5$ may be selected independently from phenyl, p-tolyl, m-tolyl, 2,4-dimethylphenyl, 3,5-dimethylphenyl, pentafluorophenyl, and 3,5-bis(trifluoromethyl)phenyl; alternatively, phenyl; alternatively, p-tolyl; alternatively, m-tolyl; alternatively, 2,4-dimethylphenyl; alternatively, 3,5-dimethylphenyl; alternatively, pentafluorophenyl; or alternatively, 3,5-bis(trifluoromethyl)phenyl. In some embodiments, any hydrocarbyl, aryl, alkyl, hydrocarboxide, aryloxide, or alkoxide can be substituted by one or more halide, $C_1$ to $C_5$ alkyl, halide-substituted $C_1$ to $C_5$ alkyl, $C_1$ to $C_5$ alkoxide, or halide-substituted $C_1$ to $C_5$ alkoxide group. Particular halide, hydrocarbyl, aryl, alkyl, hydrocarboxide, and alkoxide are described herein and may be utilized without limitation to provide particular ionizing ionic compound having the formula $[Q]^+[M^6Z_4]^-$.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoro-methyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, or N,N-dimethylanilinium tetrakis(pentafluorophenyl)borate; alternatively, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, or triphenylcarbenium tetrakis(pentafluorophenyl)borate; alternatively, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, or tropylium tetrakis(pentafluorophenyl)borate; alternatively, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, or lithium tetrafluoroborate; alternatively, sodium tetrakis(pentafluorophenyl)borate, sodium tetrakis(phenyl) borate, sodium tetrakis(p-tolyl)borate, sodium tetrakis(m-tolyl)borate, sodium tetrakis (2,4-dimethylphenyl)borate, sodium tetrakis(3,5-dimethylphenyl)borate, or sodium tetrafluoroborate; alternatively, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, or potassium tetrafluoroborate; alternatively, tri(n-butyl)ammonium tetrakis(p-tolyl)aluminate, tri(n-butyl)ammonium tetrakis(m-tolyl)aluminate, tri (n-butyl)ammonium tetrakis(2,4-dimethylphenyl)aluminate, tri(n-butyl)ammonium tetrakis(3,5-dimethylphenyl)aluminate, tri(n-butyl)ammonium tetrakis(pentafluorophenyl)aluminate, N,N-dimethylanilinium tetrakis(p-tolyl)-aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethyl-phenyl)aluminate, or N,N-dimethylanilinium tetrakis (pentafluorophenyl)aluminate; alternatively, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, or triphenylcarbenium tetrakis-(pentafluorophenyl)aluminate; alternatively, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, or tropylium tetrakis(pentafluorophenyl)aluminate; alternatively, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, or lithium tetrafluoroaluminate; alternatively, sodium tetrakis(pentafluorophenyl)aluminate, sodium tetrakis(phenyl)aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, or sodium tetrafluoroaluminate; or alternatively, potassium tetrakis(pentafluorophenyl)aluminate, potassium tetrakis(phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate. In some embodiments, the ionizing ionic compound may be tri(n-butyl)ammonium tetrakis(3,5-dimethylphenyl)borate, tri(n-butyl)-ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis[3,5-bis(trifluoro-methyl)phenyl]borate, N,N-dimethylanilinium tetrakis(pentafluorophenyl)borate, triphenyl-carbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, or triphenylcarbenium tetrakis[3,5-bis(trifluoromethyl)phenyl]borate, lithium tetrakis(p-tolyl)aluminate, lithium tetrakis (m-tolyl)aluminate, lithium tetrakis(2,4-dimethylphenyl) aluminate, or lithium tetrakis(3,5-dimethylphenyl) aluminate.

Alternatively and in some embodiments, the ionizing ionic compound can be tri(n-butyl)-ammonium tetrakis[3,5-bis(trifluoromethyl)phenyl]borate, tri(n-butyl)ammonium tetrakis(pentafluorophenyl)borate, N,N-dimethylanilinium tetrakis[3,5-bis(trifluoro-methyl)phenyl]borate, N,N-dimethylanilinium tetrakis(pentafluorophenyl)borate, triphenylcarbenium tetrakis[3,5-bis(trifluoromethyl)phenyl]borate, lithium tetrakis(p-tolyl)aluminate, or lithium tetrakis(m-tolyl)aluminate; alternatively, tri(n-butyl)ammonium tetrakis[3,5-bis(trifluoromethyl)phenyl]borate; alternatively, tri (n-butyl)ammonium tetrakis(pentafluorophenyl)borate; alternatively, N,N-dimethylanilinium tetrakis[3,5-bis(trifluoromethyl)phenyl]borate; alternatively, N,N-dimethylanilinium tetrakis(pentafluorophenyl)borate; alternatively, triphenylcarbenium tetrakis[3,5-bis(trifluoro-methyl)phenyl]borate; alternatively, lithium tetrakis(p-tolyl)aluminate; or alternatively, lithium tetrakis(m-tolyl)aluminate. In other embodiments, the ionizing compound may be a combination of any ionizing compound recited herein. However, the ionizing ionic compound is not limited thereto in the present disclosure.

In one aspect and in any embodiment disclosed herein, the molar ratio of the ionizing ionic compound to the metallocene compound can be from 0.001:1 to 100,000:1. Alternatively and in any embodiment, the molar ratio of the ionizing ionic compound to the metallocene compound can be from 0.01:1 to 10,000:1; alternatively from 0.1:1 to 100:1; alternatively, from 0.5:1 to 10:1; or alternatively, from 0.2:1 to 5:1. When referring to molar ratios of the ionizing ionic compound or any other activator to the metallocene compound, the molar ratios are intended to reflect the total moles of the first metallocene compound and the second metallocene compound, when present.

Diluent

In an aspect, the polymerization process and the method for making a catalyst composition can be carried out using a diluent or carrier for the components of the catalyst composition. Therefore, there is provided a process for polymerizing olefins, a catalyst composition, or a method of making a catalyst composition according to any one of aspects disclosed herein, wherein the catalyst composition further comprises a diluent or wherein the contacting step comprises contacting the recited elements in a diluent.

According to an aspect, the diluent can comprise, consist of, consist essentially of, or can be selected from any suitable non-protic solvent, or any non-protic solvent disclosed herein. For example, in an aspect, the diluent can comprise any suitable non-coordinating solvent such as the hydrocarbon solvents disclosed herein.

For example, the diluent can comprise any suitable aliphatic hydrocarbon solvent, or any aliphatic hydrocarbon solvent disclosed herein. In an aspect, the diluent can comprise, consist of, consist essentially of, or be selected from at least one olefin monomer in the case of bulk polymerizations, propane, butanes (for example, n-butane, iso-butane), pentanes (for example, n-pentane, iso-pentane), hexanes, heptanes, octanes, petroleum ether, light naphtha, heavy naphtha, and the like, or any combination thereof.

In another aspect, the diluent can comprise any suitable aromatic hydrocarbon solvent, or any aromatic hydrocarbon solvent disclosed herein, for example, benzene, xylene, toluene, and the like.

The term "solvent" as used herein does not imply that all or any of the components of the catalyst composition are soluble, but rather "solvent" is used interchangeably with the term "carrier" or "diluent". The skilled person will appreciate that not all metallocene compounds, co-catalysts, and activators may be highly stable in all of the diluents described herein, and it is not intended to reflect that this is the case.

Polymerization Processes

In an aspect, this disclosure encompasses a process for polymerizing olefins by contacting at least one olefin monomer and a catalyst composition under polymerization conditions to form an olefin polymer, wherein the catalyst composition comprises the metallocene compounds, the optional co-catalyst such as an organoaluminum compound, and activator such as a solid oxide treated with an electron withdrawing anion as disclosed herein. In one aspect, the contacting step can comprise contacting the recited components in the following order:
  a) the solid oxide treated with an electron-withdrawing anion, optionally contacted with a diluent, and constituting a first composition, is contacted with:
  b) the co-catalyst, forming a second composition, which is contacted with:
  c) the first metallocene compound.

According to one aspect, the contacting steps and the polymerization process can be conducted in a hydrocarbon slurry. The at least one olefin monomer can comprise ethylene or ethylene in combination with an olefin co-monomer selected from propylene, butene (e.g., 1-butene), pentene, hexene (e.g., 1-hexene), heptene, octene (e.g., 1-octene), styrene, and the like. Moreover, the polymerization process can further comprise a step of monitoring the concentration of at least one reaction mixture component, at least one elimination reaction product, or a combination thereof.

Useful examples of the polymerization method include a process by which at least one olefin monomer and the catalyst composition can be contacted under any one or any combination of more than one of the following conditions:
  a) the molar ratio of the co-catalyst to the metallocene compound(s) is from about 1:1 to about 500:1;
  b) the weight ratio of the activator-support to the metallocene compound(s) is from about 5:1 to about 1,000:1; and/or c) the weight ratio of the at least one olefin monomer to the metallocene compound(s) is from about 1,000:1 to about 100,000,000:1.

In another aspect, for example, the at least one olefin monomer and the catalyst composition can be contacted under any one or any combination of more than one of the following conditions:
  a) the co-catalyst comprises an organoaluminum compound and the molar ratio of the co-catalyst to the metallocene compound(s) is from about 10:1 to about 500:1;
  b) the activator-support comprises a fluorided silica-alumina, fluorided silica-coated alumina or a fluorided mullite, and the weight ratio of the activator-support to the metallocene compound(s) is from about 5:1 to about 1,000:1; and/or
  c) the weight ratio of the at least one olefin monomer to the metallocene compound(s) is from about 1,000:1 to about 100,000,000:1.

According to a further aspect, the polymerization conditions can include any one or any combination of more than one of the following conditions:
  a) a temperature range from about 40° C. to about 160° C.;
  b) a partial pressure of the olefin monomer comprising ethylene from about 15 psi to about 1500 psi; and/or
  c) a time of the contacting step of from about 1 minute to about 3 hours.

In a further aspect, wherein the at least one olefin monomer and the catalyst composition can be contacted under any of following conditions, or the polymerization can be conducted under any of the following conditions:
  a) the molar ratio of the co-catalyst to the combined first metallocene and second metallocene is from about 1:1 to about 500:1;
  b) the weight ratio of the activator-support to the combined first metallocene and second metallocene is from about 5:1 to about 1,000:1; and/or
  c) the weight ratio of the at least one olefin monomer to the combined first metallocene and second metallocene is from about 1,000:1 to about 100,000,000:1; or
  d) any combination thereof.

The polymerization process is not limited to a specific reactor design or method. For example, the process for polymerizing olefins can be conducted in a polymerization reactor system comprising a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof. A loop-slurry reactor can be particularly useful. Further, the polymerization can be conducted in a polymerization reactor system comprising a single reactor, or can be conducted in a polymerization reactor system comprising two or more reactors.

For example, in an aspect, the polymerization conditions suitable to form a polyethylene can comprise a polymerization reaction temperature from about 50° C. to about 160° C. and a reaction pressure from about 100 psig to about 1000 psig (about 1.4 to about 6.9 MPa). Alternatively, the polymerization reaction temperature can be from about 60° C. to about 160° C. and a reaction pressure from about 200 psig to about 1000 psig. In another aspect, no hydrogen is added to the polymerization reactor system. In a further aspect, hydrogen is added to the polymerization reactor system when desired.

In an aspect, the polymerization conditions can comprise contacting the catalyst composition with at least one olefin monomer in the presence of a diluent selected from at least one olefin monomer in the case of bulk polymerizations, propane, butanes (for example, n-butane, iso-butane), pentanes (for example, n-pentane, iso-pentane), hexanes, heptanes, octanes, petroleum ether, light naphtha, heavy naphtha, and the like, or any combination thereof. In another aspect, the polymerization conditions can comprise contacting the catalyst composition with at least one olefin monomer in the presence of a diluent selected from any suitable aromatic hydrocarbon solvent, or any aromatic hydrocarbon solvent disclosed herein, for example, benzene, xylene, toluene, and the like.

The polymerization conditions also can comprise a co-polymerization of ethylene with a co-monomer or more than one co-monomer as described herein. For example, the olefin monomer can further comprise at least one $C_3$ to $C_{20}$ olefin comonomer. In one aspect, the olefin monomer can further comprise at least one olefin comonomer, the comonomer comprising, consisting essentially of, or being selected from propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a combination thereof.

The disclosure also provides for, in an aspect, a process for polymerizing an olefin wherein the step of providing a catalyst composition further comprises providing the contact product in a solvent. That is, the step of contacting the catalyst composition components can be and typically is carried out in a solvent or a combination of solvents. Moreover, any order of contacting the components can be used. For example, the co-catalyst can be contacted in a solvent prior to contact with the metallocene compound(s). In another aspect, the co-catalyst, the activator such as an activator-support, and the at least one olefin monomer comprising ethylene can be contacted in a solvent prior to contact with the metallocene compound(s). According to other aspects, the co-catalyst and the metallocene compound can be contacted in a solvent in the presence or absence of the at least one olefin monomer comprising ethylene, prior to contacting with the activator-support. A further aspect provides that the activator-support and the metallocene compound can be contacted in a solvent in the presence or absence of the at least one olefin monomer comprising ethylene, prior to contacting with the co-catalyst.

According to an aspect, the polymerization process can be conducted in a tubular reactor, under suitable polymerization conditions. In a further aspect, the polymerization process can be conducted in continuous stirred tank reactor (CSTR), under suitable polymerization conditions.

In some aspects, a catalyst composition prepared according to this disclosure can be characterized by a total activator-support activity in a range from about 20 g/g·h (grams polyethylene per gram of activator-support per hour) to about 10,000 g/g·h. In other aspects, a catalyst composition prepared according to this disclosure can be characterized by a total metallocene activity in a range from about 10,000 g/g·h (grams polyethylene per gram of metallocene per hour) to about 2,000,000 g/g·h.

Polymer Properties

This disclosure provides for catalyst compositions, processes for making the catalyst compositions, and processes for polymerizing at least one olefin monomer comprising ethylene to form a polyethylene using the subject "first" metallocene which contains at least one indenyl ligand which includes a halogenated substituent, such as a fluorinated substituent. The subject first metallocene compound or a combination of a first metallocene and a second metallocene as disclosed herein can produce low molecular weight (MW) polyethylene with very low levels of short chain branching, even in the presence of significant concentrations of an α-olefin co-monomer, in combination with an optional co-catalyst and an activator-support.

In some aspects, the subject first metallocene which contains at least one indenyl ligand which includes a halogenated substituent, such as a fluorinated substituent, can show approximately the same, or in some cases lower, α-olefin comonomer rejecting properties as comparable metallocenes which do not contain a halogenated or fluorinated substituent. In the process for polymerizing olefins or in evaluating the olefin polymer itself, for example, the olefin polymer can be an ethylene-α-olefin copolymer characterized by a co-monomer incorporation that is lower than or the same as that of a comparative ethylene-α-olefin copolymer prepared under identical conditions except for using a comparative metallocene compound in the catalyst composition, wherein the comparative metallocene compound can have the formula $(X^{12})(X^{13})(X^3)(X^4)M^1$, wherein Mt, $X^3$, and $X^4$ are as defined herein for the first metallocene, and wherein $X^{12}$ is a substituted or unsubstituted indenyl ligand which is absent a halogen-substituted hydrocarbyl group, and $X^{13}$ is [1] a substituted or unsubstituted cyclopentadienyl ligand, or [2] a substituted or unsubstituted indenyl ligand which is absent a halogen-substituted hydrocarbyl group; and wherein $X^{12}$ and $X^{13}$ are unbridged, and wherein any substituent on $X^{12}$ and $X^{13}$ which is not a halogen-substituted $C_1$-$C_{20}$ hydrocarbyl group is selected independently from a $C_1$-$C_{20}$ hydrocarbyl group.

That is, as compared to the first metallocene, $X^1$ of the first metallocene is replaced by $X^{12}$, and $X^2$ of the first metallocene is replaced by $X^{13}$, to obtain the comparative metallocene.

As disclosed, the first metallocene can be used as a single metallocene or in a dual metallocene catalyst system for the production of an ethylene homopolymer or co-polymer. In an aspect, the polymer prepared using the first metallocene can have at least the following properties.

[1] In one aspect, when the olefin polymer is an ethylene homopolymer prepared using the single metallocene catalyst comprising the first metallocene as the only metallocene in the catalyst composition, the ethylene homopolymer can be characterized by any one or any combination of the following properties:
  a) (Me/1,000 TC)*(Mn/14,000)<4.9, wherein Me/1,000 TC is the number of methyl groups per 1,000 total carbon atoms, and Mn is number average molecular weight;
  b) a molecular weight distribution (Mw/Mn, or polydispersity index) of from 2.0 to 15.0, alternatively, from 2.0 to 8.0; or alternatively, from 2.0 to 4.5;
  c) a melt index in a range of from 0 dg/min to about 100 dg/min;
  d) a high load melt index in a range of from about 0.1 dg/min to about 1000 dg/min;
  e) a number-average molecular weight (Mn) from about 5,000 g/mol to about 250,000 g/mol; or alternatively, from about 10,000 g/mol to about 200,000 g/mol;
  f) a weight-average molecular weight (Mw) of from about 50,000 g/mol to about 700,000 g/mol; or alternatively, from about 100,000 g/mol to about 500,000 g/mol;
  g) a ratio of Mw/Mn in a range from about 2 to about 10;
  h) a density in a range from about 0.945 g/cm³ to 0.965; and/or
  i) a short chain branching (FTIR method) of from about 0.4 Me/1000 C to about 1.5 Me/1000 C.

[2] In a further aspect, when the olefin polymer is an ethylene co-polymer prepared using the single metallocene catalyst comprising the first metallocene as the only metallocene in the catalyst composition, the ethylene co-opolymer can be characterized by any one or any combination of the following properties:
  a) a melt index in a range of from 0 dg/min to about 100 dg/min;
  b) a high load melt index in a range of from about 0.1 dg/min to about 1000 dg/min;
  c) a number-average molecular weight (Mn) from about 5,000 g/mol to about 250,000 g/mol; or alternatively, from about 10,000 g/mol to about 150,000 g/mol;
  d) a weight-average molecular weight (Mw) from about 20,000 g/mol to about 700,000 g/mol; or alternatively, from about 50,000 g/mol to about 500,000 g/mol;
  e) a ratio of Mw/Mn in a range from about 2 to about 20;
  f) a density in a range from about 0.914 g/cm³ to 0.955; and/or
  g) a short chain branching (FTIR method) of from about 1 Me/1000 C to about 15 Me/1000 C.

[3] In still another aspect, when the olefin polymer is an ethylene homopolymer prepared using the dual metallocene catalyst comprising a first metallocene and a second metallocene as defined herein in the catalyst composition, the ethylene homopolymer can be characterized by any one or any combination of the following properties:
  a) a melt index in a range of from 0 dg/min to about 100 dg/min;
  b) a high load melt index in a range of from about 0.1 dg/min to about 1000 dg/min;
  c) a number-average molecular weight (Mn) from about 5,000 g/mol to about 250,000 g/mol; or alternatively, from about 10,000 g/mol to about 200,000 g/mol;
  d) a weight-average molecular weight (Mw) from about 100,000 g/mol to about 1,400,000 g/mol; or alternatively, from about 200,000 g/mol to about 1,000,000 g/mol;
  e) a ratio of Mw/Mn in a range from about 4 to about 40;
  f) a density in a range from about 0.94 g/cm³ to 0.96; and/or
  a short chain branching (FTIR method) of from about 0.5 Me/1000 C to about 1.5 Me/1000 C.

[4] According to another aspect, when the olefin polymer is an ethylene co-polymer prepared using the dual metallocene catalyst comprising a first metallocene and a second metallocene as defined herein in the catalyst composition, the ethylene co-polymer can be characterized by any one or any combination of the following properties:
  a) a melt index in a range of from 0 dg/min to about 100 dg/min;
  b) a high load melt index in a range of from about 0.1 dg/min to about 1000 dg/min;
  c) a number-average molecular weight (Mn) from about 5,000 g/mol to about 250,000 g/mol; or alternatively, from about 10,000 g/mol to about 200,000 g/mol;
  d) a weight-average molecular weight (Mw) from about 100,000 g/mol to about 1,400,000 g/mol; or alternatively, from about 200,000 g/mol to about 800,000 g/mol;
  e) a ratio of Mw/Mn in a range from about 4 to about 40;
  f) a density in a range from about 0.914 g/cm³ to 0.955 and/or
  g) a short chain branching (FTIR method) of from about 1 Me/1000 C to about 15 Me/1000 C.

In an aspect, the polyethylene (PE) prepared by the process which uses the first metallocene as disclosed herein can be characterized by a number-average molecular weight (Mn) in a range of from about 5,000 g/mol to about 250,000 g/mol, from about 10,000 g/mol to about 200,000 g/mol, or from about 20,000 g/mol to about 150,000 g/mol. The PE prepared by the process disclosed herein can be characterized by a weight-average molecular weight (Mw) in a range of from about 50,000 g/mol to about 700,000 g/mol, from about 75,000 g/mol to about 500,000 g/mol, or from about 100,000 g/mol to about 400,000 g/mol.

In a further aspect, polyethylene (PE) prepared by the process which uses the first metallocene as disclosed herein can be characterized by a density of the olefin polymer in a range of from about 0.92 g/cm$^3$ to about 0.96 g/cm$^3$, from about 0.93 g/cm$^3$ to about 0.95 g/cm$^3$, or from about 0.93 g/cm$^3$ to about 0.94 g/cm$^3$. The PE prepared by the process which uses the first metallocene as disclosed herein also can be characterized by a melt index (MI) in a range of from about 0 g/10 min to about 100 g/10 min, from about 0.1 g/10 min to about 50 g/10 min, or from about 0.5 g/10 min to about 10 g/10 min.

Articles

This disclosure also provides, in an aspect, a method for forming or preparing an article of manufacture comprising an olefin polymer, in which the method can comprise
a) performing the olefin polymerization process according to any process disclosed herein; and
b) fabricating the article of manufacture comprising the olefin polymer by any technique disclosed herein.

In another aspect, the article of manufacture comprising the olefin polymer that can be fabricated or made can be, for example, an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

EXAMPLES

General Considerations

Unless otherwise noted, all manipulations using air sensitive reagents were performed under standard Schlenk line or dry box techniques. Anhydrous ether (diethyl ether) and tetrahydrofuran were purchased from Aldrich and were used as received. Toluene, heptane, and pentane were sparged with nitrogen and stored over 4 Å molecular sieves prior to use. All reagents were purchased from Aldrich Chemical Company and used as received unless otherwise specified. The deuterated solvents $C_6D_6$, $CD_2Cl_2$, and $CDCl_3$ (Cambridge Isotope Laboratories) were degassed and stored over 4 Å molecular sieves in a dry box prior to use.

Magnesium sulfate and ammonium chloride were purchased from Fisher Scientific Company and used as received. The following compounds were prepared according to the indicated literature procedures: 1-pentafluorophenylindene (Deck, P.; Fronczek, F.; *Organometallics* 2000, 19, 327-333); (1-benzylindenyl)cyclopentadienyl zirconium dichloride (CE-3) (Alt, H.; Jung, M.; Milius, W.; *J. Organomet. Chem.* 1998, 558, 111-121); (1-phenyl-indenyl)cyclopentadienyl zirconium dichloride (CE-2) (Schmid, C.; Alt, H.; Welch, B.; European Patent Application EP 0798306A1); butylcyclopentadienyl(1-allylindenyl)zirconium dichloride (CE-4) (Jayaratne, K. C.; Jensen, M. D.; Yang, Q.; U.S. Patent Appl. Publ. 2007/0060722), 1-methyl-1-(3-butenyl)-1-(cyclopentadienyl)-1-(2,7-di-tert-butylfluorenyl)methane zirconium dichloride (CE-5) (Jayaratne, K. C.; Jensen, M. D.; Yang, Q.; U.S. Patent Appl. Publ. 2007/0060722), and diphenylmethylidene[3-(4-pentenyl)-cyclopentadien-1-ylidene[2,7-bis(tert-butyl)-fluoren-9-ylidene] hafnium dichloride (CE-6) (Yang, Q.; Jayaratne, K. C.; Jensen, M. D.; McDaniel, M. P.; Marten, J. L.; Thorn, M. G.; Lanier, J. T.; Crain, T. R.; U.S. Patent Appl. Publ. 2007/0197374).

The $^1$H chemical shifts are reported relative to $SiMe_4$ and were determined by reference to residual $^1$H solvent peaks in the deuterated solvents. NMR coupling constants are reported in hertz.

Polymer Characterization

Resin properties include molecular weight distribution (MWD), short chain branching (SCB), density, weight average molecular weight (Mw), number average molecular weight (Mn), polydispersity index ("PDI", Mw/Mn), and the like.

Melt index (MI, g/10 min or dg/min) was measured by measuring the rate of flow of a molten resin through an orifice of 0.0825 inch diameter as determined in accordance with ASTM D1238 at 190° C., with a 2,160 gram weight. High Load Melt Index (HMLI, dg/min) was measured by measuring the rate of flow of a molten resin through an orifice of 0.0825 inch diameter when subjected to a force of 21.6 kg at 190° C. in accordance with ASTM D1238.

Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 0.5-1.0 mg/mL, depending on the molecular weight. Sample preparation was conducted at 150° C. for nominally 4 hours with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the standard. The integral table of the standard was predetermined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve). The IB parameter was determined from the molecular weight distribution curve (that is, a plot of dW/d(Log M) vs. Log M; normalized to an area under the curve), and is defined as $1/[dW/d(\text{Log M})]_{MAX}$.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter, α (CY-a parameter). The simplified Carreau-Yasuda (CY) empirical model is as follows:

$$|\eta^*(\omega)| = \frac{\eta_0}{[1+(\tau_\eta\omega)^\alpha]^{(1-n)/\alpha}}$$

wherein:

|η*(ω)|=magnitude of complex shear viscosity;

$\eta_0$=zero shear viscosity;

$\tau_\eta$=viscous relaxation time (Tau(q));

α="breadth" parameter (CY-a parameter);

n=fixes the final power law slope, fixed at 2/11; and

ω==angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1*, Fluid Mechanics, 2nd Edition, John Wiley & Sons (1987); each of which is incorporated herein by reference in its entirety.

The ATREF procedure was as follows. Forty mg of the polymer sample and 20 mL of 1,2,4-trichlorobenzene (TCB) were sequentially charged into a vessel on a PolyChar TREF 200+ instrument. After dissolving the polymer, an aliquot (500 microliters) of the polymer solution was loaded on the column (stainless steel shots) at 150° C. and stabilized at 110° C. (with a cooling rate from 150° C. to 110° C. of 10° C./min for 10 minutes before cooling at 0.5° C./min to 35° C. Then, the elution was begun with a 0.5 mL/min TCB flow rate and heating at 1° C./min up to 120° C., and analyzing with an IR detector. The peak ATREF temperature is the location, in temperature, of the highest point of the ATREF curve.

Short chain branching was determined by the following FTIR method. Polymer samples (0.5 g) were heated to 190° C. in a compression mold (25×0.5 mm disc). After 5 minutes at 190° C., the samples were compressed to 30,000 psi and held for 5 minutes. The samples were then cooled to ~40° C. over approximately 5 minutes and the pressure was then released. FTIR spectra were recorded from 4000 to 650 $cm^{-1}$ on an Agilent Cary 630 FTIR spectrometer. The absorbance at 1378 $cm^{-1}$ and area of the band centered at 2019 $cm^{-1}$ were used to calculate SCB expressed as methyls/1000 total carbons (Me/1000 TC) according to the following equation:

$$N = \{[A(1378\ cm^{-1})/\text{Area}(2019\ cm^{-1})] - b\}/a,$$

wherein:

N=Me/1000 TC a=slope b=ordinate intercept

A (1378 $cm^{-1}$)=Absorbance at 1378 $cm^{-1}$

Area (2019 $cm^{-1}$)=Area of band centered at 2019 $cm^{-1}$; and wherein a and b were determined from a standard calibration plot of (absorbance at 1378 $cm^{-1}$/area of band centered at 2019 $cm^{-1}$) versus SCB determined by $^{13}$C NMR.

Metallocene Compounds

Generally, the metallocene compounds are identified using the abbreviated terminology [1] "IE" for the inventive first metallocenes, which comprise a substituted indenyl ligand having at least one halogen-substituted $C_1$-$C_{20}$ hydrocarbyl group substituent, or [2] "CE" for comparative example metallocenes which either a) are absent any halogenated substituents, b) incorporate the halogenated substituent at a cyclopentadiene ligand rather than an indene ligand, or c) contain a bridging group (ansa-metallocene).

Structures of metallocene compounds which comprise a substituted indenyl ligand having at least one halogen-substituted $C_1$-$C_{20}$ hydrocarbyl group substituent (the first metallocene compound) which were used in the polymerization studies disclosed herein are shown below as compounds IE-1 through IE-6.

IE-1

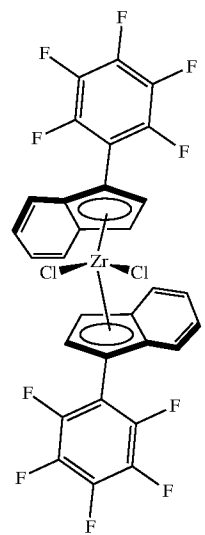

IE-2

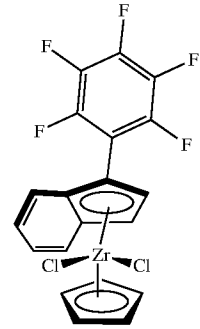

-continued
IE-3
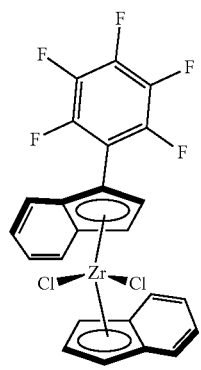
IE-4
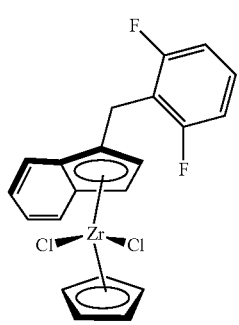
IE-5
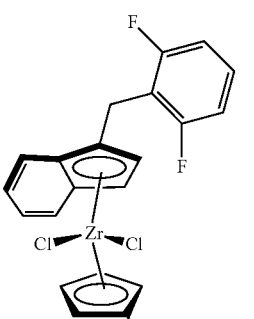
IE-6
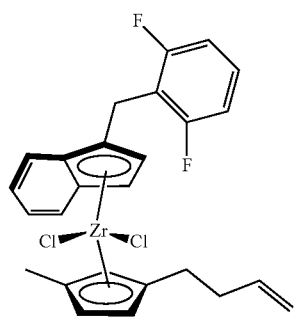
Structures of metallocene compounds which can comprise a bridging group (ansa-metallocene) which were used in the polymerization studies disclosed herein are shown below as compounds CE-1 through CE-6.
CE-1
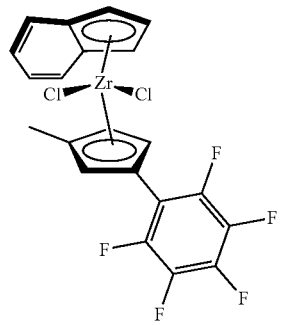
CE-2
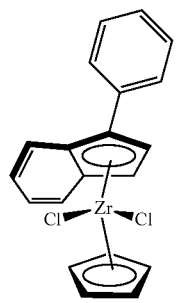
CE-3
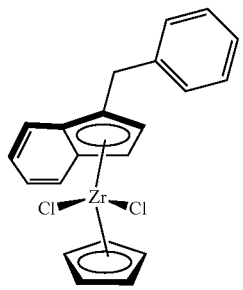
CE-4
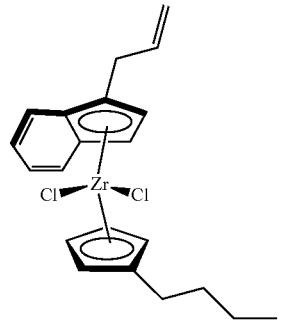
CE-5
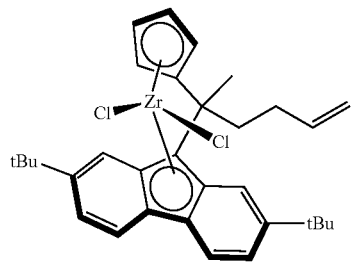

CE-6

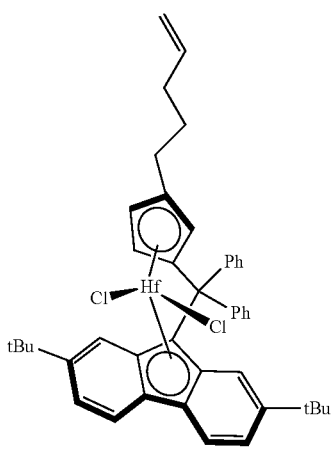

Preparation of Compounds

The following ligands and metallocene compounds were prepared according to the detailed procedure.

Preparation of
1-methyl-3-(4-butenyl)cyclopentadiene

A 500 mL flask equipped with a reflux condenser and addition funnel was charged with magnesium turnings (5.0 g, 206 mmol) and diethyl ether (200 mL), and this mixture was stirred vigorously for 1 hour at ambient temperature. 4-Bromobutene (26.4 g, 196 mmol) diluted in 20 mL of diethyl ether was slowly charged at a rate to maintain reflux (charge complete after 45 minutes. The resulting Grignard was cannulated over 45 minutes to a flask containing 3-methyl-2-cyclopenten-1-one diluted in 50 mL diethyl ether and 20 mL tetrahydrofuran at 0-20° C. The resulting mixture was stirred overnight, after which, 300 mL of saturated $NH_4Cl$ was added to the mixture. The resulting mixture was acidified to pH~4 (about 4) using 15% HCl. The resulting biphasic mixture was phase separated, the aqueous layer was extracted with 70 mL of diethyl ether, and the combined organics were dried over $MgSO_4$. The mixture was filtered, and the resulting bright orange solution was stripped to an orange oil. The oil was diluted in hexanes and passed through a plug of silica. The silica gel was rinsed with a 10:90 mixture of ethyl acetate:hexanes. The resulting organics were stripped to pure orange oil (4.1 g, 16% yield). GC-MS indicated 2 isomers with m/z=134.

Preparation of
1-(pentafluorophenyl)-3-methylcyclopentadiene

A 100 mL flask was charged with NaH (2.9 g, 121 mmol) and 30 mL of THF. Freshly cracked methylcyclopentadiene (9.7 g, 121 mmol) was added over 30 minutes. The mixture was stirred at ambient temperature for 1.5 hours and then heated to reflux. After 30 minutes at reflux, the mixture was cooled to ambient temperature and stirred overnight. The mixture was cooled to −20° C., and hexafluorobenzene (7.0 mL, 60.5 mmol) in THF was added over 5 minutes. The cooling bath was removed, and the green mixture began to heat rapidly. The cooling bath was replaced, and the mixture was held at approximately 0° C. for 2 hours. The mixture was then warmed to ambient and was stripped under high vacuum to a green taffy. The mixture was triturated with 50 mL of hexanes, and then dried under high vacuum. The resulting paste was added to 800 mL water and stirred vigorously. The resulting slurry was filtered and liquid phase was extracted with ether. The organics were dried over $MgSO_4$, filtered, and stripped under vacuum to yield a pale yellow solid. The solid was recrystallized from methanol to yield 2.0 g (8 mmol, 13%) pure product as two double bond isomers in a 1:2 molar ratio. Isomer A: $^1$H NMR ($C_6D_6$) δ=6.99 (1H, Cp), 6.20 (1H, Cp), 3.34 (2H, Cp), 2.07 (3H, Me). Isomer B: $^1$H NMR ($C_6D_6$) δ=6.97 (1H, Cp), 6.15 (1H, Cp), 3.40 (2H, Cp), 2.00 (3H, Me).

Preparation of 3-(2,6-difluorobenzyl)indene

A 100 mL flask was charged with 50 mL of toluene, 5 mL of THF, and indene (1.1 g, 9.7 mmol). nBuLi (6.1 mL, 9.8 mmol) was added at room temperature and the mixture was stirred for 1.5 hours. A toluene solution (20 mL) of 2,6-difluorobenzylbromide (2.0 g, 9.7 mmol) was added and the resulting solution was stirred overnight. The mixture was purified via aqueous work-up followed by column chromatography (10% ethyl acetate/90% hexanes). Yield: 1.78 g (76%). $^1$H NMR ($C_6D_6$) δ=7.26-7.10 (m, 5H), 6.82 (m, 2H), 6.72 (d, 1H), 6.30 (d, 1H), 3.69 (m, 1H), 3.12 (m, 1H), 2.65 (m, 1H).

Preparation of bis(1-pentafluorophenylindenyl)
zirconium dichloride (IE-1)

A 250 mL flask was charged with 1-pentafluorophenylindene (1.0 g, 3.5 mmol), 100 mL toluene, and 5 mL of diethyl ether. The solution was cooled to −15° C. and nBuLi (1.4 mL, 3.5 mmol) diluted in 10 mL of diethyl ether was added dropwise over 5 minutes. The resulting mixture was allowed to warm with stirring and was held at ambient temperature for 1 hour. A second 250 mL flask was charged with $ZrCl_4$ (0.41 g, 1.8 mmol) and 20 mL toluene. The lithium(1-pentafluorophenylindenide) slurry was then cannulated to the $ZrCl_4$ slurry at −40° C. over 5 minutes. The resulting yellow slurry was allowed to warm to ambient temperature overnight with stirring. The mixture was centrifuged, and the bright yellow supernatant was cannulated to a receiving flask. The mixture was concentrated to ~15 mL (about 15 mL) under high vacuum. Crystals began to form at ambient temperature within several hours. Several crops of bright yellow crystals yielded 0.32 g (25%). $^1$H NMR ($C_6D_6$) δ=6.41 (m, 2H) indene), 6.71 (m, 2H), 7.2-7.4 (m, 6H), 7.47 (d, 2H).

Preparation of
(1-pentafluorophenylindenyl)cyclopentadienyl
zirconium dichloride (IE-2)

A 100 mL flask was charged with 1-(pentafluorophenyl) indene (1.0 g, 3.5 mmol), 30 mL of toluene, and 5 mL of diethyl ether. The solution was cooled to −40° C. and nBuLi (1.4 mL, 3.6 mmol) was added. The solution was allowed to warm to room temperature and was stirred 2 hours. The mixture was then cannulated to a separate flask containing $CpZrCl_3$ (0.92 g, 3.5 mmol) in 20 mL of toluene at −78° C. The resulting slurry was allowed to warm to room temperature overnight with vigorous stirring. The mixture was centrifuged, and the supernatant was stripped to a yellow paste. The solids were recrystallized from a mixture of toluene and hexanes to yield 0.51 g (28%) of bright yellow solids. $^1$H NMR ($C_6D_6$) δ=7.62 (d, 1H, indene), 7.58 (d, 1H, indene), 7.20 (m, 1H, indene), 7.11 (m, 1H, indene) 6.86 (m, 1H, indene), 6.71 (d, 1H, indene), 6.20 (s, 5H, Cp).

Preparation of (1-pentafluorophenylindenyl)indenyl zirconium dichloride (IE-3)

A 250 mL flask was charged with 1-pentafluorophenyl-indene (4.51 g, 16.0 mmol), 5 mL diethyl ether, and 100 mL toluene. At ambient temperature nBuLi (6.7 mL, 16.8 mmol) was added over 30 minutes. The mixture was stirred 2 hours and then added to a slurry of $ZrCl_4$ (5.0 g, 16.0 mmol) in toluene (40 mL) at −40° C. The resulting slurry was allowed to warm to ambient temperature overnight with stirring. The slurry was stripped to a paste ad taken up in a mixture of toluene (15 mL) and hexanes (50 mL). The mixture was filtered, and the solids were washed with 20 mL of hexanes and dried under high vacuum to yield 4.66 g metallocene/LiCl. $^1$H NMR ($C_6D_6$) δ=7.30 (m, 2H), 7.20 (d, 2H), 7.00 (m, 1H), 6.86 (m, 3H), 6.06 (m, 1H), 6.01 (m, 2H), 5.86 (m, 2H).

Preparation of (1-(2,6-difluorobenzyl)indenyl)cyclopentadienyl zirconium dichloride (IE-4)

A 100 mL flask was charged with 3-(2,6-difluorobenzyl)indene (1.78 g, 7.4 mmol) and 50 mL of diethyl ether. The mixture was cooled to −40° C., and nBuLi (4.7 mL, 7.5 mmol) was added. This mixture was allowed to warm to room temperature and stirred for 1.5 hours. A slurry of $CpZrCl_3$ (1.94 g, 7.4 mmol) in diethyl ether (20 mL) at −78° C. was cannulated into the mixture. The resulting mixture was allowed to warm to room temperature with vigorous stirring overnight. The slurry was centrifuged and the supernatant stripped to provide a yellow paste, which was recrystallized from a mixture of toluene and hexanes to yield 1.45 g (42%) of a yellow microcrystalline solid. $^1$H NMR ($C_6D_6$) δ=7.89 (d, 1H, indene), 7.14 (m, 1H, indene), 7.00 (d, 1H, indene), 6.86 (m, 1H, benzyl), 6.75 (m, 1H, Benzyl), 6.67 (m, 1H, Benzyl), 6.45 (m, 3H, indene), 5.76 (s, 5H, Cp), 5.71 (d, 1H, indene), 4.51 (d, 1H, benzyl-$CH_2$), 4.27 (d, 1H, benzyl-$CH_2$).

Preparation of (1-(2,6-difluorobenzyl)indenyl)((3-butenyl)cyclopentadienyl) zirconium dichloride (IE-5)

A flask was charged with 4-bromobutene (1.1 g, 8.2 mmol) and 30 mL of pentane. Sodium cyclopentadienide (2.0 M in THF, 4.3 mL, 8.5 mmol) was added and the mixture was stirred for 4 days at ambient temperature. The mixture was filtered and the filtrate was added to $Zr(NMe_2)_4$ (2.0 g, 7.5 mmol) in toluene (20 mL) at room temperature. This mixture was stirred overnight and chlorotrimethylsilane (3.7 mL, 20.0 mmol) was added. The resulting mixture was heated to 50° C. for 3 hours and then stripped to an oil under high vacuum. A separate flask was charged with 2,6-difluorobenzylindene (1.8 g, 7.5 mmol) and 40 mL of ether. nBuLi (1.6 M in hexanes, 4.7 mL, 7.5 mmol) was added at room temperature and the mixture was stirred overnight. The reaction mixture was then transferred to the previously prepared (3-butenyl)cyclopentadienyzirconium trichloride dissolved in 40 mL of ether at −40° C. The resulting mixture was allowed to warm to ambient temperature and was stirred for 5 hours. The bright orange mixture was filtered and the solvent was removed under high vacuum leaving a brown oil. The oil was taken up in a mixture of toluene and pentane. Several crops of yellow precipitate yielded 0.568 g (14%) of the desired product. $^1$H NMR ($C_6D_6$) δ=7.85 (d, 1H, Indene), 6.99 (m, 1H, Indene), 6.86 (m, 1H, Indene), 6.75 (m, 1H, indene), 6.69 (m, 1H, Indene), 6.63 (m, 1H, Indene), 6.37 (m, 3H, —$CH_2C_6H_3F_2$, 5.76 (m, 1H, Cp), 5.72 (m, 1H, Cp), 5.65 (m, 1H, Cp), 5.58 (m, 1H, —$CH_2CH_2CH$=$CH_2$), 5.37 (m, 1H, —Cp), 4.87 (m, 2H, —$CH_2CH_2CH$=$CH_2$), 4.44 (m, 1H, —$CH_2C_6H_3F_2$), 4.28 (m, 1H, —$CH_2C_6H_3F_2$), 2.56 (m, 2H, —$CH_2CH_2CH$=$CH_2$), 2.05 (m, 2H, —$CH_2CH_2CH$=$CH_2$).

Preparation of (1-(2,6-difluorobenzyl)indenyl)1-(3-butenyl)-3-methylcyclopentadienyl zirconium dichloride (IE-6)

A flask was charged with $Zr(NMe_2)_4$ (2.7 g, 10.1 mmol) and 30 mL of toluene. At room temperature, 1-(butenyl)-3-methylcyclopentadiene (1.25 g, 10.2 mmol) in 5 mL of toluene was added and the mixture was stirred overnight. The solvent was removed under high vacuum and 40 mL of toluene was added back. Trimethylsilyl chloride (6.0 g, 56.3 mmol) was then added and the mixture was heated to 50° C. for 1.5 hours. The resulting mixture was stripped under high vacuum to a red-brown oil. A separate flask was charged with 2,6-difluorobenzylindene (2.45 g, 10.1 mmol) and 40 mL of ether. The solution was cooled to 0° C. and nBuLi (1.6 M in hexanes, 6.3 mL, 10.1 mmol) was added slowly. After 1 hour, the (3-butenyl)cyclopentadienyl-zirconium trichloride prepared above was taken up in 40 mL of ether and cannulated to the lithium (2,6-difluorobenzylindenide) solution at −20° C. The mixture was allowed to warm to ambient temperature with stirring. After 3 days, the mixture was stripped under high vacuum to an orange paste. Toluene (50 mL) was added and the mixture was centrifuged. The orange supernatant was cannulated to a fresh vessel and was concentrated to −20 mL. Pentane (10 mL) was added, producing a bright yellow precipitate which was isolated by filtration and dried under high vacuum to yield 2.06 g of product. A second crop of solids (0.23 g) was isolated from the filtrate after storage at −20° C. for several days. Total yield: 2.29 g (42%). $^1$H NMR indicated the presence of 2 isomers. $^1$H NMR ($C_6D_6$) δ=8.14 (d, 2H, Indene), 7.36 (s, 2H, Indene), 7.27 (d, 2H, Indene), 7.08 (m, 4H, indene), 6.65 (m, 6H, —$CH_2C_6H_3F_2$, 5.99 (m, 4H, Cp), 5.89 (m, 2H, —$CH_2CH_2CH$=$CH_2$), 5.66 (m, 2H, Cp), 5.16 (m, 6H, Cp+—$CH_2CH_2CH$=$CH_2$), 4.80 (m, 2H, —$CH_2C_6H_3F_2$), 4.52 (d, 2H, —$CH_2C_6H_3F_2$), 2.60 (m, 4H, —$CH_2CH_2CH$=$CH_2$), 2.26 (m, 4H, —$CH_2CH_2CH$=$CH_2$), 2.19 (s, 3H, Me), 2.08 (s, 3H, Me).

Preparation of (1-(pentafluorophenyl)-3-methylcyclopentadienyl)indenyl zirconium dichloride (CE-1)

A 100 mL flask was charged with 1-pentafluorophenyl-3-methylcyclopentadiene (0.63 g, 2.6 mmol), 40 mL of toluene, and 12 mL of diethyl ether. nBuLi (1.0 mL, 2.5 mmol) was added at ambient temperature and stirred 1 hour to generate a white slurry. The slurry was transferred to a 100 mL flask containing indenyl zirconium trichloride (0.80 g, 2.6 mmol) in 30 mL of toluene at −78° C. The resulting slurry was allowed to warm to ambient temperature overnight with vigorous stirring. This mixture was centrifuged, and the liquid layer was transferred to a separate flask, concentrated to 30 mL, and placed in a freezer at −20° C. Several crops of yellow microcrystalline solid yielded 0.919 g (68%) product. $^1$H NMR ($C_6D_6$) δ=7.29 (m, 2H, indene), 6.99 (m, 2H, indene), 6.50 (m, 1H, Cp), 6.37 (t, 1H, indene), 6.07 (m, 2H, indene), 5.79 (m, 1H, Cp), 5.19 (m, 1H, Cp), 1.80 (s, 3H, Me).

General Polymerization Procedure

In a glove box, a syringe was charged with the following reagents in the following order: 250 mg solid oxide activator-support (chemically treated solid oxide), ~2 mL hexanes, 0.5 mL TiBA (triisobutyl aluminum, 1.0 M in hexanes), and 2 mL of a 1 mg/mL metallocene slurry in hexanes. The mixture was contacted for 2-5 minutes prior to being injected into an isobutane purged 1-gallon autoclave reactor. The reactor was sealed and charged with 2 L of isobutane. The mixture was heated to the desired temperature over 5-7 minutes with stirring (~1000 rpm). When the mixture reached 8° C. below the prescribed temperature target, the desired amount of 1-hexene was added as the reactor was charged with ethylene to the targeted pressure. The reaction was continued for 30 minutes while maintaining the prescribed temperature and pressure with pressurized ethylene as needed. After 30 minutes, the reactor was vented and flushed with nitrogen. The reactor solids were removed and dried under vacuum for a minimum of 3 hours prior to testing.

Polymerization Results

Using the general polymerization procedure outlined above, the Table 1 shows polymerization conditions and polymer characterization data for a series of polymerization tests which were run using a single metallocene which contains at least one indenyl ligand which includes a halogenated substituent. Metallocene compounds ("Catalysts") IE-1 through IE-6 correspond to first metallocene compounds, specifically, metallocene compounds which comprise a substituted indenyl ligand having at least one halogen-substituted $C_1$-$C_{20}$ hydrocarbyl group substituent, designated by formulas IE-1 through IE-6 as shown above. Metallocene compounds ("Catalysts") CE-1 through CE-4 of this table correspond to comparative example metallocenes which either a) are absent any halogenated substituents, or b) incorporate the halogenated substituent at a cyclopentadiene ligand rather than an indene ligand. In Table 1, the catalyst composition includes 250 mg of fluorided silica-coated alumina, 0.5 mL TiBA (triisobutyl aluminum, 1.0 M in hexanes), and 2.0 mg of metallocene compound.

Using the general polymerization procedure outlined above, Table 2 shows polymerization conditions and polymer characterization data for a series of polymerization tests which were run using dual metallocene catalysts, that is, a first metallocene compound of the IE-series in Table 2, combined with a second metallocene of the CE-series. In some tests, both metallocenes are of the CE series; therefore, the metallocenes in Table 2 are identified, but designated simply as Metallocene A and Metallocene B. There is a single example of a single CE series metallocene ("second" metallocene) used alone. In Table 2, the catalyst composition includes 250 mg of fluorided silica-coated alumina, 0.5 mL TiBA (triisobutyl aluminum, 1.0 M in hexanes), and when two metallocenes are used, a total of 2.0 mg of metallocene compounds are employed.

In the tables, the following abbreviations are used: SSA, activator-support comprising a solid oxide treated with an electron-withdrawing anion; T, temperature; P, pressure; TIBA, triisobutyl aluminum; C6=, 1-hexene; PE, polyethylene; MI, melt index; HLMI, high load melt index; MWD, Mn, number average molecular weight; Mw, weight average molecular weight; molecular weight distribution or polydispersity (Mw/Mn).

TABLE 1

Polymerization conditions and polymer characterization data for ethylene polymerizations using single metallocenes.

| Catalyst | Ex. | P (psig) | T (° C.) | 1-hexene (g) | Support Activity (g/g · h) | MI (dg/min.) | HLMI dg/min. | Me/1000 C (FTIR) | Mn (×10⁻³) | Mw (×10⁻³) | MWD | Density (g/cc) |
|---|---|---|---|---|---|---|---|---|---|---|---|---|
| IE-1 | 1 | 450 | 80 | 0 | 267 | 0.45 | | | 96.75 | 420.2 | 4.3 | |
| | 2 | 320 | 80 | 10 | 28 | | | | | | | |
| | 3 | 450 | 80 | 20 | 103 | 0.24 | | | 38.41 | 257.12 | 6.7 | |
| | 4 | 320 | 80 | 40 | 20 | | | | | | | |
| IE-2 | 5 | 320 | 80 | 0 | 1088 | 0 | 0.57 | 1.031 | 132.24 | 287.67 | 2.2 | 0.949 |
| | 6 | 320 | 80 | 10 | 984 | 0 | 1.1 | 2.212 | 113.26 | 249.93 | 2.2 | 0.9377 |
| | 7 | 320 | 80 | 20 | 816 | 0.05 | 1.7 | 3.572 | 97.3 | 226.74 | 2.3 | 0.9333 |
| | 8 | 320 | 80 | 40 | 656 | 0.11 | 3.5 | 6.277 | 80.34 | 192.12 | 2.4 | 0.9294 |
| IE-3 | 9 | 320 | 80 | 0 | 352 | 0 | 0.88 | 1.375 | 41.3 | 306.35 | 7.4 | 0.9546 |
| | 10 | 320 | 80 | 10 | 272 | 0 | 2.1 | 2.847 | 21.66 | 247.74 | 11.4 | 0.9494 |
| | 11 | 320 | 80 | 20 | 256 | 0.097 | 4 | 4.174 | 19.13 | 228.38 | 11.9 | 0.947 |
| | 12 | 320 | 80 | 40 | 232 | 0.16 | 8.1 | 6.472 | 13.53 | 201.88 | 14.9 | 0.9433 |
| IE-4 | 13 | 320 | 80 | 0 | 1032 | 0 | 1 | 0.998 | 117.57 | 262.63 | 2.2 | 0.9506 |
| | 14 | 320 | 80 | 10 | 776 | 0.2 | 5.1 | 2.2 | 70.16 | 181.16 | 2.6 | 0.9439 |
| | 15 | 320 | 80 | 20 | 888 | 0.65 | 13.3 | 3.27 | 47.83 | 136.37 | 2.9 | 0.9415 |
| | 16 | 320 | 80 | 40 | 792 | 1.2 | 23.2 | 4.65 | 41.72 | 118.82 | 2.8 | 0.9393 |
| | 21 | 320 | 80 | 10 | 1040 | 0.23 | 4.8 | 2.274 | 71.81 | 170.05 | 2.4 | 0.9422 |
| | 23 | 320 | 80 | 20 | 1040 | 0.46 | 22 | 3.237 | 59.60 | 143.76 | 2.4 | 0.9405 |
| | 24 | 320 | 80 | 40 | 1088 | 1.6 | 79.8 | 5.038 | 39.30 | 108.07 | 2.7 | 0.9381 |
| IE-5 | 25 | 320 | 80 | 0 | 1240 | 0 | 1.6 | 0.876 | 68.3 | 235.4 | 3.4 | 0.9514 |
| | 26 | 320 | 80 | 10 | 1376 | 0.19 | 1.6 | 1.42 | 57.0 | 185.6 | 3.3 | 0.9455 |
| | 27 | 320 | 80 | 20 | 1104 | 0.85 | 17.6 | 2.297 | 33.1 | 134.7 | 4.1 | 0.944 |
| | 28 | 320 | 80 | 40 | 920 | 3.3 | 65.6 | 3.531 | 22.2 | 93.7 | 4.2 | 0.9429 |
| | 29 | 320 | 80 | 0 | 1296 | 0 | 1.8 | 0.523 | | 221.41 | 2.5 | 0.9526 |
| | 30 | 320 | 80 | 10 | 1208 | 0.29 | 5.2 | 1.264 | 68.67 | 170.76 | 2.5 | 87.67 |
| | 31 | 320 | 80 | 20 | 976 | 0.96 | 19.1 | 2.494 | 45.22 | 122.35 | 2.7 | 0.9442 |
| | 32 | 320 | 80 | 40 | 952 | 3 | 60.8 | 3.475 | 32.46 | 94.66 | 2.9 | 0.9429 |
| IE-6 | 33 | 320 | 80 | 0 | 384 | 0.27 | 8.2 | 0.687 | 35.03 | 129.19 | 3.7 | 0.9644 |
| | 34 | 320 | 80 | 10 | 376 | 4.3 | 117 | 1.298 | 22.70 | 83.26 | 3.7 | 0.9625 |
| | 35 | 320 | 80 | 20 | 432 | 12.3 | 176 | 2.316 | 17.45 | 63.94 | 3.7 | 0.9596 |
| | 36 | 320 | 80 | 40 | 448 | 13.6 | 228 | 3.095 | 13.97 | 65.03 | 4.7 | 0.9564 |

TABLE 1-continued

Polymerization conditions and polymer characterization data for ethylene polymerizations using single metallocenes.

| Catalyst | Ex. | P (psig) | T (° C.) | 1-hexene (g) | Support Activity (g/g · h) | MI (dg/min.) | HLMI dg/min.) | Me/1000 C (FTIR) | Mn (×10⁻³) | Mw (×10⁻³) | MWD | Density (g/cc) |
|---|---|---|---|---|---|---|---|---|---|---|---|---|
| CE-1 | 37 | 320 | 80 | 0 | 1056 | 0 | 1.9 | 1.167 | 102.35 | 218.44 | 2.1 | 0.9505 |
|  | 38 | 320 | 80 | 10 | 880 | 0.17 | 3.5 | 2.89 | 84.83 | 180.74 | 2.1 | 0.9381 |
|  | 39 | 320 | 80 | 20 | 664 | 3.4 | 7.4 | 5.399 | 63.93 | 148.9 | 2.3 | 0.9328 |
|  | 40 | 320 | 80 | 40 | 536 | 8.3 | 17.4 | 10.147 | 43.8 | 117.9 | 2.7 |  |
| CE-2 | 41 | 320 | 80 | 0 | 760 | 0 | 0 |  | 125.31 | 286.49 | 2.3 | 0.9491 |
|  | 42 | 320 | 80 | 10 | 1000 | 0 | 2.5 |  | 98.3 | 209.68 | 2.1 | 0.9372 |
|  | 43 | 320 | 80 | 20 | 1080 | 0.18 | 3.7 |  | 83.87 | 192.61 | 2.3 | 0.9317 |
|  | 44 | 320 | 80 | 0 | 1120 | 0 | 1.4 | 1.172 | 100.22 | 232.75 | 2.3 | 0.9496 |
|  | 45 | 320 | 80 | 10 | 1344 | 0.11 | 2.9 | 2.477 | 88.33 | 191.86 | 2.2 | 0.9394 |
|  | 46 | 320 | 80 | 20 | 1712 | 0.13 | 3.8 | 3.834 | 80.7 | 176.62 | 2.2 | 0.9336 |
|  | 47 | 320 | 80 | 40 | 2000 | 0.27 | 5.8 | 6.035 | 72.7 | 159.58 | 2.2 | 0.9285 |
|  | 48 | 320 | 80 | 20 | 1856 | 0.13 | 2.9 | 3.736 | 87.02 | 185.16 | 2.1 | 0.9331 |
| CE-3 | 49 | 320 | 80 | 0 | 792 | 0 | 1.4 | 1.136 | 98.45 | 230.93 | 2.3 | 0.9499 |
|  | 50 | 320 | 80 | 10 | 720 | 0 | 3.3 | 2.211 | 79.8 | 183.32 | 2.3 | 0.943 |
|  | 51 | 320 | 80 | 20 | 632 | 0.36 | 7.1 | 4.144 | 60.61 | 146.81 | 2.4 | 0.9384 |
|  | 52 | 320 | 80 | 40 | 808 | 0.57 | 25.2 | 6.468 | 54.3 | 131.36 | 2.4 | 0.9301 |
| CE-4 | 53 | 320 | 80 | 0 | 1144 | 0 | 2.7 | 0.959 | 72.9 | 196.41 | 2.7 | 0.9514 |
|  | 54 | 320 | 80 | 10 | 1392 | 0.28 | 5.3 | 1.794 | 73.19 | 166.97 | 2.3 | 0.9423 |
|  | 55 | 320 | 80 | 20 | 1320 | 0.46 | 8.2 | 2.863 | 64.73 | 148.02 | 2.3 | 0.9377 |
|  | 56 | 320 | 80 | 40 | 1472 | 0.59 | 10.3 | 4.44 | 59.9 | 139.74 | 2.3 | 0.9317 |

Catalyst composition: 250 mg fluorided silica coated alumina, 0.5 mL TiBA (1.0M in hexanes), 2.0 mg metallocene compound

TABLE 2

Polymerization conditions and polymer characterization data for ethylene polymerizations using dual metallocenes.

| Ex. | Metallocene A | mg A | μmol A | Metallocene B | mg B | μmol B | T | P | g C6= | g PE | Support Produtivity (g/g) |
|---|---|---|---|---|---|---|---|---|---|---|---|
| 57 | IE-4 | 1.5 | 3.20 | CE-5 | 0.5 | 0.86 | 80 | 320 | 20 | 332 | 1328 |
| 58 | — |  |  | CE-5 | 0.5 | 0.86 | 80 | 320 | 20 | 334 | 1336 |
| 59 | CE-4 | 1.5 | 3.42 | CE-5 | 0.5 | 0.86 | 80 | 320 | 20 | 280 | 1120 |
| 60 | CE-4 | 0.5 | 1.14 | CE-6 | 1.5 | 2.06 | 95 | 420 | 20 | 200 | 800 |
| 61 | IE-4 | 0.5 | 1.07 | CE-6 | 1.5 | 2.06 | 95 | 420 | 20 | 225 | 900 |
| 62 | CE-4 | 0.5 | 1.14 | CE-6 | 1.5 | 2.06 | 95 | 420 | 0 | 99 | 396 |
| 63 | IE-4 | 0.5 | 1.07 | CE-6 | 1.5 | 2.06 | 95 | 420 | 0 | 90 | 360 |

| Ex. | Support Activity (g/g · h) | Total Metallocene Productivity (g/g) | Total Metallocene Activity (g/g · h) | MI | HLMI | d (g/cc) | Me/ −1000 C (FTIR) | Mn | Mw | MWD |
|---|---|---|---|---|---|---|---|---|---|---|
| 57 | 2656 | 166000 | 332000 | 0.1 | 4.3 | 0.9342 | 4.148 | 38.4 | 205.0 | 5.3 |
| 58 | 2672 | 668000 | 1336000 | 0.13 | 3.7 | 0.9244 | 6.795 | 60.1 | 190.2 | 3.2 |
| 59 | 2240 | 140000 | 280000 | 0.23 | 6.9 | 0.9331 | 4.98 | 46.4 | 187.2 | 4.0 |
| 60 | 1600 | 100000 | 200000 | 0 | 0.51 | 0.9314 | 6.059 | 21.38 | 525.32 | 24.57 |
| 61 | 1800 | 112500 | 225000 | 0 | 0.19 | 0.9292 | 10.854 | 17.55 | 618.37 | 35.23 |
| 62 | 792 | 49500 | 99000 | 0 | 0 | 0.9484 | 1.409 | 60.16 | 816.05 | 13.56 |
| 63 | 720 | 45000 | 90000 | 0 | 0 | 0.9479 | 1.307 | 69.34 | 953.51 | 13.75 |

Catalyst composition: 250 mg fluorided silica-coated alumina, 0.5 mL TiBA (1.0M in hexanes), metallocene compounds as designated As described herein, it has been discovered that metallocenes which contain at least one indenyl ligand which includes a halogenated substituent, such as a fluorinated substituent, show improved α-olefin comonomer rejecting properties when combined with a co-catalyst such as a trialkylaluminum compound and a solid activator-support comprising a solid oxide treated with an electron withdrawing anion. These new metallocene compounds ("pre-catalysts") have an improved capability for producing low molecular weight polyethylene with very low levels of short-chain branching (SCB) in the presence of α-olefin as compared to previously reported metallocenes and catalyst systems.

Specifically, it has been found that metallocenes which include at least one indenyl ligand containing a fluorinated substituent constitute excellent α-(alpha-)olefin rejecting catalysts when combined with a solid oxide activator-support and a co-catalyst such as a trialkylaluminum compound. A review of the data from Table 1 suggests that, when comparing the metallocenes IE-2, IE-3, and IE-4 shown below, which each contains an indenyl ligand with a fluorinated hydrocarbyl substituent, the order of catalyst activity and co-monomer rejection both increase in the order: IE-3<IE-2<IE-4.

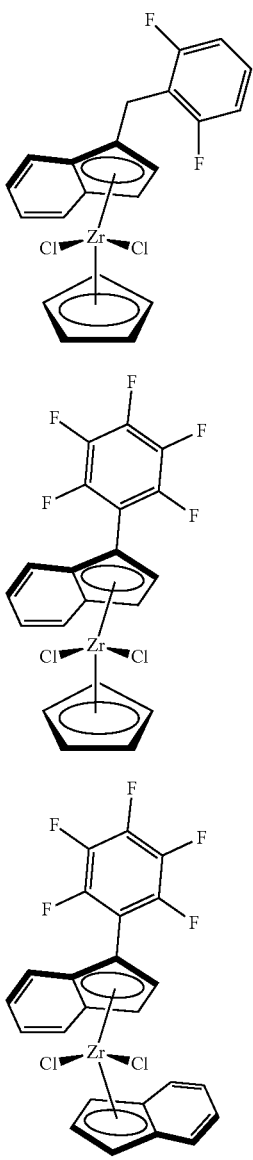

IE-4

IE-2

IE-3

Figure 2:
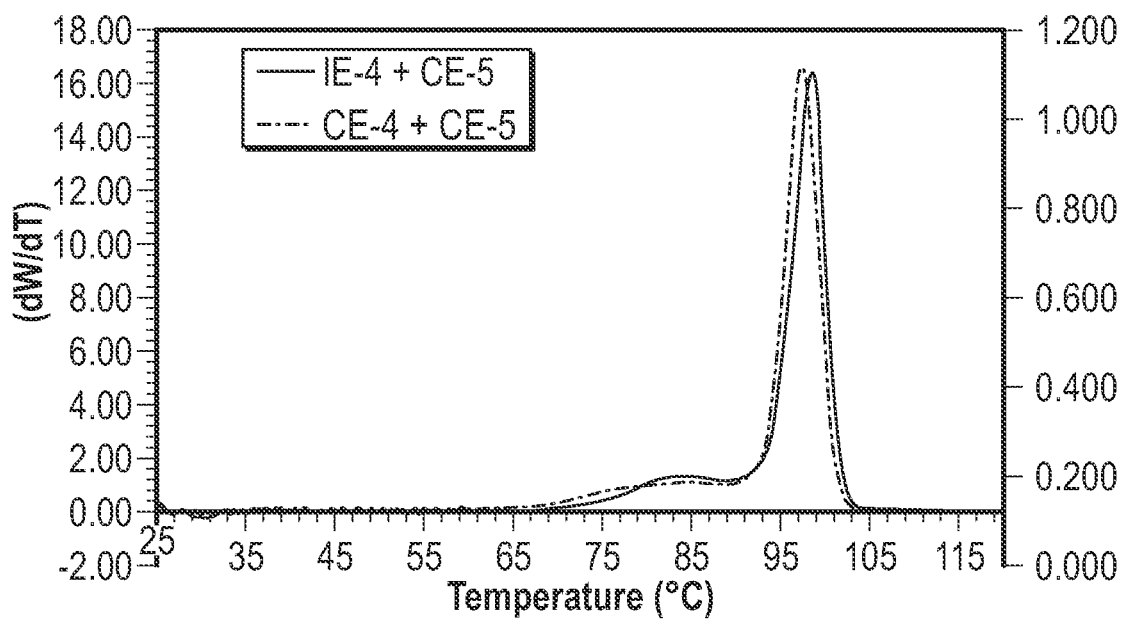
FIG. 2 presents a TREF (Temperature Rising Elution Fractionation) plot of temperature versus dW/dT for bimodal polyethylene copolymer samples prepared according to Example 57 and Example 59, demonstrating increased peak TREF elution temperatures of the bimodal polyethylene prepared using a combination of [1] a first metallocene compound comprising a substituted indenyl ligand having at least one halogen-substituted $C_1$-$C_{20}$ hydrocarbyl group substituent and [2] a second ansa-metallocene compound comprising a bridge between the two cycloalkadienyl-type ligands.

Surprisingly, it has also been found that under dual metallocene conditions, the so-called "first" metallocenes containing halogenated substituents (for example, fluorinated substituents) yield resins with improved separation of high and low molecular weight components as illustrated in FIG. 1, increased density as shown in Table 2, and increased peak TREF elution temperatures as demonstrated in FIG. 2, all versus comparative examples utilizing metallocenes with non-fluorinated substituents. Thus, FIG. 1 illustrates the molecular weight distribution (MWD) profile of samples of the dual metallocene polyethylenes prepared according to Example 57 and Example 59, showing the broader molecular weight distribution for bimodal polyethylenes prepared using a first metallocene having an indenyl ligand with a fluorinated substituent, along with a second ansa-metallocene. Example 59 is a comparative example using conventional dual metallocene conditions and the metallocenes CE-4 and CE-5. When the CE-4 metallocene of Example 59 is replaced with IE-4 metallocene of Example 57, the results of improved separation of high and low molecular weight components (FIG. 1) and increased density (Table 2) are observed.

Further, as illustrated in FIG. 2, when the CE-4 metallocene of Example 59 is replaced with IE-4 metallocene of Example 57, the results of increased peak TREF elution temperatures (FIG. 2) are observed. FIG. 2 presents a TREF (Temperature Rising Elution Fractionation) plot of temperature versus dW/dT for bimodal polyethylene samples prepared according to Example 57 and Example 59, demonstrating increased peak TREF elution temperatures of the bimodal polyethylene prepared using a combination of [1] a first metallocene compound comprising a substituted indenyl ligand having at least one halogen-substituted $C_1$-$C_{20}$ hydrocarbyl group substituent and [2] a second ansa-metallocene compound comprising a bridge between the two cycloalkadienyl-type ligands. Thus, the Example 57 polymerization run using first metallocene IE-4 provided a bimodal resin containing a more highly crystalline component having the higher TREF elution temperature, indicating less short chain branching as compared to the Example 59 polymerization run using metallocene CE-4 which provided greater co-monomer incorporation as reflected in the corresponding less crystalline component having a lower TREF elution temperature.

Figure 3:
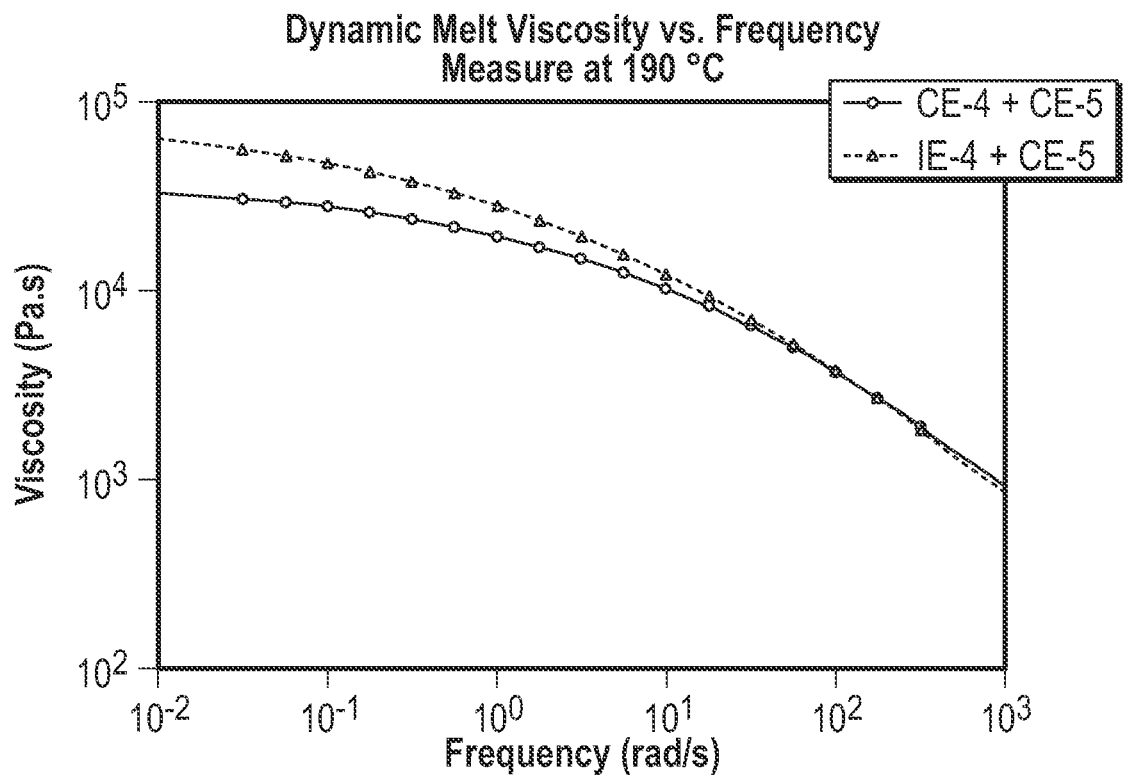
FIG. 3 presents the dynamic melt viscosity versus the frequency (rad/s; measured at 190° C.) for samples of the dual metallocene polyethylenes, comparing the shear thinning for inventive resin sample (Example 57) versus a conventional comparative sample (Example 59).

FIG. 3 presents the dynamic melt viscosity versus the frequency (rad/s; measured at 190° C.) for samples of the dual metallocene polyethylenes, comparing the shear thinning for inventive resin sample (Example 57) versus a conventional comparative sample (Example 59). The observed higher sheer thinning generally suggests improved processing, which improves melt strength and lowers extruder pressures.

Even though the first metallocene comprises a fluoro-substituted hydrocarbyl substituted at an indenyl ligand, lower or approximately the same comonomer incorporation occurs versus that obtained with a metallocene which is absent a fluoro-substituted hydrocarbyl substituted at an indenyl ligand. The skilled person would have expected that a fluoro-substituted hydrocarbyl substituted at an indenyl ligand would have imparted greater co-monomer incorporation ability in the metallocene catalyst. See, for example, Thornberry, M.; Reynolds, N.; Deck, P. Fronczek, F.; Rheingold, A.; Liable-Sands, L. *Organometallics,* 2004, 23, 1333-1339, which suggests that substitution of metallocene ligands with inductively withdrawing fluorinated substituents should lead to increasing α-olefin incorporation versus the non-fluorinated analogs. Moreover, the observation that this can be an indenyl ligand effect rather than a cyclopentadienyl ligand effect is unexpected.

Certain metallocene compounds containing fluorinated substituents have been reported. See, for example: Deck, P.; *Coord. Chem. Rev.* 2006, 250, 1032-1055; Deck, P.; Woodward, J.; *Organometallics,* 1996, 15, 5287-5291; Deck, P.; Fronczek, F.; *Organometallics,* 2000, 19, 327-333; Carnpora, J.; Matas, I; Palma, P.; Alvarez, E.; Kleijn, H.; Deelman, B.; Passaglia, E.; *J. Organomet. Chem.* 2010, 695, 1794-1800; Maldinas, R.; Chien, J.; Rausch, M.; *J. Organomet. Chem.* 2000, 599, 107-111; Thornberry, M.; Reynolds, N.; Deck, P.; Fronczek, F.; Rheingold, A.; Liable-Sands, L.; *Organometallics* 2004, 23, 1333-1339; and Hughes, R.; Trujillo, H.; *Organometallics,* 1996, 15, 286-294; each of which is incorporated by reference. In those cases where olefin polymerization was reported, fluoro-substitution has been at a cyclopentadienyl ring and was found to substantially influence catalytic behavior by increasing α-olefin incorporation. This observation contrasts with the metallocene compounds and fluoro-substituted hydrocarbyl groups on an indenyl ligand as disclosed herein, which reduced α-olefin incorporation rather than increasing it.

Figure 4:
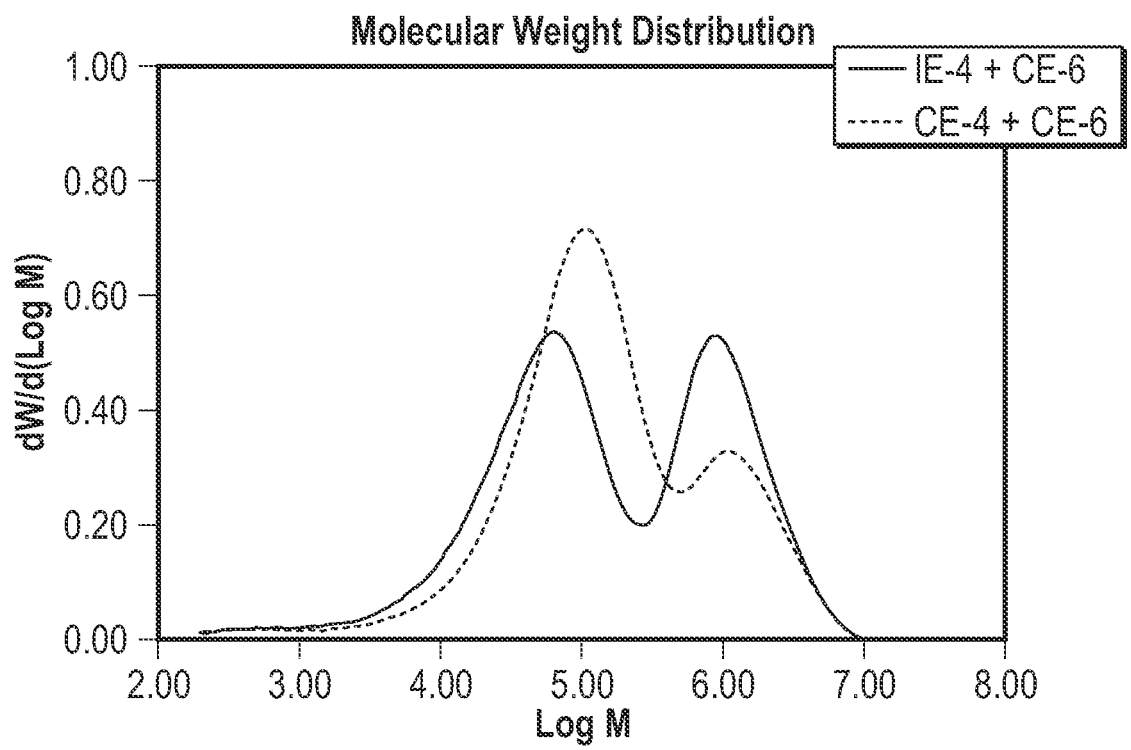
FIG. 4 illustrates the molecular weight distribution (MWD) profiles of samples of bimodal polyethylenes produced using the dual metallocene catalyst systems according to Example 60 and Example 61.

FIG. 4 illustrates the molecular weight distribution (MWD) profiles of samples of bimodal polyethylenes produced using the dual metallocene catalyst systems according to Example 60 and Example 61. Specifically, FIG. 4 compares the MWD profile of a resin prepared using first metallocene IE-4 and second metallocene CE-6 versus the MWD profile of a resin prepared using metallocene CE-4 and metallocene CE-6, again demonstrating the broader molecular weight distribution for bimodal polyethylenes prepared using a first metallocene having an indenyl ligand with a fluorinated substituent, along with a second ansa-metallocene.

Figure 5:
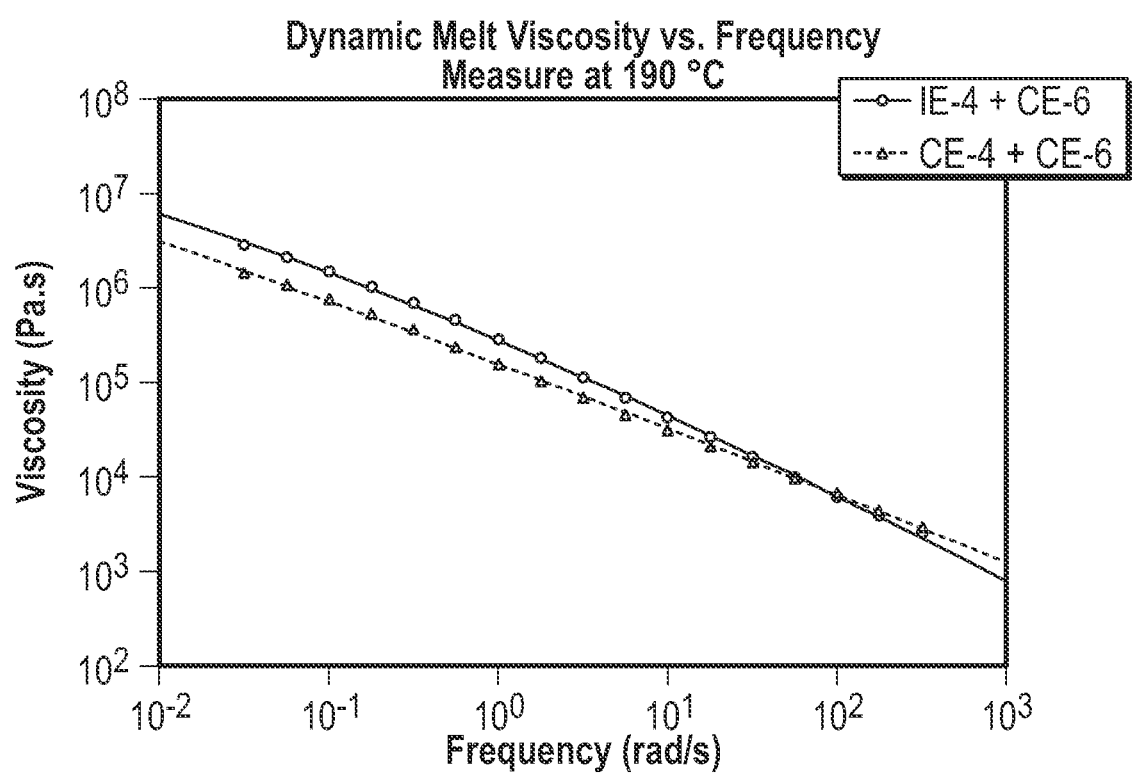
FIG. 5 presents the dynamic melt viscosity versus the frequency (rad/s; measured at 190° C.) for samples of the dual metallocene polyethylenes, comparing the shear thinning for inventive resin sample (Example 61) versus a conventional comparative sample (Example 60).

FIG. 5 presents the dynamic melt viscosity versus the frequency (rad/s; measured at 190° C.) for samples of the dual metallocene polyethylenes, comparing the shear thinning for inventive resin sample (Example 61) versus a conventional comparative sample (Example 60).

Accordingly, described herein is a catalyst composition, metallocenes, and processes for polymerizing olefins which provide an avenue for the production of any bimodal resins that require further component separation in TREF and short-chain branching distribution (SCBD) as compared to conventional or current dual metallocene systems.

These and other aspects of the invention can further include the various embodiments that are presented below.

ASPECTS OF THE DISCLOSURE

1. A metallocene compound having the formula:

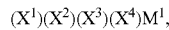

$(X^1)(X^2)(X^3)(X^4)M^1$, wherein $M^1$ is titanium, zirconium, or hafnium;

$X^1$ is a substituted indenyl ligand wherein at least one substituent is a halogen-substituted $C_1$-$C_{20}$ hydrocarbyl group comprising at least two halogen atoms;

$X^2$ is [1] a substituted or unsubstituted cyclopentadienyl ligand which is absent a halogen-substituted hydrocarbyl group, or [2] a substituted or unsubstituted indenyl ligand;

wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

2. A catalyst composition for polymerizing olefins, the catalyst composition comprising:

a) a first metallocene compound having the formula:

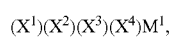

$(X^1)(X^2)(X^3)(X^4)M^1$, wherein $M^1$ is titanium, zirconium, or hafnium;

$X^1$ is a substituted indenyl ligand wherein at least one substituent is a halogen-substituted $C_1$-$C_{20}$ hydrocarbyl group comprising at least two halogen atoms;

$X^2$ is [1] a substituted or unsubstituted cyclopentadienyl ligand which is absent a halogen-substituted hydrocarbyl group, or [2] a substituted or unsubstituted indenyl ligand;

wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group;

$X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;

b) optionally, a co-catalyst comprising an organoaluminum compound, an organoboron compound, an organozinc compound, an organomagnesium compound, an organolithium compound, or any combination thereof; and c) an activator comprising a solid oxide treated with an electron-withdrawing anion (activator-support), an organoboron compound, an organoborate compound, an ionizing ionic compound, an aluminoxane compound, or any combination thereof.

3. A catalyst composition according to Aspect 2, wherein the catalyst composition further comprises:

d) a second metallocene compound having the formula:

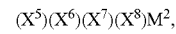

$(X^5)(X^6)(X^7)(X^8)M^2$, wherein $M^2$ is titanium, zirconium, or hafnium;

$X^5$ is a substituted cyclopentadienyl, indenyl, or fluorenyl ligand, wherein any non-bridging substituent, when present, is selected independently from a $C_1$-$C_{12}$ hydrocarbyl group;

$X^6$ is a substituted indenyl or fluorenyl ligand, wherein any non-bridging substituent, when present, is selected independently from a $C_1$-$C_{12}$ hydrocarbyl group or a $C_1$-$C_{12}$ heterohydrocarbyl group;

wherein $X^5$ and $X^6$ are each substituted by a bridging group selected from $(>ER^B{}_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and $X^7$ and $X^8$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

4. A process for polymerizing olefins, the process comprising contacting at least one olefin monomer and a catalyst composition under polymerization conditions to form an olefin polymer, wherein the catalyst composition comprises:

a) a first metallocene compound having the formula:

$(X^1)(X^2)(X^3)(X^4)M^1$, wherein
M¹ is titanium, zirconium, or hafnium;
X¹ is a substituted indenyl ligand wherein at least one substituent is a halogen-substituted $C_1$-$C_{20}$ hydrocarbyl group comprising at least two halogen atoms;
X² is [1] a substituted or unsubstituted cyclopentadienyl ligand which is absent a halogen-substituted hydrocarbyl group, or [2] a substituted or unsubstituted indenyl ligand;
wherein X¹ and X² are unbridged, and wherein any substituent on X¹ and X² which is not a halogen-substituted $C_1$-$C_{20}$ hydrocarbyl group is selected independently from a $C_1$-$C_{20}$ hydrocarbyl group;
X³ and X⁴ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;
b) optionally, a co-catalyst comprising an organoaluminum compound, an organoboron compound, an organozinc compound, an organomagnesium compound, an organolithium compound, or any combination thereof; and
c) an activator comprising a solid oxide treated with an electron-withdrawing anion, an organoboron compound, an organoborate compound, an ionizing ionic compound, an aluminoxane compound, or any combination thereof.

5. A process for polymerizing olefins according to Aspect 4, wherein the catalyst composition further comprises:
d) a second metallocene compound having the formula:

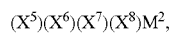

wherein
M² is titanium, zirconium, or hafnium;
X⁵ is a substituted cyclopentadienyl, indenyl, or fluorenyl ligand, wherein any non-bridging substituent, when present, is selected independently from a $C_1$-$C_{12}$ hydrocarbyl group;
X⁶ is a substituted indenyl or fluorenyl ligand, wherein any non-bridging substituent, when present, is selected independently from a $C_1$-$C_{12}$ hydrocarbyl group or a $C_1$-$C_{12}$ heterohydrocarbyl group;
wherein X⁵ and X⁶ are each substituted by a bridging group selected from $(>ER^B{}_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and
X⁷ and X⁸ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

6. A method of making a catalyst composition, the method comprising contacting in any order:
a) a first metallocene compound having the formula:

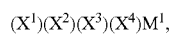

wherein
M¹ is titanium, zirconium, or hafnium;
X¹ is a substituted indenyl ligand wherein at least one substituent is a halogen-substituted $C_1$-$C_{20}$ hydrocarbyl group comprising at least two halogen atoms;
X² is [1] a substituted or unsubstituted cyclopentadienyl ligand which is absent a halogen-substituted hydrocarbyl group, or [2] a substituted or unsubstituted indenyl ligand;
wherein X¹ and X² are unbridged, and wherein any substituent on X¹ and X² which is not a halogen-substituted $C_1$-$C_{20}$ hydrocarbyl group is selected independently from a $C_1$-$C_{20}$ hydrocarbyl group;
X³ and X⁴ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;
b) optionally, a co-catalyst comprising an organoaluminum compound, an organozinc compound, an organomagnesium compound, an organolithium compound, or any combination thereof; and
c) an activator comprising a solid oxide treated with an electron-withdrawing anion, an organoboron compound, an organoborate compound, an ionizing ionic compound, an aluminoxane compound, or any combination thereof.

7. A method of making a catalyst composition according to Aspect 6, wherein the contacting step comprises contacting elements a), optionally b), c), and d) in any order, and wherein element d) is:
d) a second metallocene compound having the formula:

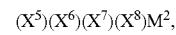

wherein
M² is titanium, zirconium, or hafnium;
X⁵ is a substituted cyclopentadienyl, indenyl, or fluorenyl ligand, wherein any non-bridging substituent, when present, is selected independently from a $C_1$-$C_{12}$ hydrocarbyl group;
X⁶ is a substituted indenyl or fluorenyl ligand, wherein any non-bridging substituent, when present, is selected independently from a $C_1$-$C_{12}$ hydrocarbyl group or a $C_1$-$C_{12}$ heterohydrocarbyl group;
wherein X⁵ and X⁶ are each substituted by a bridging group selected from $(>ER^B{}_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and
X⁷ and X⁸ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

8. A metallocene, a process for polymerizing olefins, a catalyst composition, or a method of making a catalyst composition according to any one of Aspects 1-7, wherein M¹ is Ti; alternatively, M¹ is Zr; alternatively, M¹ is Hf; or alternatively, M¹ is Zr or Hf.

9. A metallocene, a process for polymerizing olefins, a catalyst composition, or a method of making a catalyst composition according to any one of Aspects 1-8, wherein $X^3$ and $X^4$ are independently selected from F, Cl, Br, a hydride, a $C_1$-$C_{12}$ hydrocarbyl group, a $C_1$-$C_{12}$ hydrocarbyloxide group, a $C_1$-$C_{12}$ hydrocarbylamino group, or a trihydrocarbylsilyl group wherein each hydrocarbyl is independently a $C_1$-$C_{12}$ hydrocarbyl group.

10. A metallocene, a process for polymerizing olefins, a catalyst composition, or a method of making a catalyst composition according to any one of Aspects 1-9, wherein the halogen-substituted hydrocarbyl substituent of $X^1$ is selected from a $C_1$-$C_{20}$ hydrocarbyl group substituted with at least two halogens selected independently from fluoro-, chloro-, bromo-, or a combination thereof.

11. A metallocene, a process for polymerizing olefins, a catalyst composition, or a method of making a catalyst composition according to any one of Aspects 1-9, wherein the halogen-substituted hydrocarbyl substituent of $X^1$ is selected from $C_1$-$C_{20}$ aliphatic or $C_6$-$C_{20}$ aromatic group substituted with at least two halogens selected independently from fluoro-, chloro-, bromo-, or a combination thereof.

12. A metallocene, a process for polymerizing olefins, a catalyst composition, or a method of making a catalyst composition according to any one of Aspects 1-9, wherein the halogen-substituted hydrocarbyl substituent of $X^1$ is selected from a fluoro-disubstituted, chloro-disubstituted, or bromo-disubstituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

13. A metallocene, a process for polymerizing olefins, a catalyst composition, or a method of making a catalyst composition according to any one of Aspects 1-9, wherein the halogen-substituted hydrocarbyl substituent of $X^1$ is further substituted with at least one additional substituent selected from a $C_1$-$C_{12}$ hydrocarbyl group.

14. A metallocene, a process for polymerizing olefins, a catalyst composition, or a method of making a catalyst composition according to any one of Aspects 1-9, wherein $X^1$ is an indenyl ligand substituted with a halogen-substituted hydrocarbyl group selected from:
—$C_6X^9{}_nH_{5-n}$ or —$CH_2C_6X^9{}_nH_{5-n}$, wherein n is an integer from 2 to 5;
—$(CH_2)_mCX^9{}_pH_{3-p}$, wherein m is an integer from 0 to 3 and wherein p is an integer from 2 to 3; or
—$C(CX^9{}_3)_q(CH_3)_{3-q}$ or —$C(CX^9{}_3)_qH_{3-q}$, wherein q is an integer from 2 to 3; and
wherein $X^9$, in each occurrence, is selected independently from fluorine, chlorine, or bromine.

15. A metallocene, a process for polymerizing olefins, a catalyst composition, or a method of making a catalyst composition according to any one of Aspects 1-14, wherein $X^2$ is an indenyl ligand which is unsubstituted; alternatively, substituted with at least one $C_1$-$C_{20}$ hydrocarbyl group; alternatively, substituted with at least one halogen-substituted $C_1$-$C_{20}$ hydrocarbyl group; alternatively, substituted with at least one $C_1$-$C_{12}$ hydrocarbyl group; or alternatively, substituted with at least one halogen-substituted $C_1$-$C_{12}$ hydrocarbyl group.

16. A metallocene, a process for polymerizing olefins, a catalyst composition, or a method of making a catalyst composition according to any one of Aspects 1-14, wherein $X^2$ is an indenyl ligand which is unsubstituted, substituted with at least one unsubstituted $C_1$-$C_{20}$ aliphatic or $C_6$-$C_{20}$ aromatic group, or substituted with at least one $C_1$-$C_{20}$ aliphatic or $C_6$-$C_{20}$ aromatic group substituted with at least one fluoro-, chloro-, or bromo-substituent, or a combination thereof.

17. A metallocene, a process for polymerizing olefins, a catalyst composition, or a method of making a catalyst composition according to any one of Aspects 1-14, wherein $X^2$ is an indenyl ligand which is substituted with at least one halogen-substituted hydrocarbyl substituent selected from $C_1$-$C_{12}$ aliphatic or $C_6$-$C_{10}$ aromatic group substituted with at least one fluoro-, chloro-, or bromo-substituent, or a combination thereof.

18. A metallocene, a process for polymerizing olefins, a catalyst composition, or a method of making a catalyst composition according to any one of Aspects 1-14, wherein $X^2$ is an indenyl ligand which is substituted with at least one halogen-substituted hydrocarbyl substituent selected from a fluoro-substituted, chloro-substituted, or bromo-substituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

19. A metallocene, a process for polymerizing olefins, a catalyst composition, or a method of making a catalyst composition according to any one of Aspects 1-14, wherein $X^2$ is a cyclopentadienyl ligand which is unsubstituted.

20. A metallocene, a process for polymerizing olefins, a catalyst composition, or a method of making a catalyst composition according to any one of Aspects 1-14, wherein $X^2$ is a cyclopentadienyl ligand which is substituted with at least one $C_1$-$C_{20}$ hydrocarbyl group; or alternatively, substituted with at least one $C_1$-$C_{12}$ hydrocarbyl group.

21. A metallocene, a process for polymerizing olefins, a catalyst composition, or a method of making a catalyst composition according to any one of Aspects 1-14, wherein $X^2$ is a cyclopentadienyl ligand which is substituted with at least one $C_1$-$C_{20}$ aliphatic group; alternatively, substituted with at least one $C_6$-$C_{20}$ aromatic group; alternatively, substituted at least $C_1$-$C_{12}$ aliphatic group; or alternatively, substituted with at least one $C_6$-$C_{10}$ aromatic group.

22. A metallocene, a process for polymerizing olefins, a catalyst composition, or a method of making a catalyst composition according to any one of Aspects 1-14, wherein $X^2$ is a cyclopentadienyl ligand which is substituted with at least one hydrocarbyl substituent selected independently from a $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

23. A metallocene, a process for polymerizing olefins, a catalyst composition, or a method of making a catalyst composition according to any one of Aspects 1-22, wherein:
$X^1$ is an indenyl ligand which is substituted with a group selected independently from

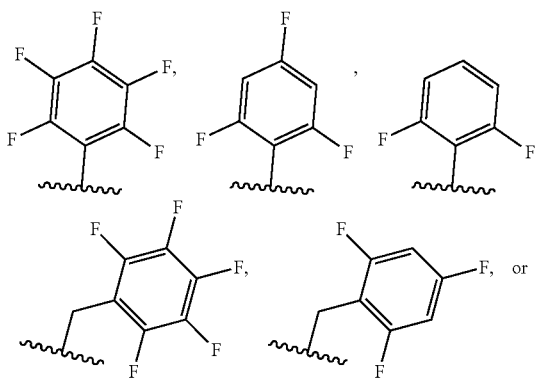

-continued

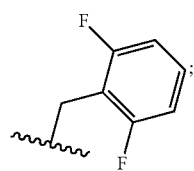

and/or

X² is an indenyl ligand which is substituted with a group selected independently from

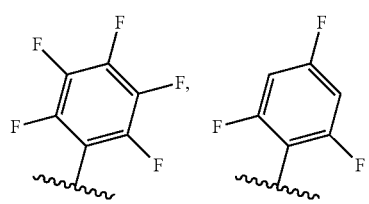

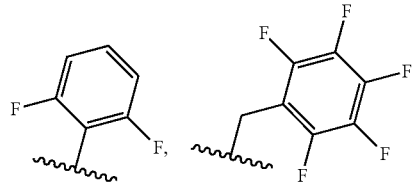

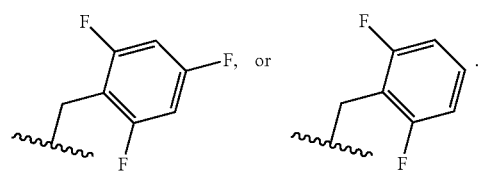

24. A metallocene, a process for polymerizing olefins, a catalyst composition, or a method of making a catalyst composition according to any one of Aspects 1-7, wherein the first metallocene compound is selected from:

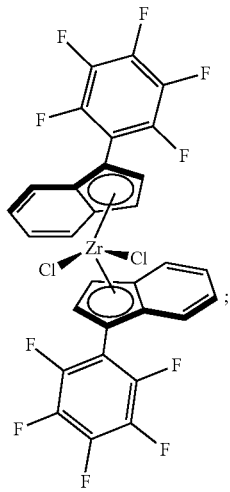
IE-1

-continued

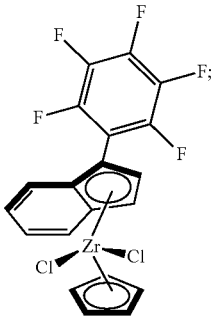
IE-2

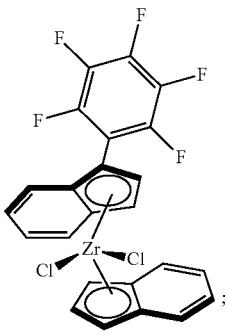
IE-3

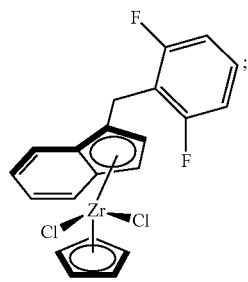
IE-4

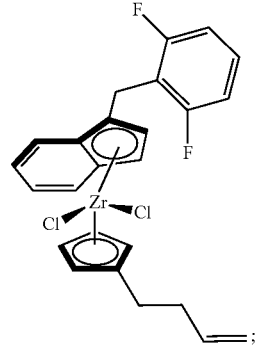
IE-5

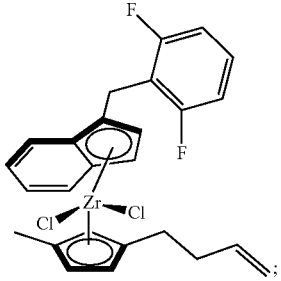
IE-6 or a combination thereof.

25. A metallocene, a process for polymerizing olefins, a catalyst composition, or a method of making a catalyst composition according to any one of Aspects 1-7, wherein the first metallocene compound is selected from:

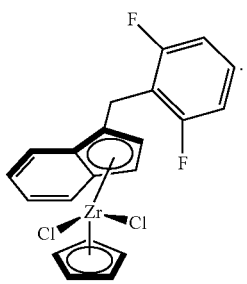

IE-4

26. A process for polymerizing olefins, a catalyst composition, or a method of making a catalyst composition according to any one of Aspects 3, 5, or 7-25, wherein $X^5$, in addition to comprising the bridging substituent, is [1] otherwise unsubstituted or [2] substituted with a $C_1$-$C_{12}$ hydrocarbyl group.

27. A process for polymerizing olefins, a catalyst composition, or a method of making a catalyst composition according to any one of Aspects 3, 5, or 7-25, wherein $X^5$ is a cyclopentadienyl ligand which, in addition to comprising the bridging substituent, is [1] otherwise unsubstituted or [2] substituted with a $C_1$-$C_6$ alkyl or $C_2$-$C_8$ alkenyl group.

28. A process for polymerizing olefins, a catalyst composition, or a method of making a catalyst composition according to any one of Aspects 3, 5, or 7-27, wherein $X^6$ is an indenyl or a fluorenyl ligand substituted with two substituents selected independently from a $C_1$-$C_{12}$ hydrocarbyl group, in addition to the bridging substituent.

29. A process for polymerizing olefins, a catalyst composition, or a method of making a catalyst composition according to any one of Aspects 3, 5, or 7-27, wherein $X^6$ is an indenyl or a fluorenyl ligand and wherein $R^B$, in each occurrence, is selected independently from a $C_1$-$C_6$ alkyl or $C_2$-$C_8$ alkenyl group.

30. A process for polymerizing olefins, a catalyst composition, or a method of making a catalyst composition according to any one of Aspects 3, 5, or 7-27, wherein $(>ER^B_2)_x$ is selected from $(—CR^B_2CR^B_2—)$, $(—SiR^B_2SiR^B_2—)$, $(—CR^B_2SiR^B_2—)$, $(—CR^B_2CR^B_2CR^B_2—)$, $(—SiR^B_2CR^B_2CR^B_2—)$, $(—CR^B_2SiR^B_2CR^B_2—)$, $(—SiR^B_2CR^B_2SiR^B_2—)$, $(—SiR^B_2SiR^B_2CR^B_2—)$, or $(—SiR^B_2SiR^B_2SiR^B_2—)$.

31. A process for polymerizing olefins, a catalyst composition, or a method of making a catalyst composition according to any one of Aspects 3, 5, or 7-27, wherein $(>ER^B_2)_x$ or $>BR^B$ is selected from $>CMe_2$, $>CPh_2$, $>CHMe$, $>CHPh$, $>CH(tolyl)$, $>CMeEt$, $>CMe(CH_2CH_2CH_3)$, $>CMe(CH_2CH_2CH_2CH_3)$, $>CH(CH_2CH_2CH=CH_2)$, $>CMe(CH_2CH_2CH=CH_2)$, $>CEt(CH_2CH_2CH=CH_2)$, $>CPh(CH_2CH_2CH=CH_2)$, $>SiMe_2$, $>SiPh_2$, $>SiEt_2$, $>Si(tolyl)_2$, $(—CH_2CH_2—)$, $(—CMe_2CMe_2—)$, $(—CH_2CH_2CH_2—)$, $(—CH_2SiMe_2CH_2—)$, $(—CH_2SiPh_2CH_2—)$, $(—SiMe_2SiMe_2—)$, $>BMe$, $>BEt$, $>BPh$, or $>B(tolyl)$.

32. A process for polymerizing olefins, a catalyst composition, or a method of making a catalyst composition according to any one of Aspects 3, 5, or 7-25, wherein the second metallocene compound comprises, consists essentially of, consists of, or is selected from a metallocene compound having the formula:

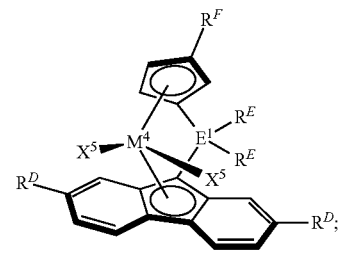

wherein:

$M^4$ is zirconium or hafnium;

$X^5$ in each occurrence is independently F, Cl, Br, I, H, methyl, benzyl, phenyl, or methoxy;

$R^D$ in each occurrence is selected independently from H, $C_1$-$C_{12}$ alkyl, $C_2$-$C_{12}$ alkenyl, $C_6$-$C_{10}$ aryl, $C_7$-$C_{12}$ aralkyl, or $C_1$-$C_{12}$ hydrocarbyloxide;

E is C or Si;

$R^E$ in each occurrence is selected independently from H, $C_1$-$C_{12}$ alkyl, $C_2$-$C_{12}$ alkenyl, $C_6$-$C_{10}$ aryl, or $C_7$-$C_{12}$ aralkyl; and $R^F$ is selected independently from H, $C_1$-$C_{12}$ alkyl, $C_2$-$C_{12}$ alkenyl, $C_6$-$C_{10}$ aryl, or $C_7$-$C_{12}$ aralkyl.

33. A process for polymerizing olefins, a catalyst composition, or a method of making a catalyst composition according to any one of Aspects 3, 5, or 7-25, wherein the second metallocene compound comprises, consists essentially of, consists of, or is selected from a metallocene compound having the formula:

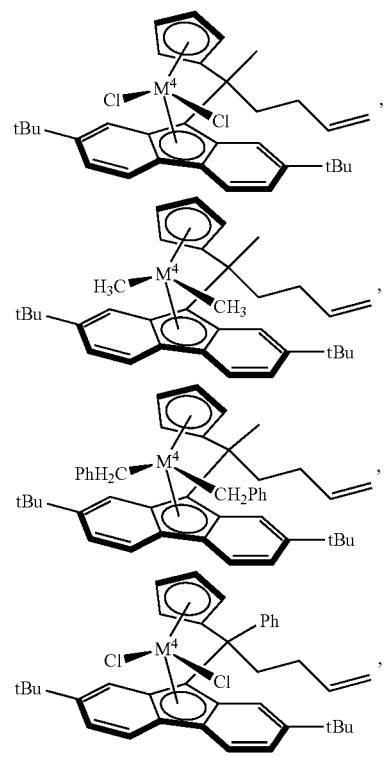

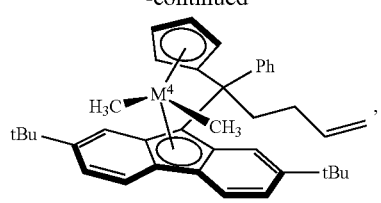

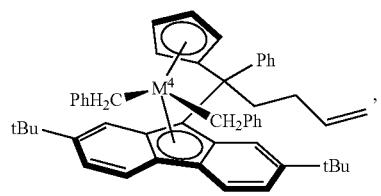

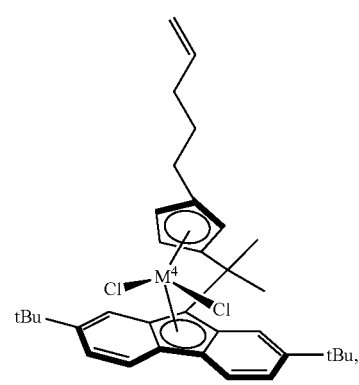

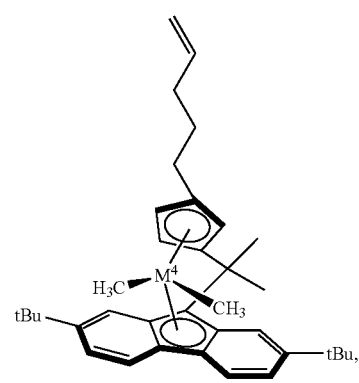

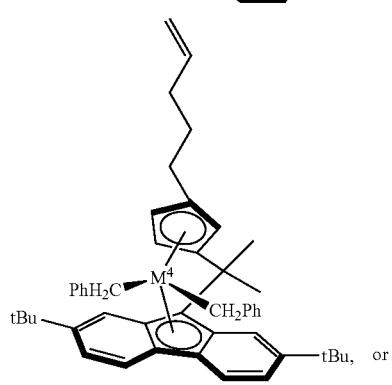

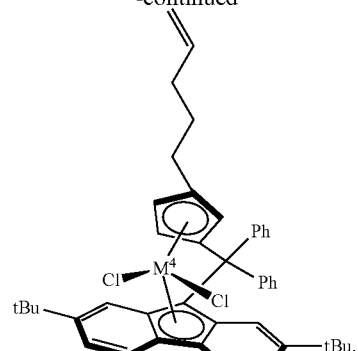

34. A process for polymerizing olefins, a catalyst composition, or a method of making a catalyst composition according to any one of Aspects 2-33, wherein the solid oxide comprises or is selected from $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, $Na_2O$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, $K_2O$, CaO, $La_2O_3$, $Ce_2O_3$, mixtures thereof, mixed oxides thereof, and any combinations thereof.

35. A process for polymerizing olefins, a catalyst composition, or a method of making a catalyst composition according to any one of Aspects 2-33, wherein the solid oxide comprises or is selected from silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, mullite, boehmite, heteropolytungstates, mixed oxides thereof, or any combination thereof.

36. A process for polymerizing olefins, a catalyst composition, or a method of making a catalyst composition according to any one of Aspects 2-33, wherein the electron-withdrawing anion comprises or is selected from fluoride, chloride, bromide, iodide, sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, trifluoroacetate, fluoroborate, fluorozirconate, fluorotitanate, or any combination thereof.

37. A process for polymerizing olefins, a catalyst composition, or a method of making a catalyst composition according to any one of Aspects 2-33, wherein the solid oxide treated with an electron withdrawing anion comprises at least one solid oxide treated with at least two electron-withdrawing anions, and wherein the at least two electron-withdrawing anions comprise fluoride and phosphate, fluoride and sulfate, chloride and phosphate, chloride and sulfate, triflate and sulfate, or triflate and phosphate.

38. A process for polymerizing olefins, a catalyst composition, or a method of making a catalyst composition according to any one of Aspects 2-33, wherein the solid oxide treated with an electron-withdrawing anion is generated by treatment of a solid oxide with sulfuric acid, sulfate ion, bisulfate ion, fluorosulfuric acid, fluorosulfate ion, phosphoric acid, phosphate ion, fluorophosphoric acid, monofluorophosphate ion, triflic (trifluoromethanesulfonic) acid, triflate trifluoromethanesulfonate) ion, methanesulfonic acid, mesylate (methanesulfonate) ion, toluenesulfonic acid, tosylate (toluenesulfonate) ion, thiosulfate ion, $C_1$-$C_{10}$ alkyl sulfonic acid, $C_1$-$C_{10}$ alkyl sulfonate ion, $C_6$-$C_{14}$ aryl sulfonic acid, $C_6$-$C_{14}$ aryl sulfonate ion, fluoride ion, chloride ion, or any combination thereof.

39. A process for polymerizing olefins, a catalyst composition, or a method of making a catalyst composition according to any one of Aspects 2-33, wherein the solid oxide treated with an electron withdrawing anion comprises a sulfated solid oxide, bisulfated (hydrogen sulfated) solid oxide, fluorosulfated solid oxide, phosphated solid oxide, fluorophosphated solid oxide, fluoride solid oxide, or chloride solid oxide.

40. A process for polymerizing olefins, a catalyst composition, or a method of making a catalyst composition according to any one of Aspects 2-33, wherein the solid oxide treated with an electron withdrawing anion comprises a sulfated solid oxide or a phosphated solid oxide.

41. A process for polymerizing olefins, a catalyst composition, or a method of making a catalyst composition according to any one of Aspects 2-33, wherein the solid oxide comprises a sulfated solid oxide.

42. A process for polymerizing olefins, a catalyst composition, or a method of making a catalyst composition according to any one of Aspects 2-33, wherein the solid oxide treated with an electron withdrawing anion comprises or is selected from fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, phosphated silica-zirconia, fluorided mullite, chlorided mullite, bromided mullite, sulfated mullite, phosphated mullite, fluorided silica-coated alumina, chlorided silica-coated alumina, bromided silica-coated alumina, sulfated silica-coated alumina, phosphated silica-coated alumina, or any combination thereof.

43. A process for polymerizing olefins, a catalyst composition, or a method of making a catalyst composition according to any one of Aspects 2-33, wherein:
a) the solid oxide comprises, consists of, consists essentially of, or is selected from silica, alumina, silica-alumina, silica-coated alumina, mullite, aluminum phosphate, aluminophosphate, heteropolytungstate, titania, zirconia, magnesia, boria, zinc oxide, a mixed oxide thereof, or any mixture thereof; and
b) the electron-withdrawing anion comprises, consists of, consists essentially of, or is selected from sulfate, bisulfate, fluorosulfate, phosphate, fluorophosphates, fluoride, or chloride.

44. A process for polymerizing olefins, a catalyst composition, or a method of making a catalyst composition according to any one of Aspects 2-33, wherein:
a) the solid oxide comprises, consists of, consists essentially of, or is selected from alumina, silica-alumina, silica-coated alumina, silica-zirconia, mullite, or a mixture thereof, and
b) the electron-withdrawing anion comprises, consists of, consists essentially of, or is selected from fluoride, chloride, bromide, sulfate, or phosphate.

45. A process for polymerizing olefins, a catalyst composition, or a method of making a catalyst composition according to any one of Aspects 2-33, wherein the electron withdrawing anion comprises or is selected from a sulfur oxoacid anion-modified solid oxide generated by sulfuric acid treatment or sulfate ion treatment.

46. A process for polymerizing olefins, a catalyst composition, or a method of making a catalyst composition according to any one of Aspects 2-33, wherein the electron withdrawing anion comprises or is selected from a phosphorus oxoacid anion-modified solid oxide generated by phosphoric acid treatment or phosphate ion treatment.

47. A process for polymerizing olefins, a catalyst composition, or a method of making a catalyst composition according to any one of Aspects 2-33, wherein the solid oxide treated with an electron withdrawing anion is any solid oxide or combinations of solid oxides disclosed herein, treated with any electron-withdrawing anion or combinations of electron-withdrawing anions disclosed herein.

48. A process for polymerizing olefins, a catalyst composition, or a method of making a catalyst composition according to any one of Aspects 2-33, wherein the solid oxide treated with an electron-withdrawing anion is produced by a process comprising contacting any suitable solid oxide and any suitable solid oxide with an electron-withdrawing anion to provide a mixture, and concurrently and/or subsequently drying and/or calcining the mixture.

49. A process for polymerizing olefins, a catalyst composition, or a method of making a catalyst composition according to any one of Aspects 2-48, wherein the solid oxide treated with an electron withdrawing anion has a surface area from about 100 $m^2$/g to about 1000 $m^2$/g, a pore volume from about 0.25 mL/g to about 3.0 mL/g, and an average particle size from about 5 microns to about 150 microns.

50. A process for polymerizing olefins, a catalyst composition, or a method of making a catalyst composition according to any one of Aspects 2-49, wherein the solid oxide treated with an electron withdrawing anion has a pore volume from about 0.5 mL/g to about 2.5 mL/g.

51. A process for polymerizing olefins, a catalyst composition, or a method of making a catalyst composition according to any one of Aspects 2-50, wherein the solid oxide treated with an electron withdrawing anion has a surface area from about 150 $m^2$/g to about 700 $m^2$/g.

52. A process for polymerizing olefins, a catalyst composition, or a method of making a catalyst composition according to any one of Aspects 2-51, wherein the co-catalyst is present.

53. A process for polymerizing olefins, a catalyst composition, or a method of making a catalyst composition according to any one of Aspects 2-51, wherein the co-catalyst is absent.

54. A process for polymerizing olefins, a catalyst composition, or a method of making a catalyst composition according to any one of Aspects 2-52, wherein the co-catalyst comprises an organoaluminum compound, an organoboron compound, an organozinc compound, an organomagnesium compound, or an organolithium compound.

55. A process for polymerizing olefins, a catalyst composition, or a method of making a catalyst composition according to any one of Aspects 2-52, wherein
a) the co-catalyst has a general formula:
i) $M^3(X^{10})_n(X^{11})_{3-n}$, wherein $M^3$ is boron or aluminum and n is from 1 to 3 inclusive;
ii) $M^4(X^{10})_n(X^{11})_{2-n}$, wherein $M^4$ is magnesium or zinc and n is from 1 to 2 inclusive; or
iii) $M^5X^{10}$, wherein $M^5$ is Li;
b) $X^{10}$ is independently hydride or a $C_1$ to $C_{20}$ hydrocarbyl; and
c) $X^{11}$ is independently a halide, a hydride, a $C_1$ to $C_{20}$ hydrocarbyl, or a $C_1$ to $C_{20}$ hydrocarbyloxide.

56. A process for polymerizing olefins, a catalyst composition, or a method of making a catalyst composition according to any one of Aspects 2-52, wherein the cocatalyst comprises, consists of, consists essentially of, or is selected from an organoaluminum compound, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

57. A process for polymerizing olefins, a catalyst composition, or a method of making a catalyst composition according to any one of Aspects 2-52, wherein the cocatalyst comprises, consists of, consists essentially of, or is selected from triethylaluminum, triisobutylaluminum, diethylaluminum ethoxide, diethylaluminum chloride, or any combination thereof.

58. A process for polymerizing olefins, a catalyst composition, or a method of making a catalyst composition according to any one of Aspects 2-52, wherein the cocatalyst comprises, consists of, consists essentially of, or is selected from any organoaluminum compound disclosed herein.

59. A process for polymerizing olefins, a catalyst composition, or a method of making a catalyst composition according to any one of Aspects 2-52, wherein the cocatalyst comprises, consists of, consists essentially of, or is selected from any organoaluminum compound having a formula $Al(X^{12})_s(X^{13})_{3-s}$, wherein $X^{12}$ is independently a $C_1$ to $C_{12}$ hydrocarbyl, $X^{11}$ is independently a halide, a hydride, or a $C_1$ to $C_{12}$ hydrocarboxide, and s is an integer from 1 to 3 (inclusive).

60. A process for polymerizing olefins, a catalyst composition, or a method of making a catalyst composition according to any one of Aspects 2-52, wherein the catalyst composition is substantially free of aluminoxane compounds, organoboron or organoborate compounds, ionizing ionic compounds, or combinations thereof.

61. A process for polymerizing olefins, a catalyst composition, or a method of making a catalyst composition according to any one of Aspects 2-52, wherein the catalyst composition is substantially free of aluminoxane compounds.

62. A process for polymerizing olefins, a catalyst composition, or a method of making a catalyst composition according to any one of Aspects 2-52, wherein the activator comprises, consists of, consists essentially of, or is selected from an aluminoxane compound.

63. A process for polymerizing olefins, a catalyst composition, or a method of making a catalyst composition according to any one of Aspects 2-52, wherein the activator comprises at least one aluminoxane compound, and wherein the aluminoxane comprises a cyclic aluminoxane having the formula

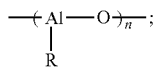

wherein R is a linear or branched alkyl having from 1 to 10 carbon atoms, and n is an integer from 3 to about 10;

a linear aluminoxane having the formula

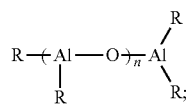

wherein R is a linear or branched alkyl having from 1 to 10 carbon atoms, and n is an integer from 1 to about 50;

a cage aluminoxane having the formula $R^t_{5m+\alpha} R^b_{m-\alpha} Al_{4m} O_{3m}$, wherein m is 3 or 4 and $\alpha = n_{Al(3)} - n_{O(2)} + n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms; or any combination thereof.

64. A process for polymerizing olefins, a catalyst composition, or a method of making a catalyst composition according to any one of Aspects 2-52, wherein the activator comprises, consists of, consists essentially of, or is selected from an aluminoxane having the formula

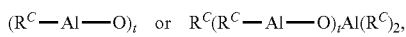

wherein $R^C$ is a linear or branched $C_1$-$C_6$ alkyl such as methyl, ethyl, propyl, butyl, pentyl, or hexyl wherein t is an integer from 1 to 50, inclusive.

65. A process for polymerizing olefins, a catalyst composition, or a method of making a catalyst composition according to any one of Aspects 2-52, wherein the activator comprises, consists of, consists essentially of, or is selected from methylaluminoxane (MAO), ethylaluminoxane, modified methylaluminoxane (MMAO) such as an isobutyl-modified methyl alumoxane, n-propylaluminoxane, iso-propylaluminoxane, n-butylaluminoxane, t-butyl-aluminoxane, sec-butylaluminoxane, iso-butylaluminoxane, t-butyl aluminoxane, 1-pentyl-aluminoxane, 2-pentylaluminoxane, 3-pentylaluminoxane, iso-pentylaluminoxane, neopentyl-aluminoxane, or combinations thereof.

66. A process for polymerizing olefins or a catalyst composition according to any one of Aspects 2-5 or 8-65, wherein the catalyst composition further comprises a diluent or wherein the contacting step comprises contacting the recited elements in a diluent.

67. A process for polymerizing olefins or a catalyst composition according to Aspect 66, wherein the diluent comprises any suitable non-protic solvent, or any non-protic solvent disclosed herein.

68. A process for polymerizing olefins or a catalyst composition according to Aspect 66, wherein the diluent comprises any suitable weakly coordinating or non-coordinating solvent, or any weakly coordinating or non-coordinating solvent disclosed herein.

69. A process for polymerizing olefins or a catalyst composition according to Aspect 66, wherein the diluent comprises any suitable aliphatic hydrocarbon solvent, or any aliphatic hydrocarbon solvent disclosed herein, e.g. at least one olefin monomer in the case of bulk polymerizations, propane, butanes (for example, n-butane, iso-butane), pentanes (for example, n-pentane, iso-pentane), hexanes, heptanes, octanes, petroleum ether, light naphtha, heavy naphtha, or any combination thereof.

70. A process for polymerizing olefins or a catalyst composition according to Aspect 66, wherein the diluent comprises any suitable aromatic hydrocarbon solvent, or any aromatic hydrocarbon solvent disclosed herein, e.g., benzene, xylene, toluene, etc.

71. A method of making a catalyst composition according to any one of Aspects 6-65, wherein the recited components are contacted as follows:
   a) the first metallocene compound, in the presence of the absence of a diluent and in the presence or absence of the second metallocene, is optionally contacted with the co-catalyst, to provide a first composition;
   a) the first composition is contacted with the activator, in the presence of absence of a diluent.

72. A method of making a catalyst composition according to any one of Aspects 6-65, wherein any or all of the recited components are contacted in the presence of an olefin.

73. A process for polymerizing olefins according to any one of Aspects 2-3 or 8-70, wherein the at least one olefin monomer comprises ethylene or ethylene in combination with an olefin co-monomer selected from propylene, butene (e.g., 1-butene), pentene, hexene (e.g., 1-hexene), heptene, octene (e.g., 1-octene), styrene, and the like.

74. A process for polymerizing olefins according to any one of Aspects 2-3 or 8-70, wherein the at least one olefin monomer comprises ethylene, propylene, butene (e.g., 1-butene), pentene, hexene (e.g., 1-hexene), heptene, octene (e.g., 1-octene), styrene, and the like.

75. A process for polymerizing olefins, a catalyst composition, or a method of making a catalyst composition according to any one of Aspects 2-74, wherein the solid oxide treated with an electron withdrawing anion has any of the following properties:
   a) a surface area from about 100 m$^2$/g to about 1000 m$^2$/g;
   b) a pore volume from about 0.25 mL/g to about 3.0 mL/g;
   c) an average particle size from about 5 microns to about 150 microns; or
   d) any combination thereof.

76. A process for polymerizing olefins, a catalyst composition, or a method of making a catalyst composition according to any one of Aspects 2-75, wherein the at least one olefin monomer and the catalyst composition are contacted under any of following conditions:
   a) the molar ratio of the co-catalyst to the combined first metallocene and second metallocene is from about 20:1 to about 500:1;
   b) the weight ratio of the activator-support to the combined first metallocene and second metallocene is from about 5:1 to about 1,000:1; and/or
   c) the weight ratio of the at least one olefin monomer to the combined first metallocene and second metallocene is from about 1,000:1 to about 100,000,000:1; or
   d) any combination thereof.

77. A process for polymerizing olefins according to any one of Aspects 4-5 or 8-76, wherein the process is conducted in a polymerization reactor system comprising a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof.

78. A process for polymerizing olefins according to any one of Aspects 4-5 or 8-77, wherein the polymerization conditions suitable to form a polyethylene comprises a polymerization reaction temperature from about 50° C. to about 160° C. and a reaction pressure from about 100 psig to about 1000 psig (about 1.4 to about 6.9 MPa).

79. A catalyst composition according to any one of Aspects 2 or 8-78, wherein the catalyst is characterized by a total activator-support activity in a range from about 20 g/g·h (grams polyethylene per gram of activator-support per hour) to about 4000 g/g·h.

80. A catalyst composition according to any one of Aspects 3 or 8-78, wherein the catalyst is characterized by a total metallocene activity in a range from about 30,000 g/g·h (grams polyethylene per gram of metallocene per hour) to about 800,000 g/g·h.

81. A process for polymerizing olefins, a catalyst composition, or a method of making a catalyst composition according to any one of Aspects 2-80, wherein:
   the olefin polymer is an ethylene-α-olefin copolymer characterized by a co-monomer incorporation that is lower than or the same as that of a comparative ethylene-α-olefin copolymer prepared under identical conditions except for using a comparative metallocene compound in the catalyst composition; and
   the comparative metallocene compound is identical to the first metallocene except that $X^1$ is replaced by $X^{12}$, and $X^2$ is replaced by $X^{13}$, wherein
   $X^{12}$ is a substituted or unsubstituted indenyl ligand which is absent a halogen-substituted hydrocarbyl group, and
   $X^{13}$ is [1] a substituted or unsubstituted cyclopentadienyl ligand, or [2] a substituted or unsubstituted indenyl ligand which is absent a halogen-substituted hydrocarbyl group; and
   wherein $X^{12}$ and $X^{13}$ are unbridged, and wherein any substituent on $X^{12}$ and $X^{13}$ which is not a halogen-substituted $C_1$-$C_{20}$ hydrocarbyl group is selected independently from a $C_1$-$C_{20}$ hydrocarbyl group.

82. An olefin polymer prepared according to the process for polymerizing olefins of any one of Aspects 4-5 or 8-80, wherein:
   the olefin polymer is an ethylene-α-olefin copolymer characterized by a co-monomer incorporation that is lower than or the same as that of a comparative ethylene-α-olefin copolymer prepared under identical conditions except for using a comparative metallocene compound in the catalyst composition; and
   the comparative metallocene compound is identical to the first metallocene except that $X^1$ is replaced by $X^{12}$, and $X^2$ is replaced by $X^{13}$, wherein
   $X^{12}$ is a substituted or unsubstituted indenyl ligand which is absent a halogen-substituted hydrocarbyl group, and
   $X^{13}$ is [1] a substituted or unsubstituted cyclopentadienyl ligand, or [2] a substituted or unsubstituted indenyl ligand which is absent a halogen-substituted hydrocarbyl group; and
   wherein $X^{12}$ and $X^{13}$ are unbridged, and wherein any substituent on $X^{12}$ and $X^{13}$ which is not a halogen-substituted $C_1$-$C_{20}$ hydrocarbyl group is selected independently from a $C_1$-$C_{20}$ hydrocarbyl group.

83. An olefin polymer prepared according to the process for polymerizing olefins of any one of Aspects 4 or 8-80, wherein the olefin polymer is an ethylene homopolymer characterized by any one or any combination of the following properties:
   a) (Me/1,000 TC)*(Mn/14,000)<4.9, wherein Me/1,000 TC is the number of methyl groups per 1,000 total carbon atoms, and Mn is number average molecular weight;
   b) a molecular weight distribution (Mw/Mn, or polydispersity index) of from 2.0 to 15.0, alternatively, from 2.0 to 8.0; or alternatively, from 2.0 to 4.5;
   c) a melt index in a range of from 0 dg/min to about 100 dg/min;
   d) a high load melt index of greater than about 0.1 dg/min;

e) a number-average molecular weight (Mn) from about 5,000 g/mol to about 250,000 g/mol; or alternatively, from about 10,000 g/mol to about 200,000 g/mol;
f) a weight-average molecular weight (Mw) of from about 50,000 g/mol to about 700,000 g/mol; or alternatively, from about 100,000 g/mol to about 500,000 g/mol;
g) a ratio of Mw/Mn in a range from about 2 to about 10;
h) a density in a range from about 0.945 g/cm³ to 0.965; and/or
i) a short chain branching (FTIR method) of from about 0.4 Me/1000 C to about 1.5 Me/1000 C.

84. An olefin polymer prepared according to the process for polymerizing olefins of any one of Aspects 4 or 8-80, wherein the olefin polymer is an ethylene copolymer characterized by any one or any combination of the following properties:
a) a melt index in a range of from 0 dg/min to about 100 dg/min;
b) a high load melt index greater than about 0.1 dg/min;
c) a number-average molecular weight (Mn) from about 5,000 g/mol to about 250,000 g/mol; or alternatively, from about 10,000 g/mol to about 150,000 g/mol;
d) a weight-average molecular weight (Mw) from about 20,000 g/mol to about 700,000 g/mol; or alternatively, from about 50,000 g/mol to about 500,000 g/mol;
e) a ratio of Mw/Mn in a range from about 2 to about 20;
f) a density in a range from about 0.914 g/cm³ to 0.955; and/or
g) a short chain branching (FTIR method) of from about 1 Me/1000 C to about 15 Me/1000 C.

85. An olefin polymer prepared according to the process for polymerizing olefins of any one of Aspects 5 or 8-80, wherein the olefin polymer is an ethylene homopolymer characterized by any one or any combination of the following properties:
a) a melt index in a range of from 0 dg/min to about 100 dg/min;
b) a high load melt index greater than about 0.1 dg/min;
c) a number-average molecular weight (Mn) from about 5,000 g/mol to about 250,000 g/mol; or alternatively, from about 10,000 g/mol to about 200,000 g/mol;
d) a weight-average molecular weight (Mw) from about 100,000 g/mol to about 1,400,000 g/mol; or alternatively, from about 200,000 g/mol to about 1,000,000 g/mol;
e) a ratio of Mw/Mn in a range from about 4 to about 40;
f) a density in a range from about 0.94 g/cm³ to 0.96; and/or
a short chain branching (FTIR method) of from about 0.5 Me/1000 C to about 1.5 Me/1000 C.

86. An olefin polymer prepared according to the process for polymerizing olefins of any one of Aspects 5 or 8-80, wherein the olefin polymer is an ethylene copolymer characterized by any one or any combination of the following properties:
a) a melt index in a range of from 0 dg/min to about 100 dg/min;
b) a high load melt index greater than about 0.1 dg/min;
c) a number-average molecular weight (Mn) from about 5,000 g/mol to about 250,000 g/mol; or alternatively, from about 10,000 g/mol to about 200,000 g/mol;
d) a weight-average molecular weight (Mw) from about 100,000 g/mol to about 1,400,000 g/mol; or alternatively, from about 200,000 g/mol to about 800,000 g/mol;
e) a ratio of Mw/Mn in a range from about 4 to about 40;
f) a density in a range from about 0.914 g/cm³ to 0.955 and/or
g) a short chain branching (FTIR method) of from about 1 Me/1000 C to about 15 Me/1000 C.

87. An olefin polymer produced by the process for polymerizing olefins of any one of Aspects 4-5 or 8-80.

88. An article comprising the olefin polymer according to Aspect 87.

89. An article according to Aspect 88, wherein the article is an agricultural film, an automobile part, a bottle, a drum, a fiber, a fabric, a food packaging film or container, a container preform, a food service article, a fuel tank, a geomembrane, a household container, a liner, a molded product, a medical device or material, a pipe, a sheet or tape, or a toy.

90. A method for making an article of manufacture comprising an olefin polymer, the method comprising:
a) performing the olefin polymerization process according to any one of Aspects 4-5 or 8-80; and
b) fabricating the article of manufacture comprising the olefin polymer.

We claim:

1. A metallocene compound having the formula:

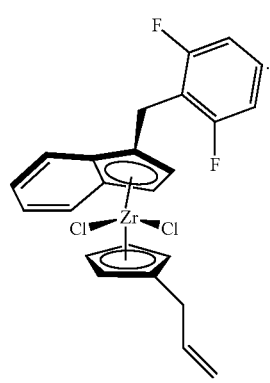

(IE-7)

2. A metallocene compound having the formula:

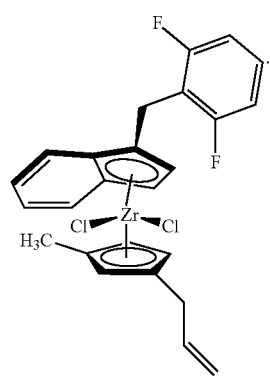

(IE-8)

3. A metallocene compound having the formula:

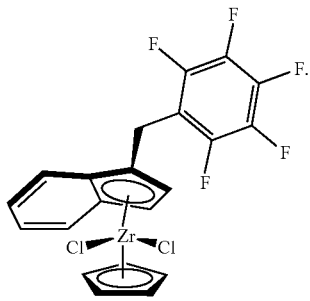

(IE-9)

4. A catalyst composition for polymerizing olefins, the catalyst composition comprising:
a) a first metallocene compound having the formula:

$(X^1)(X^2)(X^3)(X^4)M^1$, wherein
$M^1$ is hafnium;
$X^1$ is an indenyl ligand which is substituted at the 1-position with a group selected independently from

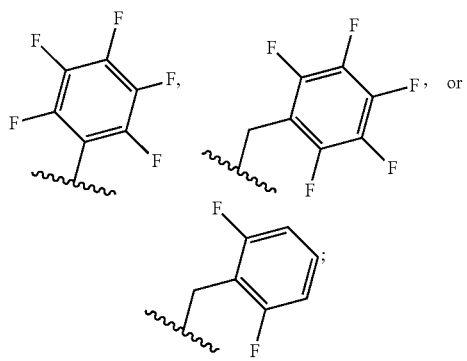

$X^2$ is [1] an unsubstituted cyclopentadienyl ligand or an unsubstituted indenyl ligand, [2] a cyclopentadienyl ligand which is substituted with at least one hydrocarbyl substituent selected independently from a $C_1$-$C_{12}$ alkyl or a $C_2$-$C_{12}$ alkenyl, or [3] an indenyl ligand which is substituted at the 1-position with a group having the formula

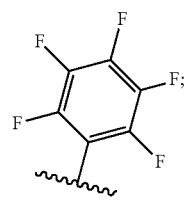

wherein $X^1$ and $X^2$ are unbridged; and
$X^3$ and $X^4$ are each a chloride;
b) optionally, a co-catalyst comprising an organoaluminum compound, an organoboron compound, an organozinc compound, an organomagnesium compound, an organolithium compound, or any combination thereof; and
c) an activator comprising a solid oxide treated with an electron-withdrawing anion (activator-support), an organoboron compound, an organoborate compound, an ionizing ionic compound, an aluminoxane compound, or any combination thereof.

5. The catalyst composition according to claim 4, wherein the first metallocene compound is selected from:

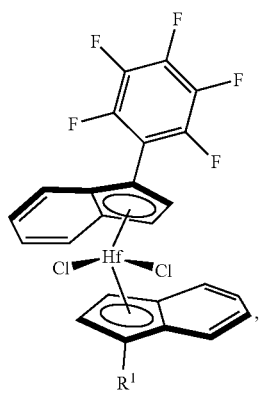

wherein $R^1$ is $C_6F_5$ or $R^1$ is H;

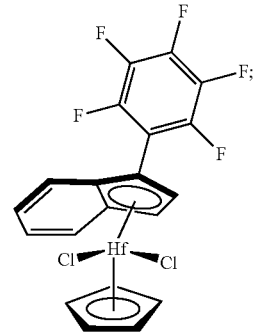

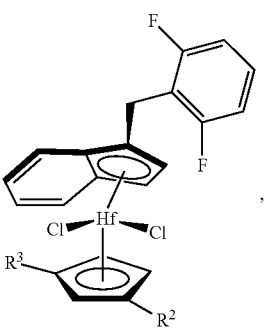

wherein $R^2$ is H and $R^3$ is H; $R^2$ is $CH_2CH_2CH=CH_2$ and $R^3$ is H; $R^2$ is $CH_2CH_2CH=CH_2$ and $R^3$ is $CH_3$; $R^2$ is $CH_2CH=CH_2$ and $R^3$ is H, or $R^2$ is $CH_2CH=CH_2$ and $R^3$ is $CH_3$;

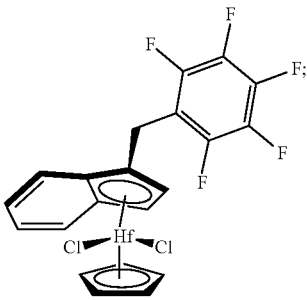

or
any combination thereof.

6. The catalyst composition according to claim 4, wherein the catalyst composition further comprises:
d) a second metallocene compound having the formula:

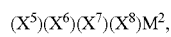

$(X^5)(X^6)(X^7)(X^8)M^2$, wherein
$M^2$ is titanium, zirconium, or hafnium;
$X^5$ is an optionally substituted cyclopentadienyl, indenyl, or fluorenyl ligand, wherein the substituent is selected independently from a $C_1$-$C_{12}$ hydrocarbyl group;
$X^6$ is an optionally substituted indenyl or fluorenyl ligand, wherein the substituent is selected independently from a $C_1$-$C_{12}$ hydrocarbyl group or a $C_1$-$C_{12}$ heterohydrocarbyl group;
wherein $X^5$ and $X^6$ are bridged by a bridging group selected from $(>ER^B{}_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties form a $C_3$-$C_6$ cyclic group; and
$X^7$ and $X^8$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

7. The catalyst composition according to claim 6, wherein $X^5$ is unsubstituted or substituted with a $C_1$-$C_6$ alkyl or $C_2$-$C_8$ alkenyl group, and $X^6$ is substituted with two substituents selected independently from a $C_1$-$C_{12}$ hydrocarbyl group; and
$R^B$, in each occurrence, is selected independently from a $C_1$-$C_6$ alkyl or $C_2$-$C_8$ alkenyl group.

8. The catalyst composition according to claim 6, wherein $(>ER^B{}_2)_x$ is selected from $(-CR^B{}_2CR^B{}_2-)$, $(-SiR^B{}_2SiR^B{}_2-)$, $(-CR^B{}_2SiR^B{}_2-)$, $(-CR^B{}_2CR^B{}_2CR^B{}_2-)$, $(-SiR^B{}_2CR^B{}_2CR^B{}_2-)$, $(-CR^B{}_2SiR^B{}_2CR^B{}_2-)$, $(-SiR^B{}_2CR^B{}_2SiR^B{}_2-)$, $(-SiR^B{}_2SiR^B{}_2CR^B{}_2-)$, or $(-SiR^B{}_2SiR^B{}_2SiR^B{}_2-)$.

9. A catalyst composition according to claim 6, wherein $(>ER^B{}_2)_x$ or $>BR^B$ is selected from $>CMe_2$, $>CPh_2$, $>CHMe$, $>CHPh$, $>CH(tolyl)$, $>CMeEt$, $>CMe(CH_2CH_2CH_3)$, $>CMe(CH_2CH_2CH=CH_2)$, $>CH(CH_2CH_2CH=CH_2)$, $>CMe(CH_2CH_2CH=CH_2)$, $>CEt(CH_2CH_2CH=CH_2)$, $>CPh(CH_2CH_2CH=CH_2)$, $>SiMe_2$, $>SiPh_2$, $>SiEt_2$, $>Si(tolyl)_2$, $(-CH_2CH_2-)$, $(-CMe_2CMe_2-)$, $(-CH_2CH_2CH_2-)$, $(-CH_2SiMe_2CH_2-)$, $(-CH_2SiPh_2CH_2-)$, $(-SiMe_2SiMe_2-)$, $>BMe$, $>BEt$, $>BPh$, or $>B(tolyl)$.

10. A catalyst composition according to claim 6, wherein the second metallocene is selected from a compound having the formula:

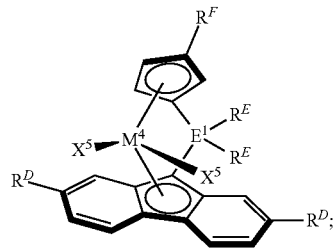

wherein:
$M^4$ is zirconium or hafnium;
$X^5$ in each occurrence is independently F, Cl, Br, I, H, methyl, benzyl, phenyl, or methoxy;
$R^D$ in each occurrence is selected independently from H, $C_1$-$C_{12}$ alkyl, $C_2$-$C_{12}$ alkenyl, $C_6$-$C_{10}$ aryl, $C_7$-$C_{12}$ aralkyl, or $C_1$-$C_{12}$ hydrocarbyloxide;
$E^1$ is C or Si;
$R^E$ in each occurrence is selected independently from H, $C_1$-$C_{12}$ alkyl, $C_2$-$C_{12}$ alkenyl, $C_6$-$C_{10}$ aryl, or $C_7$-$C_{12}$ aralkyl; and
$R^F$ is selected from H, $C_1$-$C_{12}$ alkyl, $C_2$-$C_{12}$ alkenyl, $C_6$-$C_{10}$ aryl, or $C_7$-$C_{12}$ aralkyl.

11. A catalyst composition according to claim 6, wherein the second metallocene is selected from a compound having the formula:

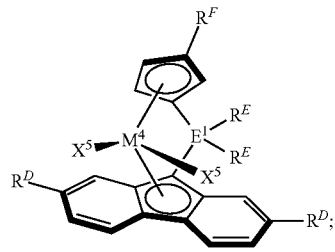

wherein:
$M^4$ is zirconium or hafnium;
$X^5$ in each occurrence is independently Cl, Br, methyl, or benzyl;
$R^D$ in each occurrence is selected independently from H or t-butyl;
$E^1$ is C;
$R^E$ in a first occurrence is methyl or phenyl, and $R^E$ in a second occurrence is methyl, phenyl, or $CH_2CH_2CH=CH_2$; and
$R^F$ is H or $CH_2CH_2CH_2CH=CH_2$.

12. A catalyst composition according to claim 6, wherein the second metallocene is selected from a compound having the formula:
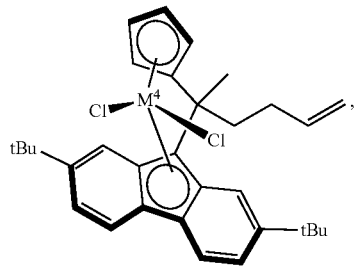
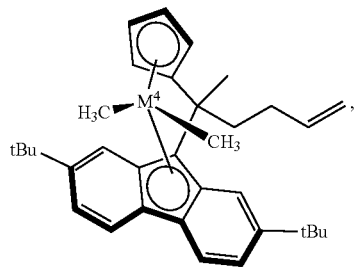
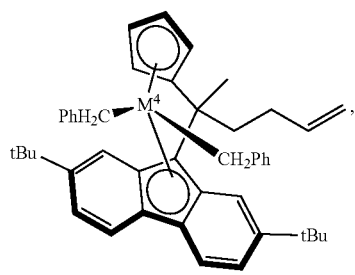
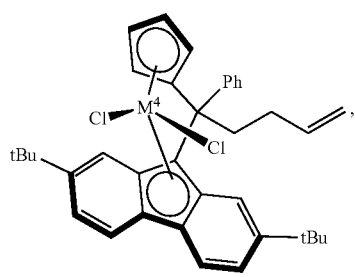
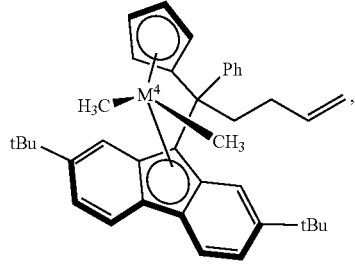
-continued
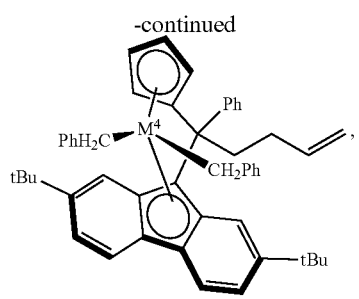
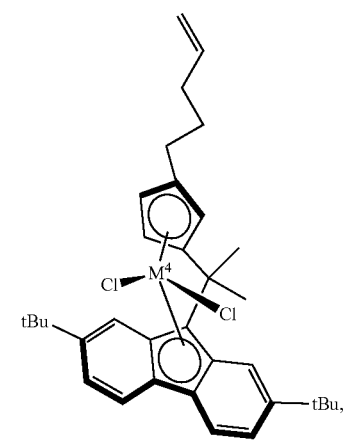
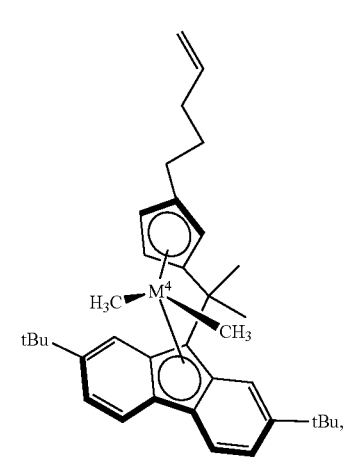
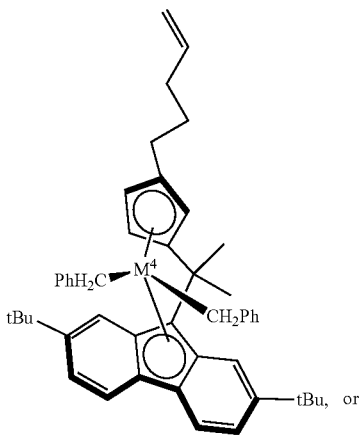

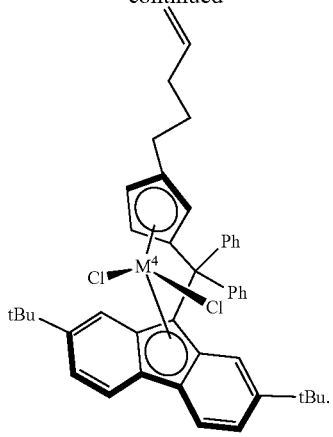

13. The catalyst composition according to claim 4, wherein the activator comprises a solid oxide treated with an electron-withdrawing anion, and wherein:
the solid oxide comprises silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, mullite, boehmite, heteropolytungstates, or any combination thereof; and
the electron-withdrawing anion comprises fluoride, chloride, bromide, iodide, sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, trifluoroacetate, fluoroborate, fluorozirconate, fluorotitanate, or any combination thereof.

14. A catalyst composition according to claim 4, wherein the activator comprises a solid oxide treated with an electron-withdrawing anion selected from fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, phosphated silica-zirconia, fluorided mullite, chlorided mullite, bromided mullite, sulfated mullite, phosphated mullite, fluorided silica-coated alumina, chlorided silica-coated alumina, bromided silica-coated alumina, sulfated silica-coated alumina, phosphated silica-coated alumina, or any combination thereof.

15. A catalyst composition according to claim 4, wherein:
a) the optional co-catalyst has a general formula:
 i) $M^3(X^{10})_n(X^{11})_{3-n}$, wherein $M^3$ is boron or aluminum and n is from 1 to 3 inclusive;
 ii) $M^4(X^{10})_n(X^{11})_{2-n}$, wherein $M^4$ is magnesium or zinc and n is from 1 to 2 inclusive; or
 iii) $M^5X^{10}$, wherein $M^5$ is Li;
b) $X^{10}$ is independently hydride or a $C_1$ to $C_{20}$ hydrocarbyl; and
c) $X^{11}$ is independently a halide, a hydride, a $C_1$ to $C_{20}$ hydrocarbyl, or a $C_1$ to $C_{20}$ hydrocarbyloxide.

16. A catalyst composition according to claim 4, wherein the optional co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

17. The catalyst composition according to claim 4, wherein the first metallocene compound has the formula:

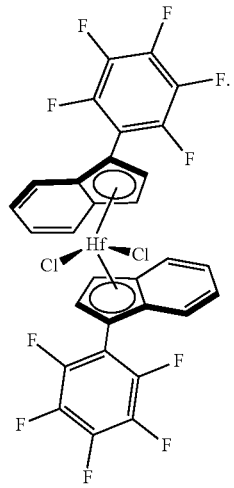

18. The catalyst composition according to claim 4, wherein the first metallocene compound has the formula:

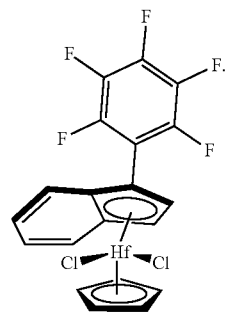

19. The catalyst composition according to claim 4, wherein the first metallocene compound has the formula:

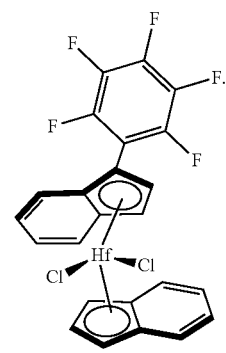

20. The catalyst composition according to claim 4, wherein the first metallocene compound has the formula:

21. The catalyst composition according to claim 4, wherein the first metallocene compound has the formula:

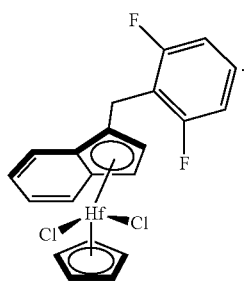

22. The catalyst composition according to claim 4, wherein the first metallocene compound has the formula:

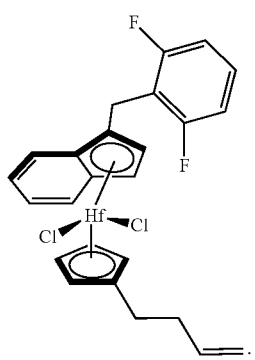

23. The catalyst composition according to claim 4, wherein the first metallocene compound has the formula:

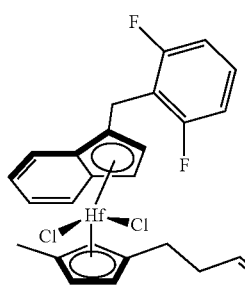

24. The catalyst composition according to claim 4, wherein the first metallocene compound has the formula:

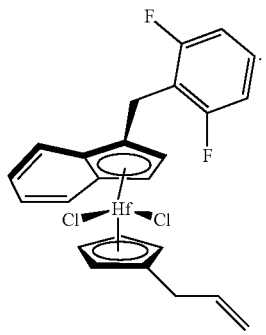

25. The catalyst composition according to claim 4, wherein the first metallocene compound has the formula:

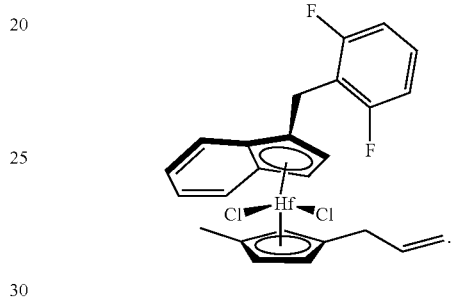

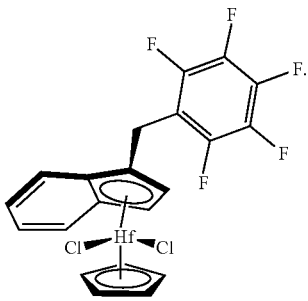

26. A process for polymerizing olefins, the process comprising contacting at least one olefin monomer and the catalyst composition according to claim 4 under polymerization conditions to form an olefin polymer, wherein the at least one olefin monomer comprises ethylene or ethylene in combination with an olefin co-monomer selected from propylene, butene, pentene, hexene, heptene, octene, styrene, or a combination thereof.

* * * * *